US012709627B2

(12) United States Patent
Aoki et al.

(10) Patent No.: US 12,709,627 B2
(45) Date of Patent: Aug. 18, 2026

(54) COMPOUND

(71) Applicant: SUMITOMO CHEMICAL COMPANY, LIMITED, Tokyo (JP)

(72) Inventors: Takuma Aoki, Osaka (JP); Tomohiro Nakayama, Osaka (JP); Tetsuo Akasaka, Osaka (JP); Takahiro Kurogi, Osaka (JP); Hirofumi Hamaki, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 842 days.

(21) Appl. No.: 18/017,411

(22) PCT Filed: Jul. 21, 2021

(86) PCT No.: PCT/JP2021/027351
§ 371 (c)(1),
(2) Date: Jan. 23, 2023

(87) PCT Pub. No.: WO2022/024926
PCT Pub. Date: Feb. 3, 2022

(65) Prior Publication Data

US 2023/0279034 A1 Sep. 7, 2023

(30) Foreign Application Priority Data

Jul. 31, 2020 (JP) ................................ 2020-130478

(51) Int. Cl.
*C07F 9/6524* (2006.01)
*C08F 269/00* (2006.01)
(Continued)

(52) U.S. Cl.
CPC .......... *C07F 9/6524* (2013.01); *C08F 269/00* (2013.01); *C08K 5/521* (2013.01);
(Continued)

(58) Field of Classification Search
CPC ...... C07F 9/65442; C08F 26/00; C08K 5/521; C08K 5/527; C09B 47/085; G02B 5/20
(Continued)

(56) References Cited

U.S. PATENT DOCUMENTS

2023/0312869 A1* 10/2023 Kurogi .................... C09B 47/08
524/204

FOREIGN PATENT DOCUMENTS

CN 103370642 A 10/2013
JP 2013-171063 A 9/2013
(Continued)

OTHER PUBLICATIONS

International Searching Authority, "International Search Report," issued in connection with International Patent Application No. PCT/JP2021/027351, dated Oct. 12, 2021.
(Continued)

*Primary Examiner* — Ruiyun Zhang
(74) *Attorney, Agent, or Firm* — Foley & Lardner LLP

(57) ABSTRACT

The present invention provides a compound represented by formula (I) or formula (II) capable of reducing the color difference before and after post-baking.

(I)

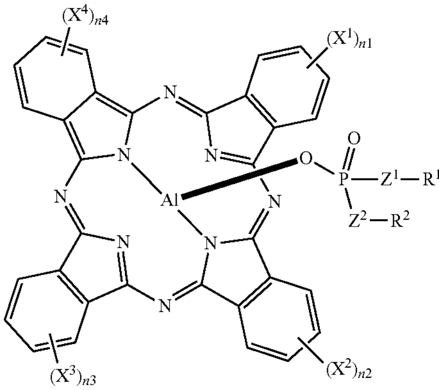

(II)

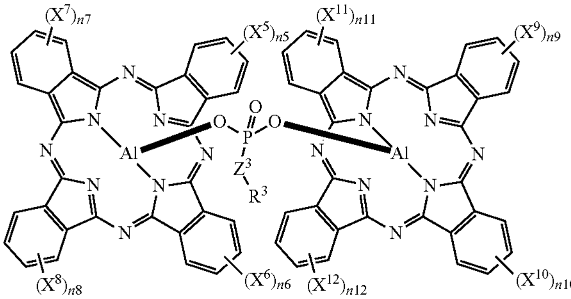

[In the formula (I), $R^1$ represents a C2-C20 unsaturated hydrocarbon group optionally having a substituent; $R^2$ represents a hydrogen atom, a C1-C20 hydrocarbon group optionally having a substituent, or a single bond connecting $Z^2$ and $R^1$; and $Z^1$ and $Z^2$ each independently represent a single bond or an oxygen atom, and in the formula (II), $R^3$ represents a C2-C20 unsaturated hydrocarbon group optionally having a substituent; and $Z^3$ represents a single bond or an oxygen atom].

5 Claims, No Drawings

(51) Int. Cl.

| | |
|---|---|
| ***C08K 5/521*** | (2006.01) |
| ***C08K 5/527*** | (2006.01) |
| ***C09B 47/08*** | (2006.01) |
| ***G02B 5/20*** | (2006.01) |

(52) U.S. Cl.
CPC ............ *C08K 5/527* (2013.01); *C09B 47/085* (2013.01); *G02B 5/20* (2013.01)

(58) Field of Classification Search
USPC ............................................................ 524/88
See application file for complete search history.

(56) References Cited

FOREIGN PATENT DOCUMENTS

| | | | |
|---|---|---|---|
| JP | 2016-075837 | A | 5/2016 |
| JP | 2018-080217 | A | 5/2018 |
| JP | 2018-150498 | A | 9/2018 |
| JP | 2020-052071 | A | 4/2020 |
| WO | WO-2020/045197 | A1 | 3/2020 |

OTHER PUBLICATIONS

International Searching Authority, "Written Opinion," issued in connection with International Patent Application No. PCT/JP2021/027351, dated Oct. 12, 2021.
International Searching Authority, "International Search Report," issued in connection with International Patent Application No. PCT/JP2021/031583, dated Nov. 16, 2021.
International Searching Authority, "Written Opinion," issued in connection with International Patent Application No. PCT/JP2021/031583, dated Nov. 16, 2021.
Office Action issued in corresponding Chinese Patent Application No. 202180054357.6 dated Jun. 29, 2024 (11 pages).
Office Action issued in corresponding Chinese Patent Application No. 202180054357.6 dated Sep. 21, 2023 (17 pages).
Office Action issued in corresponding Taiwanese Patent Application No. 110132696 dated Feb. 12, 2025.

* cited by examiner

COMPOUND

CROSS-REFERENCE TO RELATED APPLICATIONS

The present application claims priority under 35 U.S.C. § 371 to International Patent Application No. PCT/JP2021/027351, filed Jul. 21, 2021, which claims priority to and the benefit of Japanese Patent Application No. 2020-130478, filed on Jul. 31, 2020. The contents of these applications are hereby incorporated by reference in their entireties.

TECHNICAL FIELD

The present invention relates to a compound, a colored resin composition, a color filter, and a display device.

BACKGROUND ART

An optical filter used for display devices such as a liquid crystal display device, an electroluminescence display device, and a plasma display, and solid-state image sensors such as a CCD and a CMOS sensor is produced from a colored resin composition. An aluminum phthalocyanine pigment is known as a colorant for such a colored resin composition. Patent Document 1 discloses that using an aluminum phthalocyanine pigment having a specific structure as a colorant provides a colored composition for a color filter that is excellent in not only NMP (N-methylpyrrolidone) resistance but also developability and flatness of a coating film while having high brightness.

PRIOR ART DOCUMENT

Patent Document

Patent Document 1: JP 2016-75837 (A)

SUMMARY OF THE INVENTION

Problems to be Solved by the Invention

However, the use of the aluminum phthalocyanine pigment disclosed in Patent Document 1 sometimes caused a large color difference before and after post-baking. An object of the present invention is to provide a novel compound capable of reducing the color difference before and after post-baking.

Solutions to the Problems

The present invention includes the following inventions.

[1] A compound represented by formula (I) or formula (II):

(I)

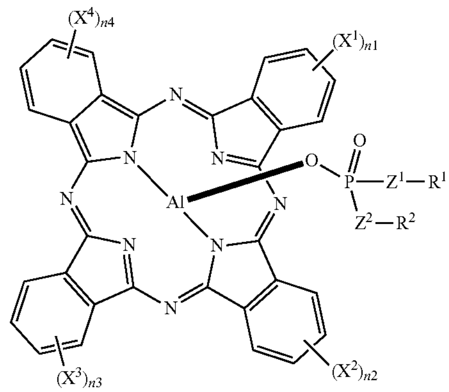

-continued (II)

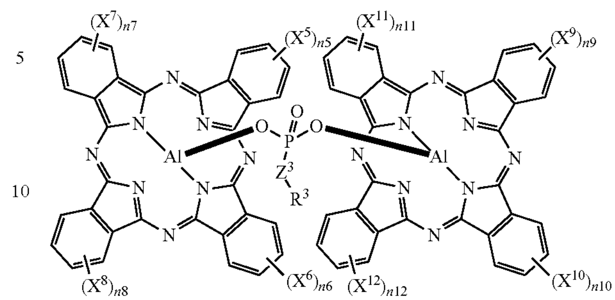

wherein in the formula (I), $R^1$ represents an unsaturated hydrocarbon group having 2 to 20 carbon atoms and optionally having a substituent;

$R^2$ represents a hydrogen atom, a hydrocarbon group having 1 to 20 carbon atoms and optionally having a substituent, or a single bond connecting $Z^2$ and $R^1$;

$Z^1$ and $Z^2$ each independently represent a single bond or an oxygen atom;

$X^1$ to $X^4$ each independently represent —$R^4$, —$OR^4$, —$SR^4$, a halogen atom, a nitro group, or a sulfamoyl group optionally having a substituent;

$R^4$ represents a hydrocarbon group having 1 to 20 carbon atoms and optionally having a substituent; and n1 to n4 each independently represent an integer of 0 to 4, and in the formula (II), $R^3$ represents an unsaturated hydrocarbon group having 2 to 20 carbon atoms and optionally having a substituent;

$Z^3$ represents a single bond or an oxygen atom;

$X^5$ to $X^{12}$ each independently represent —$R^5$, —$OR^5$, —$SR^5$, a halogen atom, a nitro group, or a sulfamoyl group optionally having a substituent;

$R^5$ represents a hydrocarbon group having 1 to 20 carbon atoms and optionally having a substituent; and n5 to n12 each independently represent an integer of 0 to 4.

[2] A colored resin composition comprising the compound according to [1] and a resin.

[3] The colored resin composition according to [2], comprising a polymerizable compound and a polymerization initiator.

[4] A color filter formed from the colored resin composition according to [2] or [3].

[5] A display device comprising the color filter according to [4].

Effect of the Invention

A color filter formed from a colored resin composition containing a novel compound of the present invention can have a reduced color difference before and after post-baking.

MODE FOR CARRYING OUT THE INVENTION

<<Compound>>

Hereinafter, the present invention will be described more specifically with reference to a partial structure of the compound represented by formula (I) or formula (II). A color filter formed from a colored resin composition containing the novel compound represented by formula (I) or formula (II) of the present invention can have a reduced color difference before and after post-baking. Furthermore, in one embodiment of the present invention, a colored resin composition containing the novel compound can have a reduced change in transmittance at 500 to 650 nm before and after post-baking.

(I)

(II)

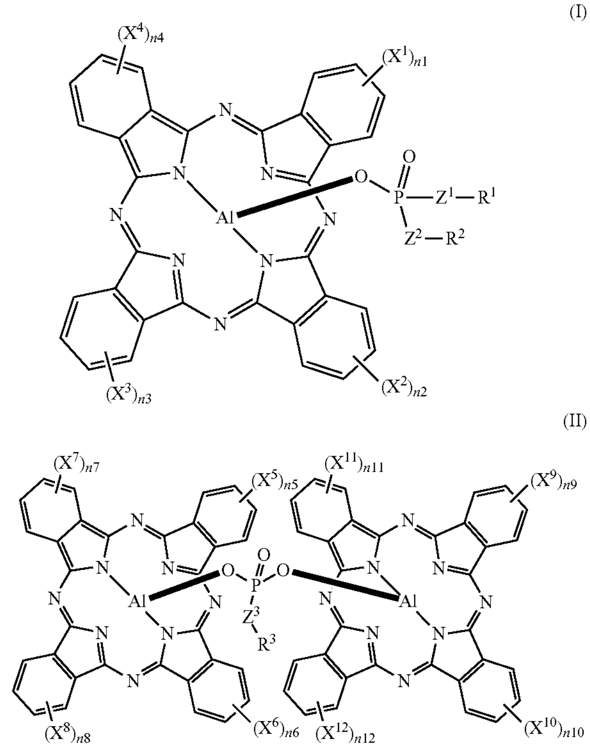

[In the formula (I), $R^1$ represents an unsaturated hydrocarbon group having 2 to 20 carbon atoms and optionally having a substituent;

$R^2$ represents a hydrogen atom, a hydrocarbon group having 1 to 20 carbon atoms and optionally having a substituent, or a single bond connecting $Z^2$ and $R^1$;

$Z^1$ and $Z^2$ each independently represent a single bond or an oxygen atom;

$X^1$ to $X^4$ each independently represent —$R^4$, —$OR^4$, —$SR^4$, a halogen atom, a nitro group, or a sulfamoyl group optionally having a substituent;

$R^4$ represents a hydrocarbon group having 1 to 20 carbon atoms and optionally having a substituent; and n1 to n4 each independently represent an integer of 0 to 4.

In the formula (II), $R^3$ represents an unsaturated hydrocarbon group having 2 to 20 carbon atoms and optionally having a substituent;

$Z^3$ represents a single bond or an oxygen atom;

$X^5$ to $X^{12}$ each independently represent —$R^7$, —$OR^5$, —$SR^5$, a halogen atom, a nitro group, or a sulfamoyl group optionally having a substituent;

$R^5$ represents a hydrocarbon group having 1 to 20 carbon atoms and optionally having a substituent; and n5 to n12 each independently represent an integer of 0 to 4.]

The unsaturated hydrocarbon group represented by $R^1$ and $R^3$ has 2 to 20 carbon atoms, preferably 2 to 10 carbon atoms, more preferably 2 to 7 carbon atoms, and particularly preferably 2 to 5 carbon atoms. The lower limit of the number of carbon atoms may be 3 or 4, and the upper limit of the number of carbon atoms may be 8.

The unsaturated hydrocarbon group represented by $R^1$ and $R^3$ is an aliphatic unsaturated hydrocarbon group and may be chain or cyclic (alicyclic hydrocarbon group).

The unsaturated chain hydrocarbon group represented by $R^1$ and $R^3$ may be in the form of either straight-chain or branched-chain. Specific examples of the unsaturated chain hydrocarbon group include alkenyl groups such as ethenyl (vinyl), propenyl (for example, 1-propenyl and 2-propenyl (allyl)), 1-methylethenyl, butenyl (for example, 1-butenyl, 2-butenyl, and 3-butenyl), 3-methyl-1-butenyl, 1-methyl-1-butenyl, 3-methyl-2-butenyl, 1,3-butadienyl, 3-methyl-1,2-butadienyl, 1-(2-propenyl)ethenyl, 1-(1-methylethenyl)ethenyl, 1,1-dimethyl-2-propenyl, 1,2-dimethyl-1-propenyl, 1-ethyl-2-propenyl, pentenyl (for example, 1-pentenyl, 2-pentenyl, 3-pentenyl, and 4-pentenyl), 1-(1,1-dimethylethyl)ethenyl, 1,3-dimethyl-1-butenyl, hexenyl (for example, 1-hexenyl and 5-hexenyl), heptenyl (for example, 1-heptenyl and 6-heptenyl), octenyl (for example, 1-octenyl and 7-octenyl), nonenyl (for example, 1-nonenyl and 8-nonenyl), decenyl (for example, 1-decenyl and 9-decenyl), undecenyl, dodecenyl, tridecenyl, tetradecenyl, pentadecenyl, hexadecenyl, heptadecenyl, octadecenyl, nonadecenyl, and icosenyl; and alkynyl groups such as ethynyl, propynyl (for example, 1-propynyl and 2-propynyl), butynyl (for example, 1-butynyl, 2-butynyl, and 3-butynyl), pentynyl (for example, 2-pentynyl, 3-pentynyl, and 4-pentynyl), 1-methyl-3-butynyl, 1,1-dimethyl-2-propynyl, hexynyl (for example, 2-hexynyl and 5-hexynyl), 1-ethyl-3-butynyl, heptynyl (for example, 2-heptynyl and 6-heptynyl), 1-ethyl-3-pentynyl, octynyl (for example, 1-octynyl, 2-octynyl, and 7-octynyl), nonynyl (for example, 2-nonynyl and 8-nonynyl), decynyl (for example, 2-decynyl and 9-decynyl), undecynyl, dodecynyl, tridecynyl, tetradecynyl, pentadecynyl, hexadecynyl, heptadecynyl, octadecynyl, nonadecynyl, and icosynyl.

Examples of the unsaturated alicyclic hydrocarbon group represented by $R^1$ and $R^3$ include cycloalkenyl groups such as cyclohexenyl (for example, cyclohex-1-en-1-yl, cyclohex-2-en-1-yl, and cyclohex-3-en-1-yl), cycloheptenyl, and cyclooctenyl; and unsaturated polycyclic hydrocarbon groups such as norbornenyl.

The C2-C20 unsaturated hydrocarbon group represented by $R^1$ and $R^3$ optionally has a substituent.

Examples of the substituent include an aromatic hydrocarbon group having 6 to 20 carbon atoms and optionally having a substituent, a heterocyclic group optionally having a substituent, a halogen atom, a nitro group, a cyano group, —$OR^{a1}$, —$CO_2R^{a1}$, —$SR^{a1}$, —$SO_2R^{a1}$, —$SO_3R^{a1}$, —$SO_2NR^{a1}R^{a2}$, and —$NR^{a1}R^{a2}$.

$R^{a1}$ and $R^{a2}$ each independently represent a hydrogen atom or a hydrocarbon group having 1 to 20 carbon atoms. The C1-C20 hydrocarbon group represented by $R^{a1}$ and $R^{a2}$ is the same as the C1-C20 hydrocarbon group represented by $R^2$, $R^4$ and R described later.

Examples of the C6-C20 aromatic hydrocarbon group used as the substituent of the C2-C20 unsaturated hydrocarbon group represented by $R^1$ and $R^3$ include phenyl, p-tolyl, m-tolyl, p-tolyl, 2-ethylphenyl, 3-ethylphenyl, 4-ethylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 4-vinylphenyl, o-isopropylphenyl, m-isopropylphenyl, p-isopropylphenyl, o-tert-butylphenyl, m-tert-butylphenyl, p-tert-butylphenyl, 3,5-di(tert-butyl) phenyl, 3,5-di(tert-butyl)-4-methylphenyl, 4-butylphenyl, 4-pentylphenyl, 2,6-bis(1-methylethyl)phenyl, 2,4,6-tris(1- methylethyl)phenyl, 4-cyclohexylphenyl, 2,4,6-trimethylphenyl, 4-octylphenyl, 4-(1,1,3,3-tetramethylbutyl)phenyl, 1-naphthyl, 2-naphthyl, 6-methyl-2-naphthyl, 5,6,7,8-tetrahydro-1-naphthyl, 5,6,7,8-tetrahydro-2-naphthyl, fluorenyl, phenanthryl, anthryl, 2-dodecylphenyl, 3-dodecylphenyl, 4-dodecylphenyl, perylenyl, chrysenyl, and pyrenyl.

The aromatic hydrocarbon group preferably has 6 to 10 carbon atoms, more preferably 6 to 8 carbon atoms.

The aromatic hydrocarbon group optionally has a substituent. Examples of the substituent include a halogen atom, a nitro group, a cyano group, $—OR^{a1}$, $—CO_2R^{a1}$, $—SR^{a1}$, $—SO_2R^{a1}$, $—SO_3R^{a1}$, $—SO_2NR^{a1}R^{a2}$, and $—NR^{a1}R^{a2}$, wherein $R^{a1}$ and $Ra^2$ are the same as mentioned above.

The heterocyclic group used as the substituent of the C2-C20 unsaturated hydrocarbon group represented by $R^1$ and $R^3$ may be monocyclic or polycyclic, and is preferably a heterocycle containing a heteroatom as a constituent element of its ring. Examples of the heteroatom include a nitrogen atom, an oxygen atom, and a sulfur atom.

Examples of a heterocycle containing only nitrogen atom(s) as the heteroatom include monocyclic saturated heterocycles such as aziridine, azetidine, pyrrolidine, piperidine, and piperazine; 5-membered unsaturated heterocycles such as pyrrole, pyrazole, imidazole, 1,2,3-triazole, and 1,2,4-triazole; 6-membered unsaturated heterocycles such as pyridine, pyridazine, pyrimidine, pyrazine, and 1,3,5-triazine; fused bicyclic heterocycles such as indazole, indoline, isoindoline, isoindoline-1,3-dione, indole, indolizine, benzimidazole, quinoline, isoquinoline, quinoxaline, quinazoline, cinnoline, phthalazine, naphthyridine, purine, pteridine, benzopyrazole, and benzopiperidine; and fused tricyclic heterocycles such as carbazole, acridine, and phenazine.

Examples of a heterocycle containing only oxygen atom(s) as the heteroatom include monocyclic saturated heterocycles such as oxirane, oxetane, tetrahydrofuran, tetrahydropyran, 1,3-dioxane, and 1,4-dioxane; bicyclic saturated heterocycles such as 1,4-dioxaspiro[4.5]decane and 1,4-dioxaspiro[4.5]nonane; lactone heterocycles such as α-acetolactone, β-propiolactone, γ-butyrolactone, and δ-valerolactone; 5-membered unsaturated heterocycles such as furan; 6-membered unsaturated heterocycles such as 2H-pyran and 4H-pyran; fused bicyclic heterocycles such as 1-benzofuran, benzopyran, benzodioxole, chroman, and isochroman; and fused tricyclic heterocycles such as xanthene and dibenzofuran.

Examples of a heterocycle containing only sulfur atom(s) as the heteroatom include 5-membered saturated heterocycles such as dithiolane; 6-membered saturated heterocycles such as thiane and 1,3-dithiane; 5-membered unsaturated heterocycles such as thiophene; 6-membered unsaturated heterocycles such as 4H-thiopyran; fused bicyclic heterocycles such as benzothiopyran including benzotetrahydrothiopyran and the like, and benzothiophene; and fused tricyclic heterocycles such as thianthrene and dibenzothiophene.

Examples of a heterocycle containing nitrogen atom(s) and oxygen atom(s) as heteroatoms include monocyclic saturated heterocycles such as morpholine, 2-pyrrolidone, and 2-piperidone; monocyclic unsaturated heterocycles such as oxazole and isoxazole; fused bicyclic heterocycles such as benzoxazole, benzoisoxazole, benzoxazine, benzodioxane, and benzimidazoline; and fused tricyclic heterocycles such as phenoxazine.

Examples of a heterocycle containing nitrogen atom(s) and sulfur atom(s) as heteroatoms include monocyclic heterocycles such as thiazole; fused bicyclic heterocycles such as benzothiazole; and fused tricyclic heterocycles such as phenothiazine.

The heterocyclic group preferably has 2 to 30 carbon atoms, more preferably 3 to 22 carbon atoms, and still more preferably 3 to 20 carbon atoms.

The heterocyclic group optionally has a substituent. Examples of the substituent include a halogen atom, a nitro group, a cyano group, $—OR^{a1}$, $—CO_2R^{a1}$, $—SR^{a1}$, $—SO_2R^{a1}$, $—SO_3R^{a1}$, $—SO_2NR^{a1}R^{a2}$, and $—NR^{a1}R^{a2}$ wherein $R^{a1}$ and $R^{a2}$ are the same as mentioned above.

The bonding position of the heterocycle is at a portion where any hydrogen atom contained in each ring is eliminated.

Examples of the halogen atom used as the substituent of the C2-C20 unsaturated hydrocarbon group represented by $R^1$ and $R^3$ include a fluorine atom, a chlorine atom, a bromine atom, and an iodine atom.

The hydrocarbon group represented by $R^2$, $R^4$, and $R^5$ has 1 to 20 carbon atoms, and preferably 1 to 15 carbon atoms.

The C1-C20 hydrocarbon group represented by $R^2$, $R^4$, and $R^5$ may be an aliphatic hydrocarbon group or an aromatic hydrocarbon group. The aliphatic hydrocarbon group may be saturated or unsaturated, and may be chain or cyclic (alicyclic hydrocarbon group).

Examples of the saturated or unsaturated chain hydrocarbon group represented by $R^2$, $R^4$, and $R^5$ include straight-chain alkyl groups such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and icosyl;

branched-chain alkyl groups such as isopropyl, isobutyl, sec-butyl, tert-butyl, 2-ethylbutyl, 3,3-dimethylbutyl, 1,1,3,3-tetramethylbutyl, 1-methylbutyl, 1-ethylpropyl, 3-methylbutyl, neopentyl, 1,1-dimethylpropyl, 2-methylpentyl, 3-ethylpentyl, 1,3-dimethylbutyl, 2-propylpentyl, 1-ethyl-1,2-dimethylpropyl, 1-methylpentyl, 4-methylpentyl, 4-methylhexyl, 5-methylhexyl, 2-ethylhexyl, 1-methylhexyl, 1-ethylpentyl, 1-propylbutyl, 3-ethylheptyl, 2,2-dimethylheptyl, 1-methylheptyl, 1-ethylhexyl, 1-propylpentyl, 1-methyloctyl, 1-ethylheptyl, 1-propylhexyl, 1-butylpentyl, 1-methylnonyl, 1-ethyloctyl, 1-propylheptyl, and 1-butylhexyl;

alkenyl groups such as ethenyl (vinyl), propenyl (for example, 1-propenyl and 2-propenyl (allyl)), 1-methylethenyl, butenyl (for example, 1-butenyl, 2-butenyl, and 3-butenyl), 3-methyl-1-butenyl, 1-methyl-1-butenyl, 3-methyl-2-butenyl, 1,3-butadienyl, 3-methyl-1,2-butadienyl, 1-(2-propenyl)ethenyl, 1-(1-methylethenyl)ethenyl, 1,1-dimethyl-2-propenyl, 1,2-dimethyl-1-propenyl, 1-ethyl-2-propenyl, pentenyl (for example, 1-pentenyl, 2-pentenyl, 3-pentenyl, and 4-pentenyl), 1-(1,1-dimethylethyl)ethenyl, 1,3-dimethyl-1-butenyl, hexenyl (for example, 1-hexenyl and 5-hexenyl), heptenyl (for example, 1-heptenyl and 6-heptenyl), octenyl (for example, 1-octenyl and 7-octenyl), nonenyl (for example, 1-nonenyl and 8-nonenyl), decenyl (for example, 1-decenyl and 9-decenyl), undecenyl, dodecenyl, tridecenyl, tetradecenyl, pentadecenyl, hexadecenyl, heptadecenyl, octadecenyl, nonadecenyl, and icosenyl; and alkynyl groups such as ethynyl, propynyl (for example, 1-propynyl and 2-propynyl), butynyl (for example, 1-butynyl, 2-butynyl, and 3-butynyl), pentynyl (for example, 2-pentynyl, 3-pentynyl, and 4-pentynyl), 1-methyl-3-butynyl, 1,1-dimethyl-2-propynyl, hexynyl (for example, 2-hexynyl and 5-hexynyl), 1-ethyl-3- butynyl, heptynyl (for example, 2-heptynyl and 6-heptynyl), 1-ethyl-3-pentynyl, octynyl (for example, 1-octynyl, 2-octynyl, and 7-octynyl), nonynyl (for example, 2-nonynyl and 8-nonynyl), decynyl (for example, 2-decynyl and 9-decynyl), undecynyl, dodecynyl, tridecynyl, tetradecynyl, pentadecynyl, hexadecynyl, heptadecynyl, octadecynyl, nonadecynyl, and icosynyl.

The saturated chain hydrocarbon group (namely, straight-chain alkyl group and branched-chain alkyl group) represented by $R^2$, $R^4$, and $R^5$ preferably has 1 to 10 carbon atoms, more preferably 1 to 7 carbon atoms, and still more preferably 1 to 5 carbon atoms.

The unsaturated chain hydrocarbon group (namely, alkenyl group and alkynyl group) represented by $R^2$, $R^4$, and $R^5$ preferably has 2 to 10 carbon atoms, more preferably 2 to 7 carbon atoms, and still more preferably 2 to 5 carbon atoms.

Examples of the saturated or unsaturated alicyclic hydrocarbon group represented by $R^2$, $R^4$, and $R^5$ include cycloalkyl groups such as cyclopropyl, 1-methylcyclopropyl, cyclobutyl, cyclopentyl, cyclohexyl, cycloheptyl, 1-methylcyclohexyl, 2-methylcyclohexyl, 3-methylcyclohexyl, 4-methylcyclohexyl, 1,2-dimethylcyclohexyl, 1,3-dimethylcyclohexyl, 1,4-dimethylcyclohexyl, 2,3-dimethylcyclohexyl, 2,4-dimethylcyclohexyl, 2,5-dimethylcyclohexyl, 2,6-dimethylcyclohexyl, 3,4-dimethylcyclohexyl, 3,5-dimethylcyclohexyl, 2,2-dimethylcyclohexyl, 3,3-dimethylcyclohexyl, 4,4-dimethylcyclohexyl, cyclooctyl, 2,4,6-trimethylcyclohexyl, 2,2,6,6-tetramethylcyclohexyl, 3,3,5,5-tetramethylcyclohexyl, 4-pentylcyclohexyl, 4-octylcyclohexyl, and 4-cyclohexylcyclohexyl;

cycloalkenyl groups such as cyclohexenyl (for example, cyclohex-1-en-1-yl, cyclohex-2-en-1-yl, and cyclohex-3-en-1-yl), cycloheptenyl, and cyclooctenyl; and saturated or unsaturated polycyclic hydrocarbon groups such as norbornyl, norbornenyl, adamantly, and bicyclo [2.2.2]octyl.

The saturated or unsaturated alicyclic hydrocarbon group represented by $R^2$, $R^4$, and $R^5$ preferably has 3 to 10 carbon atoms.

Examples of the aromatic hydrocarbon group represented by $R^2$, $R^4$, and $R^5$ include phenyl, p-tolyl, m-tolyl, p-tolyl, 2-ethylphenyl, 3-ethylphenyl, 4-ethylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 4-vinylphenyl, o-isopropylphenyl, m-isopropylphenyl, p-isopropylphenyl, o-tert-butylphenyl, m-tert-butylphenyl, p-tert-butylphenyl, 3,5-di(tert-butyl)phenyl, 3,5-di(tert-butyl)-4-methylphenyl, 4-butylphenyl, 4-pentylphenyl, 2,6-bis(1-methylethyl)phenyl, 2,4,6-tris(1-methylethyl)phenyl, 4-cyclohexylphenyl, 2,4,6-trimethylphenyl, 4-octylphenyl, 4-(1,1,3,3-tetramethylbutyl)phenyl, 1-naphthyl, 2-naphthyl, 6-methyl-2-naphthyl, 5,6,7,8-tetrahydro-1-naphthyl, 5,6,7,8-tetrahydro-2-naphthyl, fluorenyl, phenanthryl, anthryl, 2-dodecylphenyl, 3-dodecylphenyl, 4-dodecylphenyl, perylenyl, chrysenyl, and pyrenyl.

The aromatic hydrocarbon group represented by $R^2$, $R^4$, and $R^5$ preferably has 6 to 20 carbon atoms, more preferably 6 to 10 carbon atoms, and still more preferably 6 to 8 carbon atoms.

The hydrocarbon group represented by $R^2$, $R^4$, and $R^5$ may be a group in which the above-mentioned hydrocarbon groups (for example, an aromatic hydrocarbon group and at least one of a chain hydrocarbon group and an alicyclic hydrocarbon group) are combined. Examples of thereof include aralkyl groups such as benzyl, (2-methylphenyl) methyl, (3-methylphenyl)methyl, (4-methylphenyl)methyl, (2-ethylphenyl)methyl, (3-ethylphenyl)methyl, (4-ethylphenyl)methyl, (2-(tert-butyl)phenyl)methyl, (3-(tert-butyl)phenyl)methyl, (4-(tert-butyl)phenyl)methyl, (3,5-dimethylphenyl)methyl, 1-phenylethyl, 1-methyl-1-phenylethyl, 1,1-diphenylethyl, (1-naphthyl)methyl, and (2-naphthyl)methyl;

arylalkenyl groups such as 1-phenylethenyl, 2-phenylethenyl (phenylvinyl), 2,2-diphenylethenyl, and 2-phenyl-2-(1-naphthyl)ethenyl;

arylalkynyl groups such as phenylethynyl and 3-phenyl-2-propynyl;

phenyl groups with one or more phenyl groups bonded, such as biphenylyl and terphenylyl; and cyclohexylmethylphenyl, benzylphenyl, and (dimethyl (phenyl)methyl)phenyl.

This group preferably has 7 to 18 carbon atoms, and more preferably 7 to 15 carbon atoms.

The group represented by $R^2$, $R^4$, and $R^5$ may also be a group in which the above-mentioned hydrocarbon groups (for example, a chain hydrocarbon group and an alicyclic hydrocarbon group) are combined. Examples of thereof include alkyl groups with one or more alicyclic hydrocarbon groups bonded, such as cyclopropylmethyl, cyclopropylethyl, cyclobutylmethyl, cyclobutylethyl, cyclopentylmethyl, cyclopentylethyl, cyclohexylmethyl, (2-methylcyclohexyl)methyl, cyclohexylethyl, and adamantylmethyl.

This group preferably has 4 to 15 carbon atoms, and more preferably 4 to 10 carbon atoms.

The C1-C20 hydrocarbon group represented by $R^2$, $R^4$ and $R^5$ optionally has a substituent.

Examples of the substituent include a heterocyclic group optionally having a substituent, a halogen atom, a nitro group, a cyano group, $—OR^{a1}$, $—CO_2R^{a1}$, $—SR^{a1}$, $—SO_2R^{a1}$, $—SO_3R^{a1}$, $—SO_2NR^{a1}$, $R^{a2}$, and $—NR^{a1}R^{a2}$, wherein $R^{a1}$ and $R^{a2}$ are the same as mentioned above.

The heterocyclic group used as the substituent of the C1-C20 hydrocarbon group represented by $R^2$, $R^4$ and $R^5$ may be monocyclic or polycyclic, and is preferably a heterocycle containing a heteroatom as a constituent element of its ring. Examples of the heteroatom include a nitrogen atom, an oxygen atom, and a sulfur atom.

Examples of the heterocycle include the same heterocyclic groups as those used as the substituent of the C2-C20 unsaturated hydrocarbon group represented by $R^1$ and $R^3$.

The heterocyclic group preferably has 2 to 30 carbon atoms, more preferably 3 to 22 carbon atoms, and still more preferably 3 to 20 carbon atoms.

The heterocyclic group optionally has a substituent. Examples of the substituent include a halogen atom, a nitro group, a cyano group, $—OR^{a1}$, $—CO_2R^{a1}$, $—SR^{a}$, $—SO_2R^{a1}$, $—SO_3R^{a1}$, $—SO_2NR^{a1}R^{a2}$, and $—NR^{a1}R^{a2}$, wherein $R^{a1}$ and $R^{a2}$ are the same as mentioned above.

The bonding position of the heterocycle is at a portion where any hydrogen atom contained in each ring is eliminated.

Examples of the halogen atom used as the substituent of the C1-C20 hydrocarbon group represented by $R^2$, $R^4$ and $R^5$ include a fluorine atom, a chlorine atom, a bromine atom, and an iodine atom.

When $R^2$ is a single bond connecting $Z^2$ and $R^1$, a part or the whole of $R^1$ forms a ring together with $*—Z^2—P(=O)—Z^1—*$ (* represents a point of attachment). That is, when $R^2$ is a single bond connecting $Z^2$ and $R^1$, a bond formed by sharing a pair of electrons between $Z^2$ and any carbon atom in the C2-C20 unsaturated hydrocarbon group optionally having a substituent represented by $R^1$ corresponds to a single bond represented by $R^2$.

In the ring formed from a part or the whole of $R^1$ together with $*—Z^2—P(=O)—Z^1—*$ (* represents a point of attachment), an unsaturated bond may be formed between carbon atoms that are constituent elements of the ring, between a carbon atom that is a constituent element of the ring and a carbon atom that is not a constituent element of the ring, or between carbon atoms that are not constituent elements of the ring.

Examples of the halogen atom represented by $X^1$ to $X^{12}$ include a fluorine atom, a chlorine atom, a bromine atom, and an iodine atom. Among these, a fluorine atom is preferable.

The sulfamoyl group represented by $X^1$ to $X^{12}$ is represented by $*—SO_2—NH_2$ (* means a point of attachment).

The sulfamoyl group represented by $X^1$ to $X^{12}$ optionally has a substituent. Examples of the substituent are the same as those for the substituent of the C2-C20 unsaturated hydrocarbon group represented by $R^1$ and $R^3$. Specific examples thereof include an aromatic hydrocarbon group having 6 to 20 carbon atoms and optionally having a substituent, a heterocyclic group optionally having a substituent, a halogen atom, a nitro group, a cyano group, $—OR^{a1}$, $—CO_2R^{a1}$, $—SR^{a1}$, $—SO_2R^{a1}$, $—SO_3R^{a1}$, $—SO_2NR^{a1}R^{a2}$, and $—NR^{a1}R^{a2}$, wherein $R^{a1}$ and $R^{a2}$ are the same as mentioned above.

$—R^4$ represented by $X^1$ to $X^4$ and —R; represented by $X^5$ to $X^{12}$ are preferably a C1-C20 aliphatic hydrocarbon group, more preferably a C1-C20 saturated chain hydrocarbon group, still more preferably a C1-C10 saturated chain hydrocarbon group, further preferably a C1-C5 branched-chain alkyl group, and particularly preferably a tert-butyl group.

In formula (I), $R^1$ is preferably a C2-C20 unsaturated chain hydrocarbon group optionally having a substituent;

more preferably a C2-C15 unsaturated chain hydrocarbon group optionally having a substituent;

still more preferably a C2-C10 unsaturated chain hydrocarbon group optionally having a substituent;

further preferably a C2-C7 unsaturated chain hydrocarbon group optionally having a substituent;

still further preferably an ethenyl group optionally having a substituent, a propenyl group optionally having a substituent, a butenyl group optionally having a substituent, a 3-methyl-2-butenyl group optionally having a substituent, a 3-methyl-1,2-butadienyl group optionally having a substituent, a heptenyl group optionally having a substituent, an ethynyl group optionally having a substituent, a propynyl group optionally having a substituent, a butynyl group optionally having a substituent, a pentynyl group optionally having a substituent, a 1-methyl-3-butynyl group optionally having a substituent, a 1,1-dimethyl-2-propynyl group optionally having a substituent, a hexynyl group optionally having a substituent, a 1-ethyl-3-butynyl group optionally having a substituent, a heptynyl group optionally having a substituent, a 1-ethyl-3-pentynyl group optionally having a substituent, an octynyl group optionally having a substituent, a nonynyl group optionally having a substituent, or a decynyl group optionally having a substituent; and particularly preferably an ethenyl group optionally having a substituent, a propenyl group optionally having a substituent, a butenyl group optionally having a substituent, a 3-methyl-2-butenyl group optionally having a substituent, a 3-methyl-1,2-butadienyl group optionally having a substituent, a heptenyl group optionally having a substituent, an ethynyl group optionally having a substituent, a propynyl group optionally having a substituent, or a butynyl group optionally having a substituent.

When n1 to n4 are 0, from the viewpoint of achieving more reduced color difference before and after post-baking, $R^1$ is preferably an ethenyl group optionally having a substituent, a propenyl group optionally having a substituent, a butenyl group optionally having a substituent, a propynyl group optionally having a substituent, a butynyl group optionally having a substituent, a 1-methyl-3-butynyl group optionally having a substituent, a pentynyl group optionally having a substituent, a hexynyl group optionally having a substituent, a 1-ethyl-3-butynyl group optionally having a substituent, a heptynyl group optionally having a substituent, a 1-ethyl-3-pentynyl group optionally having a substituent, or an octynyl group optionally having a substituent; more preferably a propenyl group optionally having a substituent or a butenyl group optionally having a substituent; and particularly preferably a butenyl group optionally having a substituent.

When the C2-C20 unsaturated hydrocarbon group represented by $R^1$ has a substituent, the substituent is preferably a phenyl group.

$R^2$ is preferably a hydrogen atom, a C6-C20 aromatic hydrocarbon group optionally having a substituent, a C2-C20 unsaturated hydrocarbon group optionally having a substituent, or a single bond connecting $Z^2$ and $R^1$;

more preferably a hydrogen atom, a C6-C10 aromatic hydrocarbon group optionally having a substituent, a C2-C20 unsaturated chain hydrocarbon group optionally having a substituent, or a single bond connecting $Z^2$ and $R^1$;

still more preferably a hydrogen atom, a C6-C8 aromatic hydrocarbon group optionally having a substituent, a C2-C10 unsaturated chain hydrocarbon group optionally having a substituent, or a single bond connecting $Z^2$ and $R^1$;

further preferably a hydrogen atom, a C6-C8 aromatic hydrocarbon group optionally having a substituent, a C2-C7 unsaturated chain hydrocarbon group optionally having a substituent, or a single bond connecting $Z^2$ and $R^1$;

still further preferably a hydrogen atom, a phenyl group optionally having a substituent, an ethenyl group optionally having a substituent, a propenyl group optionally having a substituent, a butenyl group optionally having a substituent, a 3-methyl-2-butenyl group optionally having a substituent, a 3-methyl-1,2-butadienyl group optionally having a substituent, a heptenyl group optionally having a substituent, an ethynyl group optionally having a substituent, a propynyl group optionally having a substituent, a butynyl group optionally having a substituent, a pentynyl group optionally having a substituent, a 1-methyl-3-butynyl group optionally having a substituent, a 1,1-dimethyl-2-propynyl group optionally having a substituent, a hexynyl group optionally having a substituent, a 1-ethyl-3-butynyl group optionally having a substituent, a heptynyl group optionally having a substituent, a 1-ethyl-3-pentynyl group optionally having a substituent, an octynyl group optionally having a substituent, a nonynyl group optionally having a substituent, or a decynyl group optionally having a substituent; and particularly preferably a hydrogen atom, a phenyl group optionally having a substituent, an ethenyl group optionally having a substituent, a propenyl group optionally having a substituent, a butenyl group optionally having a substituent, a 3-methyl-2-butenyl group optionally having a substituent, a 3-methyl-1,2-butadienyl group optionally having a substituent, a heptenyl group optionally having a substituent, an ethynyl group optionally having a substituent, a propynyl group optionally having a substituent, or a butynyl group optionally having a substituent.

When n1 to n4 are 0, from the viewpoint of achieving more reduced color difference before and after post-baking, $R^2$ is preferably a single bond connecting $Z^2$ and $R^1$, a phenyl group optionally having a substituent, an ethenyl group optionally having a substituent, a propenyl group optionally having a substituent, a butenyl group optionally having a substituent, a propynyl group optionally having a substituent, a butynyl group optionally having a substituent, a pentynyl group optionally having a substituent, a 1-methyl-3-butynyl group optionally having a substituent, a 1,1-dimethyl-2-propynyl group optionally having a substituent, a hexynyl group optionally having a substituent, a 1-ethyl-3-butynyl group optionally having a substituent, a heptynyl group optionally having a substituent, a 1-ethyl-3-pentynyl group optionally having a substituent, an octynyl group optionally having a substituent, a nonynyl group optionally having a substituent, or a decynyl group optionally having a substituent; and more preferably an ethenyl group optionally having a substituent, a propenyl group optionally having a substituent or a butenyl group optionally having a substituent.

When the C2-C20 unsaturated hydrocarbon group represented by $R^2$ has a substituent, the substituent is preferably a phenyl group.

When each of $Z^1$ and $Z^2$ is a single bond, and when $Z^1$ is an oxygen atom and $Z^2$ is a single bond, it is preferable that $R^1$ be a C2-C20 unsaturated chain hydrocarbon group optionally having a substituent, and $R^2$ be a C6-C20 aromatic hydrocarbon group optionally having a substituent; and it is more preferable that $R^1$ be an ethenyl group optionally having a substituent, a propenyl group optionally having a substituent, a butenyl group optionally having a substituent, a 3-methyl-2-butenyl group optionally having a substituent, a 3-methyl-1,2-butadienyl group optionally having a substituent, a heptenyl group optionally having a substituent, an ethynyl group optionally having a substituent, a propynyl group optionally having a substituent, a butynyl group optionally having a substituent, a 1-methyl-3-butynyl group optionally having a substituent, a 1,1-dimethyl-2-propynyl group optionally having a substituent, or a 1-ethyl-3-butynyl group optionally having a substituent, and $R^2$ be a C6-C8 aromatic hydrocarbon group optionally having a substituent.

When each of $Z^1$ and $Z^2$ is an oxygen atom, it is preferable that each of $R^1$ and $R^2$ be a C2-C20 unsaturated chain hydrocarbon group optionally having a substituent, or $R^1$ be a C2-C20 unsaturated chain hydrocarbon group optionally having a substituent and $R^2$ be a C6-C20 aromatic hydrocarbon group optionally having a substituent or a single bond connecting $Z^2$ and $R^1$; it is more preferable that each of $R^1$ and $R^2$ be a C2-C10 unsaturated chain hydrocarbon group optionally having a substituent, or $R^1$ be a C2-C10 unsaturated chain hydrocarbon group optionally having a substituent and $R^2$ be a C6-C8 aromatic hydrocarbon group optionally having a substituent or a single bond connecting $Z^2$ and $R^1$; and it is still more preferable that $R^1$ and $R^2$ be each independently an ethenyl group optionally having a substituent, a propenyl group optionally having a substituent, a butenyl group optionally having a substituent, a 3-methyl-2-butenyl group optionally having a substituent, a 3-methyl-1,2-butadienyl group optionally having a substituent, a heptenyl group optionally having a substituent, an ethynyl group optionally having a substituent, a propynyl group optionally having a substituent, a butynyl group optionally having a substituent, a pentynyl group optionally having a substituent, a 1-methyl-3-butynyl optionally having a substituent, a 1,1-dimethyl-2-propynyl group optionally having a substituent, a hexynyl group optionally having a substituent, a 1-ethyl-3-butynyl group optionally having a substituent, a heptynyl group optionally having a substituent, a 1-ethyl-3-pentynyl group optionally having a substituent, an octynyl group optionally having a substituent, a nonynyl group optionally having a substituent, or a decynyl group optionally having a substituent.

When $Z^1$ is a single bond and $Z^2$ is an oxygen atom, it is preferable that $R^1$ be a C2-C20 unsaturated chain hydrocarbon group optionally having a substituent, and $R^2$ be a C6-C20 aromatic hydrocarbon group optionally having a substituent or a hydrogen atom; and it is more preferable that $R^1$ be an ethenyl group optionally having a substituent, a propenyl group optionally having a substituent, a butenyl group optionally having a substituent, a 3-methyl-2-butenyl group optionally having a substituent, a 3-methyl-1,2-butadienyl group optionally having a substituent, a heptenyl group optionally having a substituent, an ethynyl group optionally having a substituent, a propynyl group optionally having a substituent, a butynyl group optionally having a substituent, a 1-methyl-3-butynyl group optionally having a substituent, a 1,1-dimethyl-2-propynyl group optionally having a substituent, or a 1-ethyl-3-butynyl group optionally having a substituent, and $R^2$ be a C6-C8 aromatic hydrocarbon group optionally having a substituent or a hydrogen atom.

$X^1$ to $X^4$ are each independently preferably —$R^4$ or a halogen atom. From the viewpoint of achieving more reduced color difference before and after post-baking, $X^1$ to $X^4$ are each independently more preferably a halogen atom.

n1 to n4 are each independently preferably 0 to 2, and more preferably 0 to 1. Comparing the case where n1 to n4 are 0 with the case where n1 to n4 are 1 or more, the case where n1 to n4 are 1 or more is preferable because a color difference before and after post-baking can be further reduced, and a change in transmittance at 500 to 650 nm before and after post-baking can be reduced.

In formula (II), $R^3$ is preferably a C2-C20 unsaturated chain hydrocarbon group optionally having a substituent;

more preferably a C2-C10 unsaturated chain hydrocarbon group optionally having a substituent;

still more preferably a C2-C5 unsaturated chain hydrocarbon group optionally having a substituent; and particularly preferably an ethenyl group optionally having a substituent, a propenyl group optionally having a substituent, a butenyl group optionally having a substituent, an ethynyl group optionally having a substituent, a propynyl group optionally having a substituent, or a butynyl group optionally having a substituent.

When the C2-C20 unsaturated hydrocarbon group represented by $R^3$ has a substituent, the substituent is preferably a phenyl group.

$X^5$ to $X^{12}$ are each independently preferably —$R^5$ or a halogen atom.

n5 to n12 are each independently preferably 0 to 2, and more preferably 0 to 1.

As the compound represented by formula (I), compounds represented by formulas (IA) to (IF) are preferable.

From the viewpoint of achieving more reduced color difference before and after post-baking and achieving reduced change in transmittance at 500 to 650 nm before and after post-baking, as the compound represented by formula (I), compounds represented by formulas (IB) to (IF) are more preferable.

(IA)

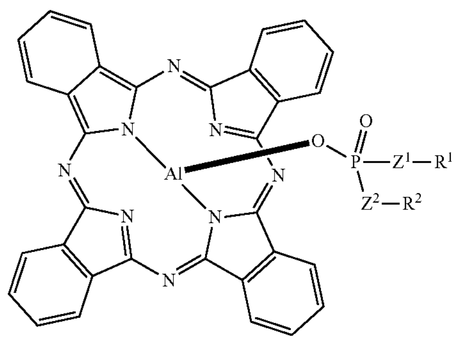

(IB)

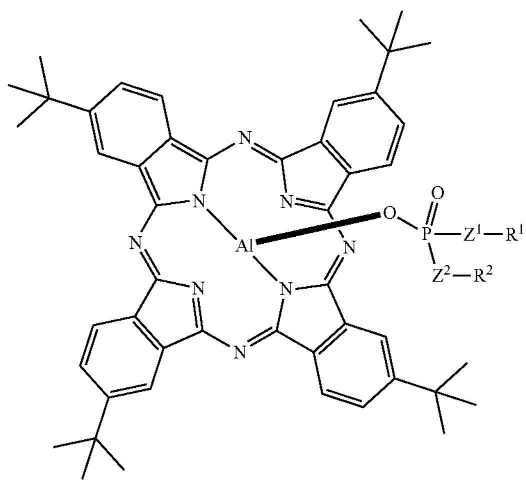

(IC)

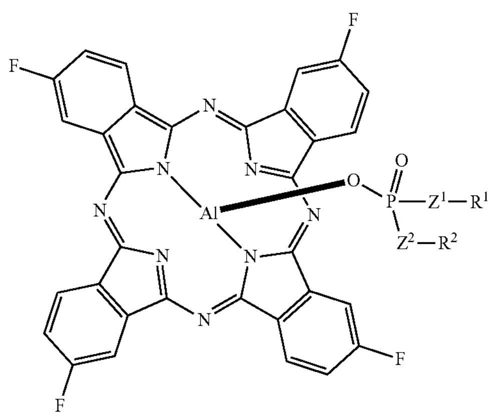

-continued (ID)

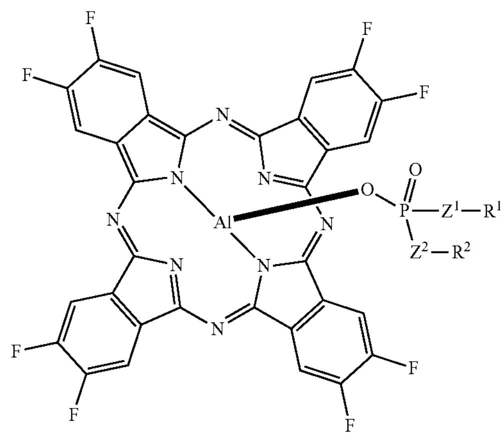

(IE)

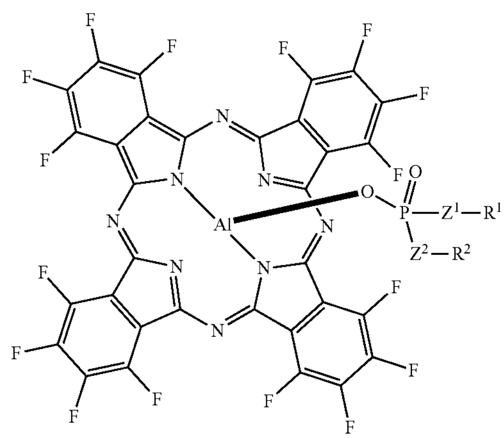

(IF)

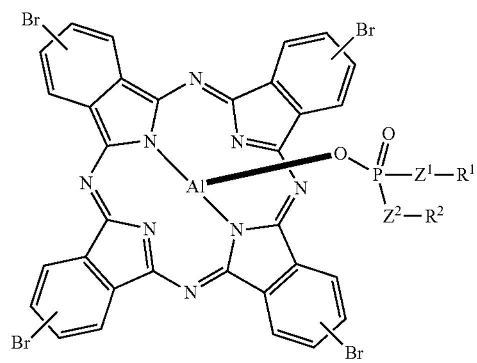

In formulas (IA) to (IF), $R^1$, $R^2$, $Z^1$, and $Z^2$ are the same as mentioned above.

Examples of compounds represented by formula (IA) include compounds represented by formulas (IA-1) to (IA-272) shown in Tables 1 to 5.

Examples of compounds represented by formula (IB) include compounds represented by formulas (IB-1) to (IB-272) shown in Tables 6 to 10.

Examples of compounds represented by formula (IC) include compounds represented by formulas (IC-1) to (IC-272) shown in Tables 11 to 15.

Examples of compounds represented by formula (ID) include compounds represented by formulas (ID-1) to (ID-272) shown in Tables 16 to 20.

Examples of compounds represented by formula (IE) include compounds represented by formulas (IE-1) to (IE-272) shown in Tables 21 to 25.

Examples of compounds represented by formula (IF) include compounds represented by formulas (IF-1) to (IF-272) shown in Tables 26 to 30.

The codes shown in the column "$R^1$" and the column "$R^2$" in Tables 1 to 3, 5 to 8, 10 to 13, 15 to 18, 20 to 23, 25 to 28, and 30 correspond to the respective groups represented by formulas (i-1) to (i-22) and (ii-1) to (ii-2).

The codes shown in the column "Group that $R^1$ and $R^2$ form" in Tables 4, 9, 14, 19, 24, and 29 correspond to the respective groups represented by formulas (ca-1) to (ca-2), (cb-1), and (cc-1). "Group that $R^1$ and $R^2$ form" means a group that is connected to a point of attachment represented by "*" in *—$Z^2$—P(═O)—$Z^1$—* when $R^2$ is a single bond connecting $Z^2$ and $R^1$.

In formulas (ca-1) to (ca-2), $R^6$ and $R^7$ each independently represent a hydrogen atom or an alkyl group having 1 to 8 carbon atoms and optionally having a substituent. Examples of the substituent that the C1-C8 alkyl group optionally has include the same substituents as those that the C2-C20 unsaturated hydrocarbon group represented by $R^1$ and $R^3$ optionally has.

(i-1)

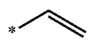

(i-2)

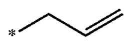

(i-3)

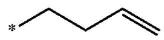

(i-4)

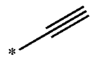

(i-5)

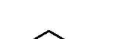

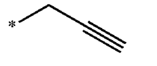

(i-6)

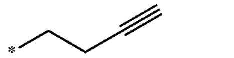

(i-7)

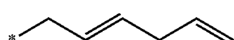

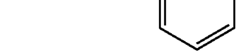

(i-8)

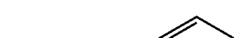

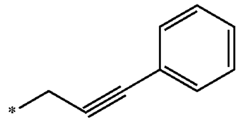

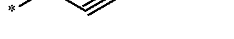

(i-9)

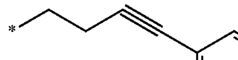

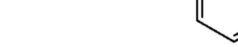

(i-10)

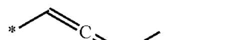

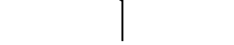

(i-11)

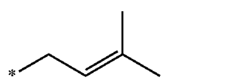

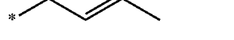

(i-12)

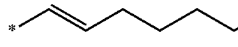

-continued (i-13)

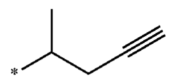

(i-14)

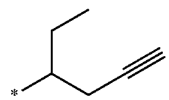

(i-15)

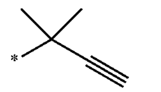

(i-16)

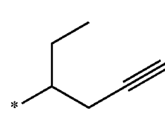

(i-17)

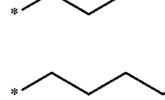

(i-18)

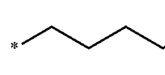

(i-19)

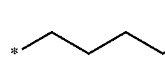

(i-20)

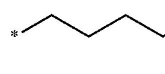

(i-21)

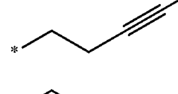

(i-22)

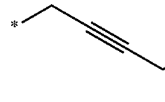

(ii-1)

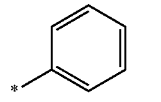

(ii-2)

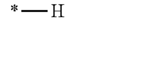

(ca-1)

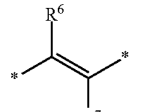

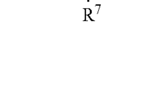

(ca-2)

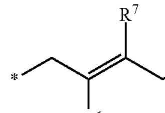

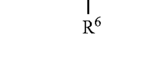

(cb-1)

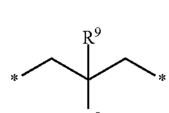

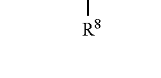

-continued (cc-1)

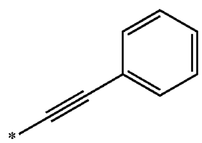

*represents a point of attachment.

TABLE 1

| | $Z^1$ | $Z^2$ | $R^1$ | $R^2$ |
|---|---|---|---|---|
| (IA-1) | single bond | single bond | i-1 | ii-1 |
| (IA-2) | single bond | single bond | i-2 | ii-1 |
| (IA-3) | single bond | single bond | i-3 | ii-1 |
| (IA-4) | single bond | single bond | i-4 | ii-1 |
| (IA-5) | single bond | single bond | i-5 | ii-1 |
| (IA-6) | single bond | single bond | i-6 | ii-1 |
| (IA-7) | single bond | single bond | i-7 | ii-1 |
| (IA-8) | single bond | single bond | i-8 | ii-1 |
| (IA-9) | single bond | single bond | i-9 | ii-1 |
| (IA-10) | single bond | single bond | i-10 | ii-1 |
| (IA-11) | single bond | single bond | i-11 | ii-1 |
| (IA-12) | single bond | single bond | i-12 | ii-1 |
| (IA-13) | single bond | single bond | i-1 | i-1 |
| (IA-14) | single bond | single bond | i-2 | i-1 |
| (IA-15) | single bond | single bond | i-3 | i-1 |
| (IA-16) | single bond | single bond | i-4 | i-1 |
| (IA-17) | single bond | single bond | i-5 | i-1 |
| (IA-18) | single bond | single bond | i-6 | i-1 |
| (IA-19) | single bond | single bond | i-7 | i-1 |
| (IA-20) | single bond | single bond | i-8 | i-1 |
| (IA-21) | single bond | single bond | i-9 | i-1 |
| (IA-22) | single bond | single bond | i-10 | i-1 |
| (IA-23) | single bond | single bond | i-11 | i-1 |
| (IA-24) | single bond | single bond | i-12 | i-1 |
| (IA-25) | single bond | single bond | i-2 | i-2 |
| (IA-26) | single bond | single bond | i-3 | i-2 |
| (IA-27) | single bond | single bond | i-4 | i-2 |
| (IA-28) | single bond | single bond | i-5 | i-2 |
| (IA-29) | single bond | single bond | i-6 | i-2 |
| (IA-30) | single bond | single bond | i-7 | i-2 |
| (IA-31) | single bond | single bond | i-8 | i-2 |
| (IA-32) | single bond | single bond | i-9 | i-2 |
| (IA-33) | single bond | single bond | i-10 | i-2 |
| (IA-34) | single bond | single bond | i-11 | i-2 |
| (IA-35) | single bond | single bond | i-12 | i-2 |
| (IA-36) | single bond | single bond | i-3 | i-3 |
| (IA-37) | single bond | single bond | i-4 | i-3 |
| (IA-38) | single bond | single bond | i-5 | i-3 |
| (IA-39) | single bond | single bond | i-6 | i-3 |
| (IA-40) | single bond | single bond | i-7 | i-3 |
| (IA-41) | single bond | single bond | i-8 | i-3 |
| (IA-42) | single bond | single bond | i-9 | i-3 |
| (IA-43) | single bond | single bond | i-10 | i-3 |
| (IA-44) | single bond | single bond | i-11 | i-3 |
| (IA-45) | single bond | single bond | i-12 | i-3 |
| (IA-46) | single bond | single bond | i-4 | i-4 |
| (IA-47) | single bond | single bond | i-5 | i-4 |
| (IA-48) | single bond | single bond | i-6 | i-4 |
| (IA-49) | single bond | single bond | i-7 | i-4 |
| (IA-50) | single bond | single bond | i-8 | i-4 |
| (IA-51) | single bond | single bond | i-9 | i-4 |
| (IA-52) | single bond | single bond | i-10 | i-4 |
| (IA-53) | single bond | single bond | i-11 | i-4 |
| (IA-54) | single bond | single bond | i-12 | i-4 |
| (IA-55) | single bond | single bond | i-5 | i-5 |
| (IA-56) | single bond | single bond | i-6 | i-5 |
| (IA-57) | single bond | single bond | i-7 | i-5 |
| (IA-58) | single bond | single bond | i-8 | i-5 |
| (IA-59) | single bond | single bond | i-9 | i-5 |
| (IA-60) | single bond | single bond | i-10 | i-5 |

TABLE 2

| | $Z^1$ | $Z^2$ | $R^1$ | $R^2$ |
|---|---|---|---|---|
| (IA-61) | single bond | single bond | i-11 | i-5 |
| (IA-62) | single bond | single bond | i-12 | i-5 |
| (IA-63) | single bond | single bond | i-6 | i-6 |
| (IA-64) | single bond | single bond | i-7 | i-6 |
| (IA-65) | single bond | single bond | i-8 | i-6 |
| (IA-66) | single bond | single bond | i-9 | i-6 |
| (IA-67) | single bond | single bond | i-10 | i-6 |
| (IA-68) | single bond | single bond | i-11 | i-6 |
| (IA-69) | single bond | single bond | i-12 | i-6 |
| (IA-70) | single bond | single bond | i-7 | i-7 |
| (IA-71) | single bond | single bond | i-8 | i-7 |
| (IA-72) | single bond | single bond | i-9 | i-7 |
| (IA-73) | single bond | single bond | i-10 | i-7 |
| (IA-74) | single bond | single bond | i-11 | i-7 |
| (IA-75) | single bond | single bond | i-12 | i-7 |
| (IA-76) | single bond | single bond | i-8 | i-8 |
| (IA-77) | single bond | single bond | i-9 | i-8 |
| (IA-78) | single bond | single bond | i-10 | i-8 |
| (IA-79) | single bond | single bond | i-11 | i-8 |
| (IA-80) | single bond | single bond | i-12 | i-8 |
| (IA-81) | single bond | single bond | i-9 | i-9 |
| (IA-82) | single bond | single bond | i-10 | i-9 |
| (IA-83) | single bond | single bond | i-11 | i-9 |
| (IA-84) | single bond | single bond | i-12 | i-9 |
| (IA-85) | single bond | single bond | i-10 | i-10 |
| (IA-86) | single bond | single bond | i-11 | i-10 |
| (IA-87) | single bond | single bond | i-12 | i-10 |
| (IA-88) | single bond | single bond | i-11 | i-11 |
| (IA-89) | single bond | single bond | i-12 | i-11 |
| (IA-90) | single bond | single bond | i-12 | i-12 |
| (IA-91) | oxygen atom | oxygen atom | i-1 | ii-1 |
| (IA-92) | oxygen atom | oxygen atom | i-2 | ii-1 |
| (IA-93) | oxygen atom | oxygen atom | i-3 | ii-1 |
| (IA-94) | oxygen atom | oxygen atom | i-4 | ii-1 |
| (IA-95) | oxygen atom | oxygen atom | i-5 | ii-1 |
| (IA-96) | oxygen atom | oxygen atom | i-6 | ii-1 |
| (IA-97) | oxygen atom | oxygen atom | i-7 | ii-1 |
| (IA-98) | oxygen atom | oxygen atom | i-8 | ii-1 |
| (IA-99) | oxygen atom | oxygen atom | i-9 | ii-1 |
| (IA-100) | oxygen atom | oxygen atom | i-10 | ii-1 |
| (IA-101) | oxygen atom | oxygen atom | i-11 | ii-1 |
| (IA-102) | oxygen atom | oxygen atom | i-12 | ii-1 |
| (IA-103) | oxygen atom | oxygen atom | i-1 | i-1 |
| (IA-104) | oxygen atom | oxygen atom | i-2 | i-1 |
| (IA-105) | oxygen atom | oxygen atom | i-3 | i-1 |
| (IA-106) | oxygen atom | oxygen atom | i-4 | i-1 |
| (IA-107) | oxygen atom | oxygen atom | i-5 | i-1 |
| (IA-108) | oxygen atom | oxygen atom | i-6 | i-1 |
| (IA-109) | oxygen atom | oxygen atom | i-7 | i-1 |
| (IA-110) | oxygen atom | oxygen atom | i-8 | i-1 |
| (IA-111) | oxygen atom | oxygen atom | i-9 | i-1 |
| (IA-112) | oxygen atom | oxygen atom | i-10 | i-1 |
| (IA-113) | oxygen atom | oxygen atom | i-11 | i-1 |
| (IA-114) | oxygen atom | oxygen atom | i-12 | i-1 |
| (IA-115) | oxygen atom | oxygen atom | i-2 | i-2 |
| (IA-116) | oxygen atom | oxygen atom | i-3 | i-2 |
| (IA-117) | oxygen atom | oxygen atom | i-4 | i-2 |
| (IA-118) | oxygen atom | oxygen atom | i-5 | i-2 |
| (IA-119) | oxygen atom | oxygen atom | i-6 | i-2 |
| (IA-120) | oxygen atom | oxygen atom | i-7 | i-2 |

TABLE 3

| | $Z^1$ | $Z^2$ | $R^1$ | $R^2$ |
|---|---|---|---|---|
| (IA-121) | oxygen atom | oxygen atom | i-8 | i-2 |
| (IA-122) | oxygen atom | oxygen atom | i-9 | i-2 |
| (IA-123) | oxygen atom | oxygen atom | i-10 | i-2 |
| (IA-124) | oxygen atom | oxygen atom | i-11 | i-2 |
| (IA-125) | oxygen atom | oxygen atom | i-12 | i-2 |
| (IA-126) | oxygen atom | oxygen atom | i-3 | i-3 |
| (IA-127) | oxygen atom | oxygen atom | i-4 | i-3 |
| (IA-128) | oxygen atom | oxygen atom | i-5 | i-3 |
| (IA-129) | oxygen atom | oxygen atom | i-6 | i-3 |
| (IA-130) | oxygen atom | oxygen atom | i-7 | i-3 |

TABLE 3-continued

| | $Z^1$ | $Z^2$ | $R^1$ | $R^2$ |
|---|---|---|---|---|
| (IA-131) | oxygen atom | oxygen atom | i-8 | i-3 |
| (IA-132) | oxygen atom | oxygen atom | i-9 | i-3 |
| (IA-133) | oxygen atom | oxygen atom | i-10 | i-3 |
| (IA-134) | oxygen atom | oxygen atom | i-11 | i-3 |
| (IA-135) | oxygen atom | oxygen atom | i-12 | i-3 |
| (IA-136) | oxygen atom | oxygen atom | i-4 | i-4 |
| (IA-137) | oxygen atom | oxygen atom | i-5 | i-4 |
| (IA-138) | oxygen atom | oxygen atom | i-6 | i-4 |
| (IA-139) | oxygen atom | oxygen atom | i-7 | i-4 |
| (IA-140) | oxygen atom | oxygen atom | i-8 | i-4 |
| (IA-141) | oxygen atom | oxygen atom | i-9 | i-4 |
| (IA-142) | oxygen atom | oxygen atom | i-10 | i-4 |
| (IA-143) | oxygen atom | oxygen atom | i-11 | i-4 |
| (IA-144) | oxygen atom | oxygen atom | i-12 | i-4 |
| (IA-145) | oxygen atom | oxygen atom | i-5 | i-5 |
| (IA-146) | oxygen atom | oxygen atom | i-6 | i-5 |
| (IA-147) | oxygen atom | oxygen atom | i-7 | i-5 |
| (IA-148) | oxygen atom | oxygen atom | i-8 | i-5 |
| (IA-149) | oxygen atom | oxygen atom | i-9 | i-5 |
| (IA-150) | oxygen atom | oxygen atom | i-10 | i-5 |
| (IA-151) | oxygen atom | oxygen atom | i-11 | i-5 |
| (IA-152) | oxygen atom | oxygen atom | i-12 | i-5 |
| (IA-153) | oxygen atom | oxygen atom | i-6 | i-6 |
| (IA-154) | oxygen atom | oxygen atom | i-7 | i-6 |
| (IA-155) | oxygen atom | oxygen atom | i-8 | i-6 |
| (IA-156) | oxygen atom | oxygen atom | i-9 | i-6 |
| (IA-157) | oxygen atom | oxygen atom | i-10 | i-6 |
| (IA-158) | oxygen atom | oxygen atom | i-11 | i-6 |
| (IA-159) | oxygen atom | oxygen atom | i-12 | i-6 |
| (IA-160) | oxygen atom | oxygen atom | i-7 | i-7 |
| (IA-161) | oxygen atom | oxygen atom | i-8 | i-7 |
| (IA-162) | oxygen atom | oxygen atom | i-9 | i-7 |
| (IA-163) | oxygen atom | oxygen atom | i-10 | i-7 |
| (IA-164) | oxygen atom | oxygen atom | i-11 | i-7 |
| (IA-165) | oxygen atom | oxygen atom | i-12 | i-7 |
| (IA-166) | oxygen atom | oxygen atom | i-8 | i-8 |
| (IA-167) | oxygen atom | oxygen atom | i-9 | i-8 |
| (IA-168) | oxygen atom | oxygen atom | i-10 | i-8 |
| (IA-169) | oxygen atom | oxygen atom | i-11 | i-8 |
| (IA-170) | oxygen atom | oxygen atom | i-12 | i-8 |
| (IA-171) | oxygen atom | oxygen atom | i-9 | i-9 |
| (IA-172) | oxygen atom | oxygen atom | i-10 | i-9 |
| (IA-173) | oxygen atom | oxygen atom | i-11 | i-9 |
| (IA-174) | oxygen atom | oxygen atom | i-12 | i-9 |
| (IA-175) | oxygen atom | oxygen atom | i-10 | i-10 |
| (IA-176) | oxygen atom | oxygen atom | i-11 | i-10 |
| (IA-177) | oxygen atom | oxygen atom | i-12 | i-10 |
| (IA-178) | oxygen atom | oxygen atom | i-11 | i-11 |
| (IA-179) | oxygen atom | oxygen atom | i-12 | i-11 |
| (IA-180) | oxygen atom | oxygen atom | i-12 | i-12 |

TABLE 4

| | $Z^1$ | $Z^2$ | Group that $R^1$ and $R^2$ form | | $Z^1$ | $Z^2$ | Group that $R^1$ and $R^2$ form | $R^8$ | $R^9$ |
|---|---|---|---|---|---|---|---|---|---|
| (IA-181) | oxygen atom | oxygen atom | ca-1 | (IA-185) | oxygen atom | oxygen atom | cb-1 | cc-1 | OH |
| (IA-182) | oxygen atom | oxygen atom | ca-2 | (IA-186) | single bond | single bond | cb-1 | cc-1 | OH |
| (IA-183) | single bond | single bond | ca-1 | (IA-187) | oxygen atom | oxygen atom | cb-1 | cc-1 | H |
| (IA-184) | single bond | single bond | ca-2 | (IA-188) | single bond | single bond | cb-1 | cc-1 | H |

TABLE 5

| | $Z^1$ | $Z^2$ | $R^1$ | $R^2$ |
|---|---|---|---|---|
| (IA-189) | single bond | single bond | i-13 | ii-1 |
| (IA-190) | single bond | single bond | i-14 | ii-1 |
| (IA-191) | single bond | single bond | i-15 | ii-1 |
| (IA-192) | single bond | single bond | i-16 | ii-1 |
| (IA-193) | single bond | single bond | i-17 | ii-1 |
| (IA-194) | single bond | single bond | i-18 | ii-1 |
| (IA-195) | single bond | single bond | i-19 | ii-1 |
| (IA-196) | single bond | single bond | i-20 | ii-1 |
| (IA-197) | single bond | single bond | i-21 | ii-1 |
| (IA-198) | single bond | single bond | i-22 | ii-1 |
| (IA-199) | single bond | single bond | i-13 | i-13 |
| (IA-200) | single bond | single bond | i-14 | i-14 |
| (IA-201) | single bond | single bond | i-15 | i-15 |
| (IA-202) | single bond | single bond | i-16 | i-16 |
| (IA-203) | single bond | single bond | i-17 | i-17 |
| (IA-204) | single bond | single bond | i-18 | i-18 |
| (IA-205) | single bond | single bond | i-19 | i-19 |
| (IA-206) | single bond | single bond | i-20 | i-20 |
| (IA-207) | single bond | single bond | i-21 | i-21 |
| (IA-208) | single bond | single bond | i-22 | i-22 |
| (IA-209) | oxygen atom | oxygen atom | i-13 | ii-1 |
| (IA-210) | oxygen atom | oxygen atom | i-14 | ii-1 |
| (IA-211) | oxygen atom | oxygen atom | i-15 | ii-1 |
| (IA-212) | oxygen atom | oxygen atom | i-16 | ii-1 |
| (IA-213) | oxygen atom | oxygen atom | i-17 | ii-1 |
| (IA-214) | oxygen atom | oxygen atom | i-18 | ii-1 |
| (IA-215) | oxygen atom | oxygen atom | i-19 | ii-1 |
| (IA-216) | oxygen atom | oxygen atom | i-20 | ii-1 |
| (IA-217) | oxygen atom | oxygen atom | i-21 | ii-1 |
| (IA-218) | oxygen atom | oxygen atom | i-22 | ii-1 |
| (IA-219) | oxygen atom | oxygen atom | i-13 | i-13 |
| (IA-220) | oxygen atom | oxygen atom | i-14 | i-14 |
| (IA-221) | oxygen atom | oxygen atom | i-15 | i-15 |
| (IA-222) | oxygen atom | oxygen atom | i-16 | i-16 |
| (IA-223) | oxygen atom | oxygen atom | i-17 | i-17 |
| (IA-224) | oxygen atom | oxygen atom | i-18 | i-18 |
| (IA-225) | oxygen atom | oxygen atom | i-19 | i-19 |
| (IA-226) | oxygen atom | oxygen atom | i-20 | i-20 |
| (IA-227) | oxygen atom | oxygen atom | i-21 | i-21 |
| (IA-228) | oxygen atom | oxygen atom | i-22 | i-22 |
| (IA-229) | oxygen atom | single bond | i-1 | ii-1 |
| (IA-230) | oxygen atom | single bond | i-2 | ii-1 |
| (IA-231) | oxygen atom | single bond | i-3 | ii-1 |
| (IA-232) | oxygen atom | single bond | i-4 | ii-1 |
| (IA-233) | oxygen atom | single bond | i-5 | ii-1 |
| (IA-234) | oxygen atom | single bond | i-6 | ii-1 |
| (IA-235) | oxygen atom | single bond | i-7 | ii-1 |
| (IA-236) | oxygen atom | single bond | i-8 | ii-1 |
| (IA-237) | oxygen atom | single bond | i-9 | ii-1 |
| (IA-238) | oxygen atom | single bond | i-10 | ii-1 |
| (IA-239) | oxygen atom | single bond | i-11 | ii-1 |
| (IA-240) | oxygen atom | single bond | i-12 | ii-1 |
| (IA-241) | oxygen atom | single bond | i-13 | ii-1 |
| (IA-242) | oxygen atom | single bond | i-14 | ii-1 |
| (IA-243) | oxygen atom | single bond | i-15 | ii-1 |

TABLE 5-continued

| | $Z^1$ | $Z^2$ | $R^1$ | $R^2$ |
|---|---|---|---|---|
| (IA-244) | oxygen atom | single bond | i-16 | ii-1 |
| (IA-245) | oxygen atom | single bond | i-17 | ii-1 |
| (IA-246) | oxygen atom | single bond | i-18 | ii-1 |
| (IA-247) | oxygen atom | single bond | i-19 | ii-1 |

TABLE 5-continued

| | $Z^1$ | $Z^2$ | $R^1$ | $R^2$ |
|---|---|---|---|---|
| (IA-248) | oxygen atom | single bond | i-20 | ii-1 |
| (IA-249) | oxygen atom | single bond | i-21 | ii-1 |
| (IA-250) | oxygen atom | single bond | i-22 | ii-1 |
| (IA-251) | single bond | oxygen atom | i-1 | ii-2 |
| (IA-252) | single bond | oxygen atom | i-2 | ii-2 |
| (IA-253) | single bond | oxygen atom | i-3 | ii-2 |
| (IA-254) | single bond | oxygen atom | i-4 | ii-2 |
| (IA-255) | single bond | oxygen atom | i-5 | ii-2 |
| (IA-256) | single bond | oxygen atom | i-6 | ii-2 |
| (IA-257) | single bond | oxygen atom | i-7 | ii-2 |
| (IA-258) | single bond | oxygen atom | i-8 | ii-2 |
| (IA-259) | single bond | oxygen atom | i-9 | ii-2 |
| (IA-260) | single bond | oxygen atom | i-10 | ii-2 |
| (IA-261) | single bond | oxygen atom | i-11 | ii-2 |
| (IA-262) | single bond | oxygen atom | i-12 | ii-2 |
| (IA-263) | single bond | oxygen atom | i-13 | ii-2 |
| (IA-264) | single bond | oxygen atom | i-14 | ii-2 |
| (IA-265) | single bond | oxygen atom | i-15 | ii-2 |
| (IA-266) | single bond | oxygen atom | i-16 | ii-2 |
| (IA-267) | single bond | oxygen atom | i-17 | ii-2 |
| (IA-268) | single bond | oxygen atom | i-18 | ii-2 |
| (IA-269) | single bond | oxygen atom | i-19 | ii-2 |
| (IA-270) | single bond | oxygen atom | i-20 | ii-2 |
| (IA-271) | single bond | oxygen atom | i-21 | ii-2 |
| (IA-272) | single bond | oxygen atom | i-22 | ii-2 |

As the compound represented by formula (IA), compounds represented by formulas (IA-1) to (IA-12), (IA-91) to (IA-102), (IA-103) to (IA-108), (IA-115) to (IA-119), (IA-126) to (IA-129), (IA-136) to (IA-138), (IA-145) to (IA-146), (IA-153), (IA-166), (IA-181) to (IA-197), (IA-209) to (IA-220), (IA-222) to (IA-227), (IA-229) to (IA-249), and (IA-251) to (IA-272) are preferable;

compounds represented by formulas (IA-1) to (IA-12), (IA-103) to (IA-105), (IA-115) to (IA-116), (IA-126), (IA-136) to (IA-138), (IA-145) to (IA-146), (IA-153), (IA-166), (IA-181) to (IA-182), (IA-185) to (IA-186), (IA-189) to (IA-197), (IA-209) to (IA-220), (IA-222) to (IA-227), (IA-229) to (IA-249), and (IA-251) to (IA-272) are more preferable; and compounds represented by formulas (IA-1), (IA-10), (IA-11), (IA-12), (IA-115), (IA-126), (IA-145), (IA-153), (IA-181), (IA-182) (particularly, one in which $R^6$ and $R^7$ are hydrogen atoms), (IA-185), (IA-209), (IA-210), (IA-219), (IA-220), (IA-222) to (IA-227), (IA-234), and (IA-251) are still more preferable.

TABLE 6

| | $Z^1$ | $Z^2$ | $R^1$ | $R^2$ |
|---|---|---|---|---|
| (IB-1) | single bond | single bond | i-1 | ii-1 |
| (IB-2) | single bond | single bond | i-2 | ii-1 |
| (IB-3) | single bond | single bond | i-3 | ii-1 |
| (IB-4) | single bond | single bond | i-4 | ii-1 |
| (IB-5) | single bond | single bond | i-5 | ii-1 |
| (IB-6) | single bond | single bond | i-6 | ii-1 |
| (IB-7) | single bond | single bond | i-7 | ii-1 |
| (IB-8) | single bond | single bond | i-8 | ii-1 |
| (IB-9) | single bond | single bond | i-9 | ii-1 |
| (IB-10) | single bond | single bond | i-10 | ii-1 |
| (IB-11) | single bond | single bond | i-11 | ii-1 |
| (IB-12) | single bond | single bond | i-12 | ii-1 |
| (IB-13) | single bond | single bond | i-1 | i-1 |
| (IB-14) | single bond | single bond | i-2 | i-1 |
| (IB-15) | single bond | single bond | i-3 | i-1 |
| (IB-16) | single bond | single bond | i-4 | i-1 |
| (IB-17) | single bond | single bond | i-5 | i-1 |
| (IB-18) | single bond | single bond | i-6 | i-1 |
| (IB-19) | single bond | single bond | i-7 | i-1 |

TABLE 6-continued

| | $Z^1$ | $Z^2$ | $R^1$ | $R^2$ |
|---|---|---|---|---|
| (IB-20) | single bond | single bond | i-8 | i-1 |
| (IB-21) | single bond | single bond | i-9 | i-1 |
| (IB-22) | single bond | single bond | i-10 | i-1 |
| (IB-23) | single bond | single bond | i-11 | i-1 |
| (IB-24) | single bond | single bond | i-12 | i-1 |
| (IB-25) | single bond | single bond | i-2 | i-2 |
| (IB-26) | single bond | single bond | i-3 | i-2 |
| (IB-27) | single bond | single bond | i-4 | i-2 |
| (IB-28) | single bond | single bond | i-5 | i-2 |
| (IB-29) | single bond | single bond | i-6 | i-2 |
| (IB-30) | single bond | single bond | i-7 | i-2 |
| (IB-31) | single bond | single bond | i-8 | i-2 |
| (IB-32) | single bond | single bond | i-9 | i-2 |
| (IB-33) | single bond | single bond | i-10 | i-2 |
| (IB-34) | single bond | single bond | i-11 | i-2 |
| (IB-35) | single bond | single bond | i-12 | i-2 |
| (IB-36) | single bond | single bond | i-3 | i-3 |
| (IB-37) | single bond | single bond | i-4 | i-3 |
| (IB-38) | single bond | single bond | i-5 | i-3 |
| (IB-39) | single bond | single bond | i-6 | i-3 |
| (IB-40) | single bond | single bond | i-7 | i-3 |
| (IB-41) | single bond | single bond | i-8 | i-3 |
| (IB-42) | single bond | single bond | i-9 | i-3 |
| (IB-43) | single bond | single bond | i-10 | i-3 |
| (IB-44) | single bond | single bond | i-11 | i-3 |
| (IB-45) | single bond | single bond | i-12 | i-3 |
| (IB-46) | single bond | single bond | i-4 | i-4 |
| (IB-47) | single bond | single bond | i-5 | i-4 |
| (IB-48) | single bond | single bond | i-6 | i-4 |
| (IB-49) | single bond | single bond | i-7 | i-4 |
| (IB-50) | single bond | single bond | i-8 | i-4 |
| (IB-51) | single bond | single bond | i-9 | i-4 |
| (IB-52) | single bond | single bond | i-10 | i-4 |
| (IB-53) | single bond | single bond | i-11 | i-4 |
| (IB-54) | single bond | single bond | i-12 | i-4 |
| (IB-55) | single bond | single bond | i-5 | i-5 |
| (IB-56) | single bond | single bond | i-6 | i-5 |
| (IB-57) | single bond | single bond | i-7 | i-5 |
| (IB-58) | single bond | single bond | i-8 | i-5 |
| (IB-59) | single bond | single bond | i-9 | i-5 |
| (IB-60) | single bond | single bond | i-10 | i-5 |

TABLE 7

| | $Z^1$ | $Z^2$ | $R^1$ | $R^2$ |
|---|---|---|---|---|
| (IB-61) | single bond | single bond | i-11 | i-5 |
| (IB-62) | single bond | single bond | i-12 | i-5 |
| (IB-63) | single bond | single bond | i-6 | i-6 |
| (IB-64) | single bond | single bond | i-7 | i-6 |
| (IB-65) | single bond | single bond | i-8 | i-6 |
| (IB-66) | single bond | single bond | i-9 | i-6 |
| (IB-67) | single bond | single bond | i-10 | i-6 |
| (IB-68) | single bond | single bond | i-11 | i-6 |
| (IB-69) | single bond | single bond | i-12 | i-6 |
| (IB-70) | single bond | single bond | i-7 | i-7 |
| (IB-71) | single bond | single bond | i-8 | i-7 |
| (IB-72) | single bond | single bond | i-9 | i-7 |
| (IB-73) | single bond | single bond | i-10 | i-7 |
| (IB-74) | single bond | single bond | i-11 | i-7 |
| (IB-75) | single bond | single bond | i-12 | i-7 |
| (IB-76) | single bond | single bond | i-8 | i-8 |
| (IB-77) | single bond | single bond | i-9 | i-8 |
| (IB-78) | single bond | single bond | i-10 | i-8 |
| (IB-79) | single bond | single bond | i-11 | i-8 |
| (IB-80) | single bond | single bond | i-12 | i-8 |
| (IB-81) | single bond | single bond | i-9 | i-9 |
| (IB-82) | single bond | single bond | i-10 | i-9 |
| (IB-83) | single bond | single bond | i-11 | i-9 |
| (IB-84) | single bond | single bond | i-12 | i-9 |
| (IB-85) | single bond | single bond | i-10 | i-10 |
| (IB-86) | single bond | single bond | i-11 | i-10 |
| (IB-87) | single bond | single bond | i-12 | i-10 |
| (IB-88) | single bond | single bond | i-11 | i-11 |
| (IB-89) | single bond | single bond | i-12 | i-11 |

TABLE 7-continued

| | $Z^1$ | $Z^2$ | $R^1$ | $R^2$ |
|---|---|---|---|---|
| (IB-90) | single bond | single bond | i-12 | i-12 |
| (IB-91) | oxygen atom | oxygen atom | i-1 | ii-1 |
| (IB-92) | oxygen atom | oxygen atom | i-2 | ii-1 |
| (IB-93) | oxygen atom | oxygen atom | i-3 | ii-1 |
| (IB-94) | oxygen atom | oxygen atom | i-4 | ii-1 |
| (IB-95) | oxygen atom | oxygen atom | i-5 | ii-1 |
| (IB-96) | oxygen atom | oxygen atom | i-6 | ii-1 |
| (IB-97) | oxygen atom | oxygen atom | i-7 | ii-1 |
| (IB-98) | oxygen atom | oxygen atom | i-8 | ii-1 |
| (IB-99) | oxygen atom | oxygen atom | i-9 | ii-1 |
| (IB-100) | oxygen atom | oxygen atom | i-10 | ii-1 |
| (IB-101) | oxygen atom | oxygen atom | i-11 | ii-1 |
| (IB-102) | oxygen atom | oxygen atom | i-12 | ii-1 |
| (IB-103) | oxygen atom | oxygen atom | i-1 | i-1 |
| (IB-104) | oxygen atom | oxygen atom | i-2 | i-1 |
| (IB-105) | oxygen atom | oxygen atom | i-3 | i-1 |
| (IB-106) | oxygen atom | oxygen atom | i-4 | i-1 |
| (IB-107) | oxygen atom | oxygen atom | i-5 | i-1 |
| (IB-108) | oxygen atom | oxygen atom | i-6 | i-1 |
| (IB-109) | oxygen atom | oxygen atom | i-7 | i-1 |
| (IB-110) | oxygen atom | oxygen atom | i-8 | i-1 |
| (IB-111) | oxygen atom | oxygen atom | i-9 | i-1 |
| (IB-112) | oxygen atom | oxygen atom | i-10 | i-1 |
| (IB-113) | oxygen atom | oxygen atom | i-11 | i-1 |
| (IB-114) | oxygen atom | oxygen atom | i-12 | i-1 |
| (IB-115) | oxygen atom | oxygen atom | i-2 | i-2 |
| (IB-116) | oxygen atom | oxygen atom | i-3 | i-2 |
| (IB-117) | oxygen atom | oxygen atom | i-4 | i-2 |
| (IB-118) | oxygen atom | oxygen atom | i-5 | i-2 |
| (IB-119) | oxygen atom | oxygen atom | i-6 | i-2 |
| (IB-120) | oxygen atom | oxygen atom | i-7 | i-2 |

TABLE 8

| | $Z^1$ | $Z^2$ | $R^1$ | $R^2$ |
|---|---|---|---|---|
| (IB-121) | oxygen atom | oxygen atom | i-8 | i-2 |
| (IB-122) | oxygen atom | oxygen atom | i-9 | i-2 |
| (IB-123) | oxygen atom | oxygen atom | i-10 | i-2 |
| (IB-124) | oxygen atom | oxygen atom | i-11 | i-2 |
| (IB-125) | oxygen atom | oxygen atom | i-12 | i-2 |
| (IB-126) | oxygen atom | oxygen atom | i-3 | i-3 |
| (IB-127) | oxygen atom | oxygen atom | i-4 | i-3 |
| (IB-128) | oxygen atom | oxygen atom | i-5 | i-3 |
| (IB-129) | oxygen atom | oxygen atom | i-6 | i-3 |
| (IB-130) | oxygen atom | oxygen atom | i-7 | i-3 |
| (IB-131) | oxygen atom | oxygen atom | i-8 | i-3 |
| (IB-132) | oxygen atom | oxygen atom | i-9 | i-3 |

TABLE 8-continued

| | $Z^1$ | $Z^2$ | $R^1$ | $R^2$ |
|---|---|---|---|---|
| (IB-133) | oxygen atom | oxygen atom | i-10 | i-3 |
| (IB-134) | oxygen atom | oxygen atom | i-11 | i-3 |
| (IB-135) | oxygen atom | oxygen atom | i-12 | i-3 |
| (IB-136) | oxygen atom | oxygen atom | i-4 | i-4 |
| (IB-137) | oxygen atom | oxygen atom | i-5 | i-4 |
| (IB-138) | oxygen atom | oxygen atom | i-6 | i-4 |
| (IB-139) | oxygen atom | oxygen atom | i-7 | i-4 |
| (IB-140) | oxygen atom | oxygen atom | i-8 | i-4 |
| (IB-141) | oxygen atom | oxygen atom | i-9 | i-4 |
| (IB-142) | oxygen atom | oxygen atom | i-10 | i-4 |
| (IB-143) | oxygen atom | oxygen atom | i-11 | i-4 |
| (IB-144) | oxygen atom | oxygen atom | i-12 | i-4 |
| (IB-145) | oxygen atom | oxygen atom | i-5 | i-5 |
| (IB-146) | oxygen atom | oxygen atom | i-6 | i-5 |
| (IB-147) | oxygen atom | oxygen atom | i-7 | i-5 |
| (IB-148) | oxygen atom | oxygen atom | i-8 | i-5 |
| (IB-149) | oxygen atom | oxygen atom | i-9 | i-5 |
| (IB-150) | oxygen atom | oxygen atom | i-10 | i-5 |
| (IB-151) | oxygen atom | oxygen atom | i-11 | i-5 |
| (IB-152) | oxygen atom | oxygen atom | i-12 | i-5 |
| (IB-153) | oxygen atom | oxygen atom | i-6 | i-6 |
| (IB-154) | oxygen atom | oxygen atom | i-7 | i-6 |
| (IB-155) | oxygen atom | oxygen atom | i-8 | i-6 |
| (IB-156) | oxygen atom | oxygen atom | i-9 | i-6 |
| (IB-157) | oxygen atom | oxygen atom | i-10 | i-6 |
| (IB-158) | oxygen atom | oxygen atom | i-11 | i-6 |
| (IB-159) | oxygen atom | oxygen atom | i-12 | i-6 |
| (IB-160) | oxygen atom | oxygen atom | i-7 | i-7 |
| (IB-161) | oxygen atom | oxygen atom | i-8 | i-7 |
| (IB-162) | oxygen atom | oxygen atom | i-9 | i-7 |
| (IB-163) | oxygen atom | oxygen atom | i-10 | i-7 |
| (IB-164) | oxygen atom | oxygen atom | i-11 | i-7 |
| (IB-165) | oxygen atom | oxygen atom | i-12 | i-7 |
| (IB-166) | oxygen atom | oxygen atom | i-8 | i-8 |
| (IB-167) | oxygen atom | oxygen atom | i-9 | i-8 |
| (IB-168) | oxygen atom | oxygen atom | i-10 | i-8 |
| (IB-169) | oxygen atom | oxygen atom | i-11 | i-8 |
| (IB-170) | oxygen atom | oxygen atom | i-12 | i-8 |
| (IB-171) | oxygen atom | oxygen atom | i-9 | i-9 |
| (IB-172) | oxygen atom | oxygen atom | i-10 | i-9 |
| (IB-173) | oxygen atom | oxygen atom | i-11 | i-9 |
| (IB-174) | oxygen atom | oxygen atom | i-12 | i-9 |
| (IB-175) | oxygen atom | oxygen atom | i-10 | i-10 |
| (IB-176) | oxygen atom | oxygen atom | i-11 | i-10 |
| (IB-177) | oxygen atom | oxygen atom | i-12 | i-10 |
| (IB-178) | oxygen atom | oxygen atom | i-11 | i-11 |
| (IB-179) | oxygen atom | oxygen atom | i-12 | i-11 |
| (IB-180) | oxygen atom | oxygen atom | i-12 | i-12 |

TABLE 9

| | $Z^1$ | $Z^2$ | Group that $R^1$ and $R^2$ form | | $Z^1$ | $Z^2$ | Group that $R^1$ and $R^2$ form | $R^8$ | $R^9$ |
|---|---|---|---|---|---|---|---|---|---|
| (IB-181) | oxygen atom | oxygen atom | ca-1 | (IB-185) | oxygen atom | oxygen atom | cb-1 | cc-1 | OH |
| (IB-182) | oxygen atom | oxygen atom | ca-2 | (IB-186) | single bond | single bond | cb-1 | cc-1 | OH |
| (IB-183) | single bond | single bond | ca-1 | (IB-187) | oxygen atom | oxygen atom | cb-1 | cc-1 | H |
| (IB-184) | single bond | single bond | ca-2 | (IB-188) | single bond | single bond | cb-1 | cc-1 | H |

TABLE 10

| | $Z^1$ | $Z^2$ | $R^1$ | $R^2$ |
|---|---|---|---|---|
| (IB-189) | single bond | single bond | i-13 | ii-1 |
| (IB-190) | single bond | single bond | i-14 | ii-1 |
| (IB-191) | single bond | single bond | i-15 | ii-1 |
| (IB-192) | single bond | single bond | i-16 | ii-1 |
| (IB-193) | single bond | single bond | i-17 | ii-1 |
| (IB-194) | single bond | single bond | i-18 | ii-1 |
| (IB-195) | single bond | single bond | i-19 | ii-1 |
| (IB-196) | single bond | single bond | i-20 | ii-1 |
| (IB-197) | single bond | single bond | i-21 | ii-1 |
| (IB-198) | single bond | single bond | i-22 | ii-1 |
| (IB-199) | single bond | single bond | i-13 | i-13 |
| (IB-200) | single bond | single bond | i-14 | i-14 |
| (IB-201) | single bond | single bond | i-15 | i-15 |
| (IB-202) | single bond | single bond | i-16 | i-16 |
| (IB-203) | single bond | single bond | i-17 | i-17 |
| (IB-204) | single bond | single bond | i-18 | i-18 |
| (IB-205) | single bond | single bond | i-19 | i-19 |
| (IB-206) | single bond | single bond | i-20 | i-20 |
| (IB-207) | single bond | single bond | i-21 | i-21 |
| (IB-208) | single bond | single bond | i-22 | i-22 |
| (IB-209) | oxygen atom | oxygen atom | i-13 | ii-1 |
| (IB-210) | oxygen atom | oxygen atom | i-14 | ii-1 |
| (IB-211) | oxygen atom | oxygen atom | i-15 | ii-1 |
| (IB-212) | oxygen atom | oxygen atom | i-16 | ii-1 |
| (IB-213) | oxygen atom | oxygen atom | i-17 | ii-1 |
| (IB-214) | oxygen atom | oxygen atom | i-18 | ii-1 |
| (IB-215) | oxygen atom | oxygen atom | i-19 | ii-1 |
| (IB-216) | oxygen atom | oxygen atom | i-20 | ii-1 |
| (IB-217) | oxygen atom | oxygen atom | i-21 | ii-1 |
| (IB-218) | oxygen atom | oxygen atom | i-22 | ii-1 |
| (IB-219) | oxygen atom | oxygen atom | i-13 | i-13 |
| (IB-220) | oxygen atom | oxygen atom | i-14 | i-14 |
| (IB-221) | oxygen atom | oxygen atom | i-15 | i-15 |
| (IB-222) | oxygen atom | oxygen atom | i-16 | i-16 |
| (IB-223) | oxygen atom | oxygen atom | i-17 | i-17 |
| (IB-224) | oxygen atom | oxygen atom | i-18 | i-18 |
| (IB-225) | oxygen atom | oxygen atom | i-19 | i-19 |
| (IB-226) | oxygen atom | oxygen atom | i-20 | i-20 |
| (IB-227) | oxygen atom | oxygen atom | i-21 | i-21 |
| (IB-228) | oxygen atom | oxygen atom | i-22 | i-22 |
| (IB-229) | oxygen atom | single bond | i-1 | ii-1 |
| (IB-230) | oxygen atom | single bond | i-2 | ii-1 |
| (IB-231) | oxygen atom | single bond | i-3 | ii-1 |
| (IB-232) | oxygen atom | single bond | i-4 | ii-1 |
| (IB-233) | oxygen atom | single bond | i-5 | ii-1 |
| (IB-234) | oxygen atom | single bond | i-6 | ii-1 |
| (IB-235) | oxygen atom | single bond | i-7 | ii-1 |
| (IB-236) | oxygen atom | single bond | i-8 | ii-1 |
| (IB-237) | oxygen atom | single bond | i-9 | ii-1 |
| (IB-238) | oxygen atom | single bond | i-10 | ii-1 |
| (IB-239) | oxygen atom | single bond | i-11 | ii-1 |
| (IB-240) | oxygen atom | single bond | i-12 | ii-1 |
| (IB-241) | oxygen atom | single bond | i-13 | ii-1 |
| (IB-242) | oxygen atom | single bond | i-14 | ii-1 |
| (IB-243) | oxygen atom | single bond | i-15 | ii-1 |
| (IB-244) | oxygen atom | single bond | i-16 | ii-1 |
| (IB-245) | oxygen atom | single bond | i-17 | ii-1 |
| (IB-246) | oxygen atom | single bond | i-18 | ii-1 |
| (IB-247) | oxygen atom | single bond | i-19 | ii-1 |
| (IB-248) | oxygen atom | single bond | i-20 | ii-1 |
| (IB-249) | oxygen atom | single bond | i-21 | ii-1 |
| (IB-250) | oxygen atom | single bond | i-22 | ii-1 |
| (IB-251) | single bond | oxygen atom | i-1 | ii-2 |
| (IB-252) | single bond | oxygen atom | i-2 | ii-2 |
| (IB-253) | single bond | oxygen atom | i-3 | ii-2 |
| (IB-254) | single bond | oxygen atom | i-4 | ii-2 |
| (IB-255) | single bond | oxygen atom | i-5 | ii-2 |
| (IB-256) | single bond | oxygen atom | i-6 | ii-2 |
| (IB-257) | single bond | oxygen atom | i-7 | ii-2 |
| (IB-258) | single bond | oxygen atom | i-8 | ii-2 |
| (IB-259) | single bond | oxygen atom | i-9 | ii-2 |
| (IB-260) | single bond | oxygen atom | i-10 | ii-2 |
| (IB-261) | single bond | oxygen atom | i-11 | ii-2 |
| (IB-262) | single bond | oxygen atom | i-12 | ii-2 |
| (IB-263) | single bond | oxygen atom | i-13 | ii-2 |
| (IB-264) | single bond | oxygen atom | i-14 | ii-2 |
| (IB-265) | single bond | oxygen atom | i-15 | ii-2 |
| (IB-266) | single bond | oxygen atom | i-16 | ii-2 |

TABLE 10-continued

| | $Z^1$ | $Z^2$ | $R^1$ | $R^2$ |
|---|---|---|---|---|
| (IB-267) | single bond | oxygen atom | i-17 | ii-2 |
| (IB-268) | single bond | oxygen atom | i-18 | ii-2 |
| (IB-269) | single bond | oxygen atom | i-19 | ii-2 |
| (IB-270) | single bond | oxygen atom | i-20 | ii-2 |
| (IB-271) | single bond | oxygen atom | i-21 | ii-2 |
| (IB-272) | single bond | oxygen atom | i-22 | ii-2 |

As the compound represented by formula (IB), compounds represented by formulas (IB-1) to (IB-12), (IB-91) to (IB-102), (IB-103) to (IB-108), (IB-115) to (IB-119), (IB-126) to (IB-129), (IB-136) to (IB-138), (IB-145) to (IB-146), (IB-153), (IB-181) to (IB-198), (IB-209) to (IB-220), and (IB-222) to (IB-272) are preferable;

compounds represented by formulas (IB-1) to (IB-12) are more preferable; and compound represented by formula (IB-1) is still more preferable.

TABLE 11

| | $Z^1$ | $Z^2$ | $R^1$ | $R^2$ |
|---|---|---|---|---|
| (IC-1) | single bond | single bond | i-1 | ii-1 |
| (IC-2) | single bond | single bond | i-2 | ii-1 |
| (IC-3) | single bond | single bond | i-3 | ii-1 |
| (IC-4) | single bond | single bond | i-4 | ii-1 |
| (IC-5) | single bond | single bond | i-5 | ii-1 |
| (IC-6) | single bond | single bond | i-6 | ii-1 |
| (IC-7) | single bond | single bond | i-7 | ii-1 |
| (IC-8) | single bond | single bond | i-8 | ii-1 |
| (IC-9) | single bond | single bond | i-9 | ii-1 |
| (IC-10) | single bond | single bond | i-10 | ii-1 |
| (IC-11) | single bond | single bond | i-11 | ii-1 |
| (IC-12) | single bond | single bond | i-12 | ii-1 |
| (IC-13) | single bond | single bond | i-1 | i-1 |
| (IC-14) | single bond | single bond | i-2 | i-1 |
| (IC-15) | single bond | single bond | i-3 | i-1 |
| (IC-16) | single bond | single bond | i-4 | i-1 |
| (IC-17) | single bond | single bond | i-5 | i-1 |
| (IC-18) | single bond | single bond | i-6 | i-1 |
| (IC-19) | single bond | single bond | i-7 | i-1 |
| (IC-20) | single bond | single bond | i-8 | i-1 |
| (IC-21) | single bond | single bond | i-9 | i-1 |
| (IC-22) | single bond | single bond | i-10 | i-1 |
| (IC-23) | single bond | single bond | i-11 | i-1 |
| (IC-24) | single bond | single bond | i-12 | i-1 |
| (IC-25) | single bond | single bond | i-2 | i-2 |
| (IC-26) | single bond | single bond | i-3 | i-2 |
| (IC-27) | single bond | single bond | i-4 | i-2 |
| (IC-28) | single bond | single bond | i-5 | i-2 |
| (IC-29) | single bond | single bond | i-6 | i-2 |
| (IC-30) | single bond | single bond | i-7 | i-2 |
| (IC-31) | single bond | single bond | i-8 | i-2 |
| (IC-32) | single bond | single bond | i-9 | i-2 |
| (IC-33) | single bond | single bond | i-10 | i-2 |
| (IC-34) | single bond | single bond | i-11 | i-2 |
| (IC-35) | single bond | single bond | i-12 | i-2 |
| (IC-36) | single bond | single bond | i-3 | i-3 |
| (IC-37) | single bond | single bond | i-4 | i-3 |
| (IC-38) | single bond | single bond | i-5 | i-3 |
| (IC-39) | single bond | single bond | i-6 | i-3 |
| (IC-40) | single bond | single bond | i-7 | i-3 |
| (IC-41) | single bond | single bond | i-8 | i-3 |
| (IC-42) | single bond | single bond | i-9 | i-3 |
| (IC-43) | single bond | single bond | i-10 | i-3 |
| (IC-44) | single bond | single bond | i-11 | i-3 |
| (IC-45) | single bond | single bond | i-12 | i-3 |
| (IC-46) | single bond | single bond | i-4 | i-4 |
| (IC-47) | single bond | single bond | i-5 | i-4 |
| (IC-48) | single bond | single bond | i-6 | i-4 |
| (IC-49) | single bond | single bond | i-7 | i-4 |
| (IC-50) | single bond | single bond | i-8 | i-4 |
| (IC-51) | single bond | single bond | i-9 | i-4 |

TABLE 11-continued

| | $Z^1$ | $Z^2$ | $R^1$ | $R^2$ |
|---|---|---|---|---|
| (IC-52) | single bond | single bond | i-10 | i-4 |
| (IC-53) | single bond | single bond | i-11 | i-4 |
| (IC-54) | single bond | single bond | i-12 | i-4 |
| (IC-55) | single bond | single bond | i-5 | i-5 |
| (IC-56) | single bond | single bond | i-6 | i-5 |
| (IC-57) | single bond | single bond | i-7 | i-5 |
| (IC-58) | single bond | single bond | i-8 | i-5 |
| (IC-59) | single bond | single bond | i-9 | i-5 |
| (IC-60) | single bond | single bond | i-10 | i-5 |

TABLE 12

| | $Z^1$ | $Z^2$ | $R^1$ | $R^2$ |
|---|---|---|---|---|
| (IC-61) | single bond | single bond | i-11 | i-5 |
| (IC-62) | single bond | single bond | i-12 | i-5 |
| (IC-63) | single bond | single bond | i-6 | i-6 |
| (IC-64) | single bond | single bond | i-7 | i-6 |
| (IC-65) | single bond | single bond | i-8 | i-6 |
| (IC-66) | single bond | single bond | i-9 | i-6 |
| (IC-67) | single bond | single bond | i-10 | i-6 |
| (IC-68) | single bond | single bond | i-11 | i-6 |
| (IC-69) | single bond | single bond | i-12 | i-6 |
| (IC-70) | single bond | single bond | i-7 | i-7 |
| (IC-71) | single bond | single bond | i-8 | i-7 |
| (IC-72) | single bond | single bond | i-9 | i-7 |
| (IC-73) | single bond | single bond | i-10 | i-7 |
| (IC-74) | single bond | single bond | i-11 | i-7 |
| (IC-75) | single bond | single bond | i-12 | i-7 |
| (IC-76) | single bond | single bond | i-8 | i-8 |
| (IC-77) | single bond | single bond | i-9 | i-8 |
| (IC-78) | single bond | single bond | i-10 | i-8 |
| (IC-79) | single bond | single bond | i-11 | i-8 |
| (IC-80) | single bond | single bond | i-12 | i-8 |
| (IC-81) | single bond | single bond | i-9 | i-9 |
| (IC-82) | single bond | single bond | i-10 | i-9 |
| (IC-83) | single bond | single bond | i-11 | i-9 |
| (IC-84) | single bond | single bond | i-12 | i-9 |
| (IC-85) | single bond | single bond | i-10 | i-10 |
| (IC-86) | single bond | single bond | i-11 | i-10 |
| (IC-87) | single bond | single bond | i-12 | i-10 |
| (IC-88) | single bond | single bond | i-11 | i-11 |
| (IC-89) | single bond | single bond | i-12 | i-11 |
| (IC-90) | single bond | single bond | i-12 | i-12 |
| (IC-91) | oxygen atom | oxygen atom | i-1 | ii-1 |
| (IC-92) | oxygen atom | oxygen atom | i-2 | ii-1 |
| (IC-93) | oxygen atom | oxygen atom | i-3 | ii-1 |
| (IC-94) | oxygen atom | oxygen atom | i-4 | ii-1 |
| (IC-95) | oxygen atom | oxygen atom | i-5 | ii-1 |
| (IC-96) | oxygen atom | oxygen atom | i-6 | ii-1 |
| (IC-97) | oxygen atom | oxygen atom | i-7 | ii-1 |
| (IC-98) | oxygen atom | oxygen atom | i-8 | ii-1 |
| (IC-99) | oxygen atom | oxygen atom | i-9 | ii-1 |
| (IC-100) | oxygen atom | oxygen atom | i-10 | ii-1 |
| (IC-101) | oxygen atom | oxygen atom | i-11 | ii-1 |
| (IC-102) | oxygen atom | oxygen atom | i-12 | ii-1 |
| (IC-103) | oxygen atom | oxygen atom | i-1 | i-1 |
| (IC-104) | oxygen atom | oxygen atom | i-2 | i-1 |
| (IC-105) | oxygen atom | oxygen atom | i-3 | i-1 |
| (IC-106) | oxygen atom | oxygen atom | i-4 | i-1 |
| (IC-107) | oxygen atom | oxygen atom | i-5 | i-1 |
| (IC-108) | oxygen atom | oxygen atom | i-6 | i-1 |
| (IC-109) | oxygen atom | oxygen atom | i-7 | i-1 |
| (IC-110) | oxygen atom | oxygen atom | i-8 | i-1 |
| (IC-111) | oxygen atom | oxygen atom | i-9 | i-1 |
| (IC-112) | oxygen atom | oxygen atom | i-10 | i-1 |
| (IC-113) | oxygen atom | oxygen atom | i-11 | i-1 |
| (IC-114) | oxygen atom | oxygen atom | i-12 | i-1 |
| (IC-115) | oxygen atom | oxygen atom | i-2 | i-2 |
| (IC-116) | oxygen atom | oxygen atom | i-3 | i-2 |
| (IC-117) | oxygen atom | oxygen atom | i-4 | i-2 |
| (IC-118) | oxygen atom | oxygen atom | i-5 | i-2 |
| (IC-119) | oxygen atom | oxygen atom | i-6 | i-2 |
| (IC-120) | oxygen atom | oxygen atom | i-7 | i-2 |

TABLE 13

| | $Z^1$ | $Z^2$ | $R^1$ | $R^2$ |
|---|---|---|---|---|
| (IC-121) | oxygen atom | oxygen atom | i-8 | i-2 |
| (IC-122) | oxygen atom | oxygen atom | i-9 | i-2 |
| (IC-123) | oxygen atom | oxygen atom | i-10 | i-2 |
| (IC-124) | oxygen atom | oxygen atom | i-11 | i-2 |
| (IC-125) | oxygen atom | oxygen atom | i-12 | i-2 |
| (IC-126) | oxygen atom | oxygen atom | i-3 | i-3 |
| (IC-127) | oxygen atom | oxygen atom | i-4 | i-3 |
| (IC-128) | oxygen atom | oxygen atom | i-5 | i-3 |
| (IC-129) | oxygen atom | oxygen atom | i-6 | i-3 |
| (IC-130) | oxygen atom | oxygen atom | i-7 | i-3 |
| (IC-131) | oxygen atom | oxygen atom | i-8 | i-3 |
| (IC-132) | oxygen atom | oxygen atom | i-9 | i-3 |
| (IC-133) | oxygen atom | oxygen atom | i-10 | i-3 |
| (IC-134) | oxygen atom | oxygen atom | i-11 | i-3 |
| (IC-135) | oxygen atom | oxygen atom | i-12 | i-3 |
| (IC-136) | oxygen atom | oxygen atom | i-4 | i-4 |
| (IC-137) | oxygen atom | oxygen atom | i-5 | i-4 |
| (IC-138) | oxygen atom | oxygen atom | i-6 | i-4 |
| (IC-139) | oxygen atom | oxygen atom | i-7 | i-4 |
| (IC-140) | oxygen atom | oxygen atom | i-8 | i-4 |
| (IC-141) | oxygen atom | oxygen atom | i-9 | i-4 |
| (IC-142) | oxygen atom | oxygen atom | i-10 | i-4 |
| (IC-143) | oxygen atom | oxygen atom | i-11 | i-4 |
| (IC-144) | oxygen atom | oxygen atom | i-12 | i-4 |
| (IC-145) | oxygen atom | oxygen atom | i-5 | i-5 |
| (IC-146) | oxygen atom | oxygen atom | i-6 | i-5 |
| (IC-147) | oxygen atom | oxygen atom | i-7 | i-5 |
| (IC-148) | oxygen atom | oxygen atom | i-8 | i-5 |
| (IC-149) | oxygen atom | oxygen atom | i-9 | i-5 |
| (IC-150) | oxygen atom | oxygen atom | i-10 | i-5 |
| (IC-151) | oxygen atom | oxygen atom | i-11 | i-5 |
| (IC-152) | oxygen atom | oxygen atom | i-12 | i-5 |
| (IC-153) | oxygen atom | oxygen atom | i-6 | i-6 |
| (IC-154) | oxygen atom | oxygen atom | i-7 | i-6 |
| (IC-155) | oxygen atom | oxygen atom | i-8 | i-6 |
| (IC-156) | oxygen atom | oxygen atom | i-9 | i-6 |
| (IC-157) | oxygen atom | oxygen atom | i-10 | i-6 |
| (IC-158) | oxygen atom | oxygen atom | i-11 | i-6 |
| (IC-159) | oxygen atom | oxygen atom | i-12 | i-6 |
| (IC-160) | oxygen atom | oxygen atom | i-7 | i-7 |
| (IC-161) | oxygen atom | oxygen atom | i-8 | i-7 |
| (IC-162) | oxygen atom | oxygen atom | i-9 | i-7 |
| (IC-163) | oxygen atom | oxygen atom | i-10 | i-7 |
| (IC-164) | oxygen atom | oxygen atom | i-11 | i-7 |
| (IC-165) | oxygen atom | oxygen atom | i-12 | i-7 |
| (IC-166) | oxygen atom | oxygen atom | i-8 | i-8 |
| (IC-167) | oxygen atom | oxygen atom | i-9 | i-8 |
| (IC-168) | oxygen atom | oxygen atom | i-10 | i-8 |
| (IC-169) | oxygen atom | oxygen atom | i-11 | i-8 |
| (IC-170) | oxygen atom | oxygen atom | i-12 | i-8 |
| (IC-171) | oxygen atom | oxygen atom | i-9 | i-9 |
| (IC-172) | oxygen atom | oxygen atom | i-10 | i-9 |
| (IC-173) | oxygen atom | oxygen atom | i-11 | i-9 |
| (IC-174) | oxygen atom | oxygen atom | i-12 | i-9 |
| (IC-175) | oxygen atom | oxygen atom | i-10 | i-10 |
| (IC-176) | oxygen atom | oxygen atom | i-11 | i-10 |
| (IC-177) | oxygen atom | oxygen atom | i-12 | i-10 |
| (IC-178) | oxygen atom | oxygen atom | i-11 | i-11 |
| (IC-179) | oxygen atom | oxygen atom | i-12 | i-11 |
| (IC-180) | oxygen atom | oxygen atom | i-12 | i-12 |

TABLE 14

| | $Z^1$ | $Z^2$ | Group that $R^1$ and $R^2$ form | | $Z^1$ | $Z^2$ | Group that $R^1$ and $R^2$ form | $R^8$ | $R^9$ |
|---|---|---|---|---|---|---|---|---|---|
| (IC-181) | oxygen atom | oxygen atom | ca-1 | (IC-185) | oxygen atom | oxygen atom | cb-1 | cc-1 | OH |
| (IC-182) | oxygen atom | oxygen atom | ca-2 | (IC-186) | single bond | single bond | cb-1 | cc-1 | OH |
| (IC-183) | single bond | single bond | ca-1 | (IC-187) | oxygen atom | oxygen atom | cb-1 | cc-1 | H |
| (IC-184) | single bond | single bond | ca-2 | (IC-188) | single bond | single bond | cb-1 | cc-1 | H |

TABLE 15

| | $Z^1$ | $Z^2$ | $R^1$ | $R^2$ |
|---|---|---|---|---|
| (IC-189) | single bond | single bond | i-13 | ii-1 |
| (IC-190) | single bond | single bond | i-14 | ii-1 |
| (IC-191) | single bond | single bond | i-15 | ii-1 |
| (IC-192) | single bond | single bond | i-16 | ii-1 |
| (IC-193) | single bond | single bond | i-17 | ii-1 |
| (IC-194) | single bond | single bond | i-18 | ii-1 |
| (IC-195) | single bond | single bond | i-19 | ii-1 |
| (IC-196) | single bond | single bond | i-20 | ii-1 |
| (IC-197) | single bond | single bond | i-21 | ii-1 |
| (IC-198) | single bond | single bond | i-22 | ii-1 |
| (IC-199) | single bond | single bond | i-13 | i-13 |
| (IC-200) | single bond | single bond | i-14 | i-14 |
| (IC-201) | single bond | single bond | i-15 | i-15 |
| (IC-202) | single bond | single bond | i-16 | i-16 |
| (IC-203) | single bond | single bond | i-17 | i-17 |
| (IC-204) | single bond | single bond | i-18 | i-18 |
| (IC-205) | single bond | single bond | i-19 | i-19 |
| (IC-206) | single bond | single bond | i-20 | i-20 |
| (IC-207) | single bond | single bond | i-21 | i-21 |
| (IC-208) | single bond | single bond | i-22 | i-22 |
| (IC-209) | oxygen atom | oxygen atom | i-13 | ii-1 |
| (IC-210) | oxygen atom | oxygen atom | i-14 | ii-1 |
| (IC-211) | oxygen atom | oxygen atom | i-15 | ii-1 |
| (IC-212) | oxygen atom | oxygen atom | i-16 | ii-1 |
| (IC-213) | oxygen atom | oxygen atom | i-17 | ii-1 |
| (IC-214) | oxygen atom | oxygen atom | i-18 | ii-1 |
| (IC-215) | oxygen atom | oxygen atom | i-19 | ii-1 |
| (IC-216) | oxygen atom | oxygen atom | i-20 | ii-1 |
| (IC-217) | oxygen atom | oxygen atom | i-21 | ii-1 |
| (IC-218) | oxygen atom | oxygen atom | i-22 | ii-1 |
| (IC-219) | oxygen atom | oxygen atom | i-13 | i-13 |
| (IC-220) | oxygen atom | oxygen atom | i-14 | i-14 |
| (IC-221) | oxygen atom | oxygen atom | i-15 | i-15 |
| (IC-222) | oxygen atom | oxygen atom | i-16 | i-16 |
| (IC-223) | oxygen atom | oxygen atom | i-17 | i-17 |
| (IC-224) | oxygen atom | oxygen atom | i-18 | i-18 |
| (IC-225) | oxygen atom | oxygen atom | i-19 | i-19 |
| (IC-226) | oxygen atom | oxygen atom | i-20 | i-20 |
| (IC-227) | oxygen atom | oxygen atom | i-21 | i-21 |
| (IC-228) | oxygen atom | oxygen atom | i-22 | i-22 |
| (IC-229) | oxygen atom | single bond | i-1 | ii-1 |
| (IC-230) | oxygen atom | single bond | i-2 | ii-1 |
| (IC-231) | oxygen atom | single bond | i-3 | ii-1 |
| (IC-232) | oxygen atom | single bond | i-4 | ii-1 |
| (IC-233) | oxygen atom | single bond | i-5 | ii-1 |
| (IC-234) | oxygen atom | single bond | i-6 | ii-1 |
| (IC-235) | oxygen atom | single bond | i-7 | ii-1 |
| (IC-236) | oxygen atom | single bond | i-8 | ii-1 |
| (IC-237) | oxygen atom | single bond | i-9 | ii-1 |
| (IC-238) | oxygen atom | single bond | i-10 | ii-1 |
| (IC-239) | oxygen atom | single bond | i-11 | ii-1 |
| (IC-240) | oxygen atom | single bond | i-12 | ii-1 |
| (IC-241) | oxygen atom | single bond | i-13 | ii-1 |
| (IC-242) | oxygen atom | single bond | i-14 | ii-1 |
| (IC-243) | oxygen atom | single bond | i-15 | ii-1 |
| (IC-244) | oxygen atom | single bond | i-16 | ii-1 |
| (IC-245) | oxygen atom | single bond | i-17 | ii-1 |
| (IC-246) | oxygen atom | single bond | i-18 | ii-1 |
| (IC-247) | oxygen atom | single bond | i-19 | ii-1 |
| (IC-248) | oxygen atom | single bond | i-20 | ii-1 |
| (IC-249) | oxygen atom | single bond | i-21 | ii-1 |

TABLE 15-continued

| | $Z^1$ | $Z^2$ | $R^1$ | $R^2$ |
|---|---|---|---|---|
| (IC-250) | oxygen atom | single bond | i-22 | ii-1 |
| (IC-251) | single bond | oxygen atom | i-1 | ii-2 |
| (IC-252) | single bond | oxygen atom | i-2 | ii-2 |
| (IC-253) | single bond | oxygen atom | i-3 | ii-2 |
| (IC-254) | single bond | oxygen atom | i-4 | ii-2 |
| (IC-255) | single bond | oxygen atom | i-5 | ii-2 |
| (IC-256) | single bond | oxygen atom | i-6 | ii-2 |
| (IC-257) | single bond | oxygen atom | i-7 | ii-2 |
| (IC-258) | single bond | oxygen atom | i-8 | ii-2 |
| (IC-259) | single bond | oxygen atom | i-9 | ii-2 |
| (IC-260) | single bond | oxygen atom | i-10 | ii-2 |
| (IC-261) | single bond | oxygen atom | i-11 | ii-2 |
| (IC-262) | single bond | oxygen atom | i-12 | ii-2 |
| (IC-263) | single bond | oxygen atom | i-13 | ii-2 |
| (IC-264) | single bond | oxygen atom | i-14 | ii-2 |
| (IC-265) | single bond | oxygen atom | i-15 | ii-2 |
| (IC-266) | single bond | oxygen atom | i-16 | ii-2 |
| (IC-267) | single bond | oxygen atom | i-17 | ii-2 |
| (IC-268) | single bond | oxygen atom | i-18 | ii-2 |
| (IC-269) | single bond | oxygen atom | i-19 | ii-2 |
| (IC-270) | single bond | oxygen atom | i-20 | ii-2 |
| (IC-271) | single bond | oxygen atom | i-21 | ii-2 |
| (IC-272) | single bond | oxygen atom | i-22 | ii-2 |

As the compound represented by formula (IC), compounds represented by formulas (IC-1) to (IC-12), (IC-91) to (IC-102), (IC-103) to (IC-108), (IC-115) to (IC-119), (IC-126) to (IC-129), (IC-136) to (IC-138), (IC-145) to (IC-146), (IC-153), (IC-181) to (IC-198), (IC-209) to (IC-220), and (IC-222) to (IC-272) are preferable;

compounds represented by formulas (IC-1) to (IC-12), (IC-103) to (IC-105), (IC-115) to (IC-116), and (IC-126) are more preferable; and compounds represented by formulas (IC-1) and (IC-115) are still more preferable.

TABLE 16

| | $Z^1$ | $Z^2$ | $R^1$ | $R^2$ |
|---|---|---|---|---|
| (ID-1) | single bond | single bond | i-1 | ii-1 |
| (ID-2) | single bond | single bond | i-2 | ii-1 |
| (ID-3) | single bond | single bond | i-3 | ii-1 |
| (ID-4) | single bond | single bond | i-4 | ii-1 |
| (ID-5) | single bond | single bond | i-5 | ii-1 |
| (ID-6) | single bond | single bond | i-6 | ii-1 |
| (ID-7) | single bond | single bond | i-7 | ii-1 |
| (ID-8) | single bond | single bond | i-8 | ii-1 |
| (ID-9) | single bond | single bond | i-9 | ii-1 |
| (ID-10) | single bond | single bond | i-10 | ii-1 |
| (ID-11) | single bond | single bond | i-11 | ii-1 |
| (ID-12) | single bond | single bond | i-12 | ii-1 |
| (ID-13) | single bond | single bond | i-1 | i-1 |
| (ID-14) | single bond | single bond | i-2 | i-1 |
| (ID-15) | single bond | single bond | i-3 | i-1 |
| (ID-16) | single bond | single bond | i-4 | i-1 |

TABLE 16-continued

| | $Z^1$ | $Z^2$ | $R^1$ | $R^2$ |
|---|---|---|---|---|
| (ID-17) | single bond | single bond | i-5 | i-1 |
| (ID-18) | single bond | single bond | i-6 | i-1 |
| (ID-19) | single bond | single bond | i-7 | i-1 |
| (ID-20) | single bond | single bond | i-8 | i-1 |
| (ID-21) | single bond | single bond | i-9 | i-1 |
| (ID-22) | single bond | single bond | i-10 | i-1 |
| (ID-23) | single bond | single bond | i-11 | i-1 |
| (ID-24) | single bond | single bond | i-12 | i-1 |
| (ID-25) | single bond | single bond | i-2 | i-2 |
| (ID-26) | single bond | single bond | i-3 | i-2 |
| (ID-27) | single bond | single bond | i-4 | i-2 |
| (ID-28) | single bond | single bond | i-5 | i-2 |
| (ID-29) | single bond | single bond | i-6 | i-2 |
| (ID-30) | single bond | single bond | i-7 | i-2 |
| (ID-31) | single bond | single bond | i-8 | i-2 |
| (ID-32) | single bond | single bond | i-9 | i-2 |
| (ID-33) | single bond | single bond | i-10 | i-2 |
| (ID-34) | single bond | single bond | i-11 | i-2 |
| (ID-35) | single bond | single bond | i-12 | i-2 |
| (ID-36) | single bond | single bond | i-3 | i-3 |
| (ID-37) | single bond | single bond | i-4 | i-3 |
| (ID-38) | single bond | single bond | i-5 | i-3 |
| (ID-39) | single bond | single bond | i-6 | i-3 |
| (ID-40) | single bond | single bond | i-7 | i-3 |
| (ID-41) | single bond | single bond | i-8 | i-3 |
| (ID-42) | single bond | single bond | i-9 | i-3 |
| (ID-43) | single bond | single bond | i-10 | i-3 |
| (ID-44) | single bond | single bond | i-11 | i-3 |
| (ID-45) | single bond | single bond | i-12 | i-3 |
| (ID-46) | single bond | single bond | i-4 | i-4 |
| (ID-47) | single bond | single bond | i-5 | i-4 |
| (ID-48) | single bond | single bond | i-6 | i-4 |
| (ID-49) | single bond | single bond | i-7 | i-4 |
| (ID-50) | single bond | single bond | i-8 | i-4 |
| (ID-51) | single bond | single bond | i-9 | i-4 |
| (ID-52) | single bond | single bond | i-10 | i-4 |
| (ID-53) | single bond | single bond | i-11 | i-4 |
| (ID-54) | single bond | single bond | i-12 | i-4 |
| (ID-55) | single bond | single bond | i-5 | i-5 |
| (ID-56) | single bond | single bond | i-6 | i-5 |
| (ID-57) | single bond | single bond | i-7 | i-5 |
| (ID-58) | single bond | single bond | i-8 | i-5 |
| (ID-59) | single bond | single bond | i-9 | i-5 |
| (ID-60) | single bond | single bond | i-10 | i-5 |

TABLE 17

| | $Z^1$ | $Z^2$ | $R^1$ | $R^2$ |
|---|---|---|---|---|
| (ID-61) | single bond | single bond | i-11 | i-5 |
| (ID-62) | single bond | single bond | i-12 | i-5 |
| (ID-63) | single bond | single bond | i-6 | i-6 |
| (ID-64) | single bond | single bond | i-7 | i-6 |
| (ID-65) | single bond | single bond | i-8 | i-6 |
| (ID-66) | single bond | single bond | i-9 | i-6 |
| (ID-67) | single bond | single bond | i-10 | i-6 |
| (ID-68) | single bond | single bond | i-11 | i-6 |
| (ID-69) | single bond | single bond | i-12 | i-6 |
| (ID-70) | single bond | single bond | i-7 | i-7 |
| (ID-71) | single bond | single bond | i-8 | i-7 |
| (ID-72) | single bond | single bond | i-9 | i-7 |
| (ID-73) | single bond | single bond | i-10 | i-7 |
| (ID-74) | single bond | single bond | i-11 | i-7 |
| (ID-75) | single bond | single bond | i-12 | i-7 |
| (ID-76) | single bond | single bond | i-8 | i-8 |
| (ID-77) | single bond | single bond | i-9 | i-8 |
| (ID-78) | single bond | single bond | i-10 | i-8 |
| (ID-79) | single bond | single bond | i-11 | i-8 |
| (ID-80) | single bond | single bond | i-12 | i-8 |
| (ID-81) | single bond | single bond | i-9 | i-9 |
| (ID-82) | single bond | single bond | i-10 | i-9 |
| (ID-83) | single bond | single bond | i-11 | i-9 |
| (ID-84) | single bond | single bond | i-12 | i-9 |
| (ID-85) | single bond | single bond | i-10 | i-10 |
| (ID-86) | single bond | single bond | i-11 | i-10 |

TABLE 17-continued

| | $Z^1$ | $Z^2$ | $R^1$ | $R^2$ |
|---|---|---|---|---|
| (ID-87) | single bond | single bond | i-12 | i-10 |
| (ID-88) | single bond | single bond | i-11 | i-11 |
| (ID-89) | single bond | single bond | i-12 | i-11 |
| (ID-90) | single bond | single bond | i-12 | i-12 |
| (ID-91) | oxygen atom | oxygen atom | i-1 | ii-1 |
| (ID-92) | oxygen atom | oxygen atom | i-2 | ii-1 |
| (ID-93) | oxygen atom | oxygen atom | i-3 | ii-1 |
| (ID-94) | oxygen atom | oxygen atom | i-4 | ii-1 |
| (ID-95) | oxygen atom | oxygen atom | i-5 | ii-1 |
| (ID-96) | oxygen atom | oxygen atom | i-6 | ii-1 |
| (ID-97) | oxygen atom | oxygen atom | i-7 | ii-1 |
| (ID-98) | oxygen atom | oxygen atom | i-8 | ii-1 |
| (ID-99) | oxygen atom | oxygen atom | i-9 | ii-1 |
| (ID-100) | oxygen atom | oxygen atom | i-10 | ii-1 |
| (ID-101) | oxygen atom | oxygen atom | i-11 | ii-1 |
| (ID-102) | oxygen atom | oxygen atom | i-12 | ii-1 |
| (ID-103) | oxygen atom | oxygen atom | i-1 | i-1 |
| (ID-104) | oxygen atom | oxygen atom | i-2 | i-1 |
| (ID-105) | oxygen atom | oxygen atom | i-3 | i-1 |
| (ID-106) | oxygen atom | oxygen atom | i-4 | i-1 |
| (ID-107) | oxygen atom | oxygen atom | i-5 | i-1 |
| (ID-108) | oxygen atom | oxygen atom | i-6 | i-1 |
| (ID-109) | oxygen atom | oxygen atom | i-7 | i-1 |
| (ID-110) | oxygen atom | oxygen atom | i-8 | i-1 |
| (ID-111) | oxygen atom | oxygen atom | i-9 | i-1 |
| (ID-112) | oxygen atom | oxygen atom | i-10 | i-1 |
| (ID-113) | oxygen atom | oxygen atom | i-11 | i-1 |
| (ID-114) | oxygen atom | oxygen atom | i-12 | i-1 |
| (ID-115) | oxygen atom | oxygen atom | i-2 | i-2 |
| (ID-116) | oxygen atom | oxygen atom | i-3 | i-2 |
| (ID-117) | oxygen atom | oxygen atom | i-4 | i-2 |
| (ID-118) | oxygen atom | oxygen atom | i-5 | i-2 |
| (ID-119) | oxygen atom | oxygen atom | i-6 | i-2 |
| (ID-120) | oxygen atom | oxygen atom | i-7 | i-2 |

TABLE 18

| | $Z^1$ | $Z^2$ | $R^1$ | $R^2$ |
|---|---|---|---|---|
| (ID-121) | oxygen atom | oxygen atom | i-8 | i-2 |
| (ID-122) | oxygen atom | oxygen atom | i-9 | i-2 |
| (ID-123) | oxygen atom | oxygen atom | i-10 | i-2 |
| (ID-124) | oxygen atom | oxygen atom | i-11 | i-2 |
| (ID-125) | oxygen atom | oxygen atom | i-12 | i-2 |
| (ID-126) | oxygen atom | oxygen atom | i-3 | i-3 |
| (ID-127) | oxygen atom | oxygen atom | i-4 | i-3 |
| (ID-128) | oxygen atom | oxygen atom | i-5 | i-3 |
| (ID-129) | oxygen atom | oxygen atom | i-6 | i-3 |
| (ID-130) | oxygen atom | oxygen atom | i-7 | i-3 |
| (ID-131) | oxygen atom | oxygen atom | i-8 | i-3 |
| (ID-132) | oxygen atom | oxygen atom | i-9 | i-3 |
| (ID-133) | oxygen atom | oxygen atom | i-10 | i-3 |
| (ID-134) | oxygen atom | oxygen atom | i-11 | i-3 |
| (ID-135) | oxygen atom | oxygen atom | i-12 | i-3 |
| (ID-136) | oxygen atom | oxygen atom | i-4 | i-4 |
| (ID-137) | oxygen atom | oxygen atom | i-5 | i-4 |
| (ID-138) | oxygen atom | oxygen atom | i-6 | i-4 |
| (ID-139) | oxygen atom | oxygen atom | i-7 | i-4 |
| (ID-140) | oxygen atom | oxygen atom | i-8 | i-4 |
| (ID-141) | oxygen atom | oxygen atom | i-9 | i-4 |
| (ID-142) | oxygen atom | oxygen atom | i-10 | i-4 |
| (ID-143) | oxygen atom | oxygen atom | i-11 | i-4 |
| (ID-144) | oxygen atom | oxygen atom | i-12 | i-4 |
| (ID-145) | oxygen atom | oxygen atom | i-5 | i-5 |
| (ID-146) | oxygen atom | oxygen atom | i-6 | i-5 |
| (ID-147) | oxygen atom | oxygen atom | i-7 | i-5 |
| (ID-148) | oxygen atom | oxygen atom | i-8 | i-5 |
| (ID-149) | oxygen atom | oxygen atom | i-9 | i-5 |
| (ID-150) | oxygen atom | oxygen atom | i-10 | i-5 |
| (ID-151) | oxygen atom | oxygen atom | i-11 | i-5 |
| (ID-152) | oxygen atom | oxygen atom | i-12 | i-5 |
| (ID-153) | oxygen atom | oxygen atom | i-6 | i-6 |
| (ID-154) | oxygen atom | oxygen atom | i-7 | i-6 |
| (ID-155) | oxygen atom | oxygen atom | i-8 | i-6 |
| (ID-156) | oxygen atom | oxygen atom | i-9 | i-6 |

TABLE 18-continued

| | Z$^1$ | Z$^2$ | R$^1$ | R$^2$ |
|---|---|---|---|---|
| (ID-157) | oxygen atom | oxygen atom | i-10 | i-6 |
| (ID-158) | oxygen atom | oxygen atom | i-11 | i-6 |
| (ID-159) | oxygen atom | oxygen atom | i-12 | i-6 |
| (ID-160) | oxygen atom | oxygen atom | i-7 | i-7 |
| (ID-161) | oxygen atom | oxygen atom | i-8 | i-7 |
| (ID-162) | oxygen atom | oxygen atom | i-9 | i-7 |
| (ID-163) | oxygen atom | oxygen atom | i-10 | i-7 |
| (ID-164) | oxygen atom | oxygen atom | i-11 | i-7 |
| (ID-165) | oxygen atom | oxygen atom | i-12 | i-7 |
| (ID-166) | oxygen atom | oxygen atom | i-8 | i-8 |
| (ID-167) | oxygen atom | oxygen atom | i-9 | i-8 |
| (ID-168) | oxygen atom | oxygen atom | i-10 | i-8 |
| (ID-169) | oxygen atom | oxygen atom | i-11 | i-8 |
| (ID-170) | oxygen atom | oxygen atom | i-12 | i-8 |
| (ID-171) | oxygen atom | oxygen atom | i-9 | i-9 |
| (ID-172) | oxygen atom | oxygen atom | i-10 | i-9 |
| (ID-173) | oxygen atom | oxygen atom | i-11 | i-9 |
| (ID-174) | oxygen atom | oxygen atom | i-12 | i-9 |
| (ID-175) | oxygen atom | oxygen atom | i-10 | i-10 |
| (ID-176) | oxygen atom | oxygen atom | i-11 | i-10 |
| (ID-177) | oxygen atom | oxygen atom | i-12 | i-10 |
| (ID-178) | oxygen atom | oxygen atom | i-11 | i-11 |
| (ID-179) | oxygen atom | oxygen atom | i-12 | i-11 |
| (ID-180) | oxygen atom | oxygen atom | i-12 | i-12 |

TABLE 19

| | Z$^1$ | Z$^2$ | Group that R$^1$ and R$^2$ form | | Z$^1$ | Z$^2$ | Group that R$^1$ and R$^2$ form | R$^8$ | R$^9$ |
|---|---|---|---|---|---|---|---|---|---|
| (ID-181) | oxygen atom | oxygen atom | ca-1 | (ID-185) | oxygen atom | oxygen atom | cb-1 | cc-1 | OH |
| (ID-182) | oxygen atom | oxygen atom | ca-2 | (ID-186) | single bond | single bond | cb-1 | cc-1 | OH |
| (ID-183) | single bond | single bond | ca-1 | (ID-187) | oxygen atom | oxygen atom | cb-1 | cc-1 | H |
| (ID-184) | single bond | single bond | ca-2 | (ID-188) | single bond | single bond | cb-1 | cc-1 | H |

TABLE 20

| | Z$^1$ | Z$^2$ | R$^1$ | R$^2$ |
|---|---|---|---|---|
| (ID-189) | single bond | single bond | i-13 | ii-1 |
| (ID-190) | single bond | single bond | i-14 | ii-1 |
| (ID-191) | single bond | single bond | i-15 | ii-1 |
| (ID-192) | single bond | single bond | i-16 | ii-1 |
| (ID-193) | single bond | single bond | i-17 | ii-1 |
| (ID-194) | single bond | single bond | i-18 | ii-1 |
| (ID-195) | single bond | single bond | i-19 | ii-1 |
| (ID-196) | single bond | single bond | i-20 | ii-1 |
| (ID-197) | single bond | single bond | i-21 | ii-1 |
| (ID-198) | single bond | single bond | i-22 | ii-1 |
| (ID-199) | single bond | single bond | i-13 | i-13 |
| (ID-200) | single bond | single bond | i-14 | i-14 |
| (ID-201) | single bond | single bond | i-15 | i-15 |
| (ID-202) | single bond | single bond | i-16 | i-16 |
| (ID-203) | single bond | single bond | i-17 | i-17 |
| (ID-204) | single bond | single bond | i-18 | i-18 |
| (ID-205) | single bond | single bond | i-19 | i-19 |
| (ID-206) | single bond | single bond | i-20 | i-20 |
| (ID-207) | single bond | single bond | i-21 | i-21 |
| (ID-208) | single bond | single bond | i-22 | i-22 |
| (ID-209) | oxygen atom | oxygen atom | i-13 | ii-1 |
| (ID-210) | oxygen atom | oxygen atom | i-14 | ii-1 |
| (ID-211) | oxygen atom | oxygen atom | i-15 | ii-1 |
| (ID-212) | oxygen atom | oxygen atom | i-16 | ii-1 |
| (ID-213) | oxygen atom | oxygen atom | i-17 | ii-1 |
| (ID-214) | oxygen atom | oxygen atom | i-18 | ii-1 |
| (ID-215) | oxygen atom | oxygen atom | i-19 | ii-1 |
| (ID-216) | oxygen atom | oxygen atom | i-20 | ii-1 |
| (ID-217) | oxygen atom | oxygen atom | i-21 | ii-1 |
| (ID-218) | oxygen atom | oxygen atom | i-22 | ii-1 |

TABLE 20-continued

| | Z$^1$ | Z$^2$ | R$^1$ | R$^2$ |
|---|---|---|---|---|
| (ID-219) | oxygen atom | oxygen atom | i-13 | i-13 |
| (ID-220) | oxygen atom | oxygen atom | i-14 | i-14 |
| (ID-221) | oxygen atom | oxygen atom | i-15 | i-15 |
| (ID-222) | oxygen atom | oxygen atom | i-16 | i-16 |
| (ID-223) | oxygen atom | oxygen atom | i-17 | i-17 |
| (ID-224) | oxygen atom | oxygen atom | i-18 | i-18 |
| (ID-225) | oxygen atom | oxygen atom | i-19 | i-19 |
| (ID-226) | oxygen atom | oxygen atom | i-20 | i-20 |
| (ID-227) | oxygen atom | oxygen atom | i-21 | i-21 |
| (ID-228) | oxygen atom | oxygen atom | i-22 | i-22 |
| (ID-229) | oxygen atom | single bond | i-1 | ii-1 |
| (ID-230) | oxygen atom | single bond | i-2 | ii-1 |
| (ID-231) | oxygen atom | single bond | i-3 | ii-1 |
| (ID-232) | oxygen atom | single bond | i-4 | ii-1 |
| (ID-233) | oxygen atom | single bond | i-5 | ii-1 |
| (ID-234) | oxygen atom | single bond | i-6 | ii-1 |
| (ID-235) | oxygen atom | single bond | i-7 | ii-1 |
| (ID-236) | oxygen atom | single bond | i-8 | ii-1 |
| (ID-237) | oxygen atom | single bond | i-9 | ii-1 |
| (ID-238) | oxygen atom | single bond | i-10 | ii-1 |
| (ID-239) | oxygen atom | single bond | i-11 | ii-1 |
| (ID-240) | oxygen atom | single bond | i-12 | ii-1 |
| (ID-241) | oxygen atom | single bond | i-13 | ii-1 |
| (ID-242) | oxygen atom | single bond | i-14 | ii-1 |
| (ID-243) | oxygen atom | single bond | i-15 | ii-1 |

TABLE 20-continued

| | Z$^1$ | Z$^2$ | R$^1$ | R$^2$ |
|---|---|---|---|---|
| (ID-244) | oxygen atom | single bond | i-16 | ii-1 |
| (ID-245) | oxygen atom | single bond | i-17 | ii-1 |
| (ID-246) | oxygen atom | single bond | i-18 | ii-1 |
| (ID-247) | oxygen atom | single bond | i-19 | ii-1 |
| (ID-248) | oxygen atom | single bond | i-20 | ii-1 |
| (ID-249) | oxygen atom | single bond | i-21 | ii-1 |
| (ID-250) | oxygen atom | single bond | i-22 | ii-1 |
| (ID-251) | single bond | oxygen atom | i-1 | ii-2 |
| (ID-252) | single bond | oxygen atom | i-2 | ii-2 |
| (ID-253) | single bond | oxygen atom | i-3 | ii-2 |
| (ID-254) | single bond | oxygen atom | i-4 | ii-2 |
| (ID-255) | single bond | oxygen atom | i-5 | ii-2 |
| (ID-256) | single bond | oxygen atom | i-6 | ii-2 |
| (ID-257) | single bond | oxygen atom | i-7 | ii-2 |
| (ID-258) | single bond | oxygen atom | i-8 | ii-2 |
| (ID-259) | single bond | oxygen atom | i-9 | ii-2 |
| (ID-260) | single bond | oxygen atom | i-10 | ii-2 |
| (ID-261) | single bond | oxygen atom | i-11 | ii-2 |
| (ID-262) | single bond | oxygen atom | i-12 | ii-2 |
| (ID-263) | single bond | oxygen atom | i-13 | ii-2 |
| (ID-264) | single bond | oxygen atom | i-14 | ii-2 |
| (ID-265) | single bond | oxygen atom | i-15 | ii-2 |
| (ID-266) | single bond | oxygen atom | i-16 | ii-2 |
| (ID-267) | single bond | oxygen atom | i-17 | ii-2 |
| (ID-268) | single bond | oxygen atom | i-18 | ii-2 |
| (ID-269) | single bond | oxygen atom | i-19 | ii-2 |
| (ID-270) | single bond | oxygen atom | i-20 | ii-2 |
| (ID-271) | single bond | oxygen atom | i-21 | ii-2 |
| (ID-272) | single bond | oxygen atom | i-22 | ii-2 |

As the compound represented by formula (ID), compounds represented by formulas (ID-1) to (ID-12), (ID-91) to (ID-102), (ID-103) to (ID-108), (ID-115) to (ID-119), (ID-126) to (ID-129), (ID-136) to (ID-138), (ID-145) to (ID-146), (ID-153), (ID-181) to (ID-198), (ID-209) to (ID-220), and (ID-222) to (ID-272) are preferable;

compounds represented by formulas (ID-1) to (ID-12) are more preferable; and compound represented by formula (ID-1) is still more preferable.

TABLE 21

| | $Z^1$ | $Z^2$ | $R^1$ | $R^2$ |
|---|---|---|---|---|
| (IE-1) | single bond | single bond | i-1 | ii-1 |
| (IE-2) | single bond | single bond | i-2 | ii-1 |
| (IE-3) | single bond | single bond | i-3 | ii-1 |
| (IE-4) | single bond | single bond | i-4 | ii-1 |
| (IE-5) | single bond | single bond | i-5 | ii-1 |
| (IE-6) | single bond | single bond | i-6 | ii-1 |
| (IE-7) | single bond | single bond | i-7 | ii-1 |
| (IE-8) | single bond | single bond | i-8 | ii-1 |
| (IE-9) | single bond | single bond | i-9 | ii-1 |
| (IE-10) | single bond | single bond | i-10 | ii-1 |
| (IE-11) | single bond | single bond | i-11 | ii-1 |
| (IE-12) | single bond | single bond | i-12 | ii-1 |
| (IE-13) | single bond | single bond | i-1 | i-1 |
| (IE-14) | single bond | single bond | i-2 | i-1 |
| (IE-15) | single bond | single bond | i-3 | i-1 |
| (IE-16) | single bond | single bond | i-4 | i-1 |
| (IE-17) | single bond | single bond | i-5 | i-1 |
| (IE-18) | single bond | single bond | i-6 | i-1 |
| (IE-19) | single bond | single bond | i-7 | i-1 |
| (IE-20) | single bond | single bond | i-8 | i-1 |
| (IE-21) | single bond | single bond | i-9 | i-1 |
| (IE-22) | single bond | single bond | i-10 | i-1 |
| (IE-23) | single bond | single bond | i-11 | i-1 |
| (IE-24) | single bond | single bond | i-12 | i-1 |
| (IE-25) | single bond | single bond | i-2 | i-2 |
| (IE-26) | single bond | single bond | i-3 | i-2 |
| (IE-27) | single bond | single bond | i-4 | i-2 |
| (IE-28) | single bond | single bond | i-5 | i-2 |
| (IE-29) | single bond | single bond | i-6 | i-2 |
| (IE-30) | single bond | single bond | i-7 | i-2 |
| (IE-31) | single bond | single bond | i-8 | i-2 |
| (IE-32) | single bond | single bond | i-9 | i-2 |
| (IE-33) | single bond | single bond | i-10 | i-2 |
| (IE-34) | single bond | single bond | i-11 | i-2 |
| (IE-35) | single bond | single bond | i-12 | i-2 |
| (IE-36) | single bond | single bond | i-3 | i-3 |
| (IE-37) | single bond | single bond | i-4 | i-3 |
| (IE-38) | single bond | single bond | i-5 | i-3 |
| (IE-39) | single bond | single bond | i-6 | i-3 |
| (IE-40) | single bond | single bond | i-7 | i-3 |
| (IE-41) | single bond | single bond | i-8 | i-3 |
| (IE-42) | single bond | single bond | i-9 | i-3 |
| (IE-43) | single bond | single bond | i-10 | i-3 |
| (IE-44) | single bond | single bond | i-11 | i-3 |
| (IE-45) | single bond | single bond | i-12 | i-3 |
| (IE-46) | single bond | single bond | i-4 | i-4 |
| (IE-47) | single bond | single bond | i-5 | i-4 |
| (IE-48) | single bond | single bond | i-6 | i-4 |
| (IE-49) | single bond | single bond | i-7 | i-4 |
| (IE-50) | single bond | single bond | i-8 | i-4 |
| (IE-51) | single bond | single bond | i-9 | i-4 |
| (IE-52) | single bond | single bond | i-10 | i-4 |
| (IE-53) | single bond | single bond | i-11 | i-4 |
| (IE-54) | single bond | single bond | i-12 | i-4 |
| (IE-55) | single bond | single bond | i-5 | i-5 |
| (IE-56) | single bond | single bond | i-6 | i-5 |
| (IE-57) | single bond | single bond | i-7 | i-5 |
| (IE-58) | single bond | single bond | i-8 | i-5 |
| (IE-59) | single bond | single bond | i-9 | i-5 |
| (IE-60) | single bond | single bond | i-10 | i-5 |

TABLE 22

| | $Z^1$ | $Z^2$ | $R^1$ | $R^2$ |
|---|---|---|---|---|
| (IE-61) | single bond | single bond | i-11 | i-5 |
| (IE-62) | single bond | single bond | i-12 | i-5 |
| (IE-63) | single bond | single bond | i-6 | i-6 |
| (IE-64) | single bond | single bond | i-7 | i-6 |
| (IE-65) | single bond | single bond | i-8 | i-6 |
| (IE-66) | single bond | single bond | i-9 | i-6 |
| (IE-67) | single bond | single bond | i-10 | i-6 |
| (IE-68) | single bond | single bond | i-11 | i-6 |
| (IE-69) | single bond | single bond | i-12 | i-6 |
| (IE-70) | single bond | single bond | i-7 | i-7 |
| (IE-71) | single bond | single bond | i-8 | i-7 |
| (IE-72) | single bond | single bond | i-9 | i-7 |
| (IE-73) | single bond | single bond | i-10 | i-7 |
| (IE-74) | single bond | single bond | i-11 | i-7 |
| (IE-75) | single bond | single bond | i-12 | i-7 |
| (IE-76) | single bond | single bond | i-8 | i-8 |
| (IE-77) | single bond | single bond | i-9 | i-8 |
| (IE-78) | single bond | single bond | i-10 | i-8 |
| (IE-79) | single bond | single bond | i-11 | i-8 |
| (IE-80) | single bond | single bond | i-12 | i-8 |
| (IE-81) | single bond | single bond | i-9 | i-9 |
| (IE-82) | single bond | single bond | i-10 | i-9 |
| (IE-83) | single bond | single bond | i-11 | i-9 |
| (IE-84) | single bond | single bond | i-12 | i-9 |
| (IE-85) | single bond | single bond | i-10 | i-10 |
| (IE-86) | single bond | single bond | i-11 | i-10 |
| (IE-87) | single bond | single bond | i-12 | i-10 |
| (IE-88) | single bond | single bond | i-11 | i-11 |
| (IE-89) | single bond | single bond | i-12 | i-11 |
| (IE-90) | single bond | single bond | i-12 | i-12 |
| (IE-91) | oxygen atom | oxygen atom | i-1 | ii-1 |
| (IE-92) | oxygen atom | oxygen atom | i-2 | ii-1 |
| (IE-93) | oxygen atom | oxygen atom | i-3 | ii-1 |
| (IE-94) | oxygen atom | oxygen atom | i-4 | ii-1 |
| (IE-95) | oxygen atom | oxygen atom | i-5 | ii-1 |
| (IE-96) | oxygen atom | oxygen atom | i-6 | ii-1 |
| (IE-97) | oxygen atom | oxygen atom | i-7 | ii-1 |
| (IE-98) | oxygen atom | oxygen atom | i-8 | ii-1 |
| (IE-99) | oxygen atom | oxygen atom | i-9 | ii-1 |
| (IE-100) | oxygen atom | oxygen atom | i-10 | ii-1 |
| (IE-101) | oxygen atom | oxygen atom | i-11 | ii-1 |
| (IE-102) | oxygen atom | oxygen atom | i-12 | ii-1 |
| (IE-103) | oxygen atom | oxygen atom | i-1 | i-1 |
| (IE-104) | oxygen atom | oxygen atom | i-2 | i-1 |
| (IE-105) | oxygen atom | oxygen atom | i-3 | i-1 |
| (IE-106) | oxygen atom | oxygen atom | i-4 | i-1 |
| (IE-107) | oxygen atom | oxygen atom | i-5 | i-1 |
| (IE-108) | oxygen atom | oxygen atom | i-6 | i-1 |
| (IE-109) | oxygen atom | oxygen atom | i-7 | i-1 |
| (IE-110) | oxygen atom | oxygen atom | i-8 | i-1 |
| (IE-111) | oxygen atom | oxygen atom | i-9 | i-1 |
| (IE-112) | oxygen atom | oxygen atom | i-10 | i-1 |
| (IE-113) | oxygen atom | oxygen atom | i-11 | i-1 |
| (IE-114) | oxygen atom | oxygen atom | i-12 | i-1 |
| (IE-115) | oxygen atom | oxygen atom | i-2 | i-2 |
| (IE-116) | oxygen atom | oxygen atom | i-3 | i-2 |
| (IE-117) | oxygen atom | oxygen atom | i-4 | i-2 |
| (IE-118) | oxygen atom | oxygen atom | i-5 | i-2 |
| (IE-119) | oxygen atom | oxygen atom | i-6 | i-2 |
| (IE-120) | oxygen atom | oxygen atom | i-7 | i-2 |

TABLE 23

| | $Z^1$ | $Z^2$ | $R^1$ | $R^2$ |
|---|---|---|---|---|
| (IE-121) | oxygen atom | oxygen atom | i-8 | i-2 |
| (IE-122) | oxygen atom | oxygen atom | i-9 | i-2 |
| (IE-123) | oxygen atom | oxygen atom | i-10 | i-2 |
| (IE-124) | oxygen atom | oxygen atom | i-11 | i-2 |
| (IE-125) | oxygen atom | oxygen atom | i-12 | i-2 |
| (IE-126) | oxygen atom | oxygen atom | i-3 | i-3 |
| (IE-127) | oxygen atom | oxygen atom | i-4 | i-3 |
| (IE-128) | oxygen atom | oxygen atom | i-5 | i-3 |
| (IE-129) | oxygen atom | oxygen atom | i-6 | i-3 |
| (IE-130) | oxygen atom | oxygen atom | i-7 | i-3 |

TABLE 23-continued

| | $Z^1$ | $Z^2$ | $R^1$ | $R^2$ |
|---|---|---|---|---|
| (IE-131) | oxygen atom | oxygen atom | i-8 | i-3 |
| (IE-132) | oxygen atom | oxygen atom | i-9 | i-3 |
| (IE-133) | oxygen atom | oxygen atom | i-10 | i-3 |
| (IE-134) | oxygen atom | oxygen atom | i-11 | i-3 |
| (IE-135) | oxygen atom | oxygen atom | i-12 | i-3 |
| (IE-136) | oxygen atom | oxygen atom | i-4 | i-4 |
| (IE-137) | oxygen atom | oxygen atom | i-5 | i-4 |
| (IE-138) | oxygen atom | oxygen atom | i-6 | i-4 |
| (IE-139) | oxygen atom | oxygen atom | i-7 | i-4 |
| (IE-140) | oxygen atom | oxygen atom | i-8 | i-4 |
| (IE-141) | oxygen atom | oxygen atom | i-9 | i-4 |
| (IE-142) | oxygen atom | oxygen atom | i-10 | i-4 |
| (IE-143) | oxygen atom | oxygen atom | i-11 | i-4 |
| (IE-144) | oxygen atom | oxygen atom | i-12 | i-4 |
| (IE-145) | oxygen atom | oxygen atom | i-5 | i-5 |
| (IE-146) | oxygen atom | oxygen atom | i-6 | i-5 |
| (IE-147) | oxygen atom | oxygen atom | i-7 | i-5 |
| (IE-148) | oxygen atom | oxygen atom | i-8 | i-5 |
| (IE-149) | oxygen atom | oxygen atom | i-9 | i-5 |
| (IE-150) | oxygen atom | oxygen atom | i-10 | i-5 |
| (IE-151) | oxygen atom | oxygen atom | i-11 | i-5 |
| (IE-152) | oxygen atom | oxygen atom | i-12 | i-5 |
| (IE-153) | oxygen atom | oxygen atom | i-6 | i-6 |
| (IE-154) | oxygen atom | oxygen atom | i-7 | i-6 |
| (IE-155) | oxygen atom | oxygen atom | i-8 | i-6 |
| (IE-156) | oxygen atom | oxygen atom | i-9 | i-6 |
| (IE-157) | oxygen atom | oxygen atom | i-10 | i-6 |
| (IE-158) | oxygen atom | oxygen atom | i-11 | i-6 |
| (IE-159) | oxygen atom | oxygen atom | i-12 | i-6 |
| (IE-160) | oxygen atom | oxygen atom | i-7 | i-7 |
| (IE-161) | oxygen atom | oxygen atom | i-8 | i-7 |
| (IE-162) | oxygen atom | oxygen atom | i-9 | i-7 |
| (IE-163) | oxygen atom | oxygen atom | i-10 | i-7 |
| (IE-164) | oxygen atom | oxygen atom | i-11 | i-7 |
| (IE-165) | oxygen atom | oxygen atom | i-12 | i-7 |
| (IE-166) | oxygen atom | oxygen atom | i-8 | i-8 |
| (IE-167) | oxygen atom | oxygen atom | i-9 | i-8 |
| (IE-168) | oxygen atom | oxygen atom | i-10 | i-8 |
| (IE-169) | oxygen atom | oxygen atom | i-11 | i-8 |
| (IE-170) | oxygen atom | oxygen atom | i-12 | i-8 |
| (IE-171) | oxygen atom | oxygen atom | i-9 | i-9 |
| (IE-172) | oxygen atom | oxygen atom | i-10 | i-9 |
| (IE-173) | oxygen atom | oxygen atom | i-11 | i-9 |
| (IE-174) | oxygen atom | oxygen atom | i-12 | i-9 |
| (IE-175) | oxygen atom | oxygen atom | i-10 | i-10 |
| (IE-176) | oxygen atom | oxygen atom | i-11 | i-10 |
| (IE-177) | oxygen atom | oxygen atom | i-12 | i-10 |
| (IE-178) | oxygen atom | oxygen atom | i-11 | i-11 |
| (IE-179) | oxygen atom | oxygen atom | i-12 | i-11 |
| (IE-180) | oxygen atom | oxygen atom | i-12 | i-12 |

TABLE 24

| | $Z^1$ | $Z^2$ | Group that $R^1$ and $R^2$ form | | $Z^1$ | $Z^2$ | Group that $R^1$ and $R^2$ form | $R^8$ | $R^9$ |
|---|---|---|---|---|---|---|---|---|---|
| (IE-181) | oxygen atom | oxygen atom | ca-1 | (IE-185) | oxygen atom | oxygen atom | cb-1 | cc-1 | OH |
| (IE-182) | oxygen atom | oxygen atom | ca-2 | (IE-186) | single bond | single bond | cb-1 | cc-1 | OH |
| (IE-183) | single bond | single bond | ca-1 | (IE-187) | oxygen atom | oxygen atom | cb-1 | cc-1 | H |
| (IE-184) | single bond | single bond | ca-2 | (IE-188) | single bond | single bond | cb-1 | cc-1 | H |

TABLE 25

| | $Z^1$ | $Z^2$ | $R^1$ | $R^2$ |
|---|---|---|---|---|
| (IE-189) | single bond | single bond | i-13 | ii-1 |
| (IE-190) | single bond | single bond | i-14 | ii-1 |
| (IE-191) | single bond | single bond | i-15 | ii-1 |
| (IE-192) | single bond | single bond | i-16 | ii-1 |
| (IE-193) | single bond | single bond | i-17 | ii-1 |
| (IE-194) | single bond | single bond | i-18 | ii-1 |
| (IE-195) | single bond | single bond | i-19 | ii-1 |
| (IE-196) | single bond | single bond | i-20 | ii-1 |
| (IE-197) | single bond | single bond | i-21 | ii-1 |
| (IE-198) | single bond | single bond | i-22 | ii-1 |
| (IE-199) | single bond | single bond | i-13 | i-13 |
| (IE-200) | single bond | single bond | i-14 | i-14 |
| (IE-201) | single bond | single bond | i-15 | i-15 |
| (IE-202) | single bond | single bond | i-16 | i-16 |
| (IE-203) | single bond | single bond | i-17 | i-17 |
| (IE-204) | single bond | single bond | i-18 | i-18 |
| (IE-205) | single bond | single bond | i-19 | i-19 |
| (IE-206) | single bond | single bond | i-20 | i-20 |
| (IE-207) | single bond | single bond | i-21 | i-21 |
| (IE-208) | single bond | single bond | i-22 | i-22 |
| (IE-209) | oxygen atom | oxygen atom | i-13 | ii-1 |
| (IE-210) | oxygen atom | oxygen atom | i-14 | ii-1 |
| (IE-211) | oxygen atom | oxygen atom | i-15 | ii-1 |
| (IE-212) | oxygen atom | oxygen atom | i-16 | ii-1 |
| (IE-213) | oxygen atom | oxygen atom | i-17 | ii-1 |
| (IE-214) | oxygen atom | oxygen atom | i-18 | ii-1 |
| (IE-215) | oxygen atom | oxygen atom | i-19 | ii-1 |
| (IE-216) | oxygen atom | oxygen atom | i-20 | ii-1 |
| (IE-217) | oxygen atom | oxygen atom | i-21 | ii-1 |
| (IE-218) | oxygen atom | oxygen atom | i-22 | ii-1 |
| (IE-219) | oxygen atom | oxygen atom | i-13 | i-13 |
| (IE-220) | oxygen atom | oxygen atom | i-14 | i-14 |
| (IE-221) | oxygen atom | oxygen atom | i-15 | i-15 |
| (IE-222) | oxygen atom | oxygen atom | i-16 | i-16 |
| (IE-223) | oxygen atom | oxygen atom | i-17 | i-17 |
| (IE-224) | oxygen atom | oxygen atom | i-18 | i-18 |
| (IE-225) | oxygen atom | oxygen atom | i-19 | i-19 |
| (IE-226) | oxygen atom | oxygen atom | i-20 | i-20 |
| (IE-227) | oxygen atom | oxygen atom | i-21 | i-21 |
| (IE-228) | oxygen atom | oxygen atom | i-22 | i-22 |
| (IE-229) | oxygen atom | single bond | i-1 | ii-1 |
| (IE-230) | oxygen atom | single bond | i-2 | ii-1 |
| (IE-231) | oxygen atom | single bond | i-3 | ii-1 |
| (IE-232) | oxygen atom | single bond | i-4 | ii-1 |
| (IE-233) | oxygen atom | single bond | i-5 | ii-1 |
| (IE-234) | oxygen atom | single bond | i-6 | ii-1 |
| (IE-235) | oxygen atom | single bond | i-7 | ii-1 |
| (IE-236) | oxygen atom | single bond | i-8 | ii-1 |
| (IE-237) | oxygen atom | single bond | i-9 | ii-1 |
| (IE-238) | oxygen atom | single bond | i-10 | ii-1 |
| (IE-239) | oxygen atom | single bond | i-11 | ii-1 |
| (IE-240) | oxygen atom | single bond | i-12 | ii-1 |
| (IE-241) | oxygen atom | single bond | i-13 | ii-1 |
| (IE-242) | oxygen atom | single bond | i-14 | ii-1 |
| (IE-243) | oxygen atom | single bond | i-15 | ii-1 |
| (IE-244) | oxygen atom | single bond | i-16 | ii-1 |
| (IE-245) | oxygen atom | single bond | i-17 | ii-1 |
| (IE-246) | oxygen atom | single bond | i-18 | ii-1 |
| (IE-247) | oxygen atom | single bond | i-19 | ii-1 |

TABLE 25-continued

| | $Z^1$ | $Z^2$ | $R^1$ | $R^2$ |
|---|---|---|---|---|
| (IE-248) | oxygen atom | single bond | i-20 | ii-1 |
| (IE-249) | oxygen atom | single bond | i-21 | ii-1 |
| (IE-250) | oxygen atom | single bond | i-22 | ii-1 |
| (IE-251) | single bond | oxygen atom | i-1 | ii-2 |
| (IE-252) | single bond | oxygen atom | i-2 | ii-2 |
| (IE-253) | single bond | oxygen atom | i-3 | ii-2 |
| (IE-254) | single bond | oxygen atom | i-4 | ii-2 |
| (IE-255) | single bond | oxygen atom | i-5 | ii-2 |
| (IE-256) | single bond | oxygen atom | i-6 | ii-2 |
| (IE-257) | single bond | oxygen atom | i-7 | ii-2 |
| (IE-258) | single bond | oxygen atom | i-8 | ii-2 |
| (IE-259) | single bond | oxygen atom | i-9 | ii-2 |
| (IE-260) | single bond | oxygen atom | i-10 | ii-2 |
| (IE-261) | single bond | oxygen atom | i-11 | ii-2 |
| (IE-262) | single bond | oxygen atom | i-12 | ii-2 |
| (IE-263) | single bond | oxygen atom | i-13 | ii-2 |
| (IE-264) | single bond | oxygen atom | i-14 | ii-2 |
| (IE-265) | single bond | oxygen atom | i-15 | ii-2 |
| (IE-266) | single bond | oxygen atom | i-16 | ii-2 |
| (IE-267) | single bond | oxygen atom | i-17 | ii-2 |
| (IE-268) | single bond | oxygen atom | i-18 | ii-2 |
| (IE-269) | single bond | oxygen atom | i-19 | ii-2 |
| (IE-270) | single bond | oxygen atom | i-20 | ii-2 |
| (IE-271) | single bond | oxygen atom | i-21 | ii-2 |
| (IE-272) | single bond | oxygen atom | i-22 | ii-2 |

As the compound represented by formula (IE),
- compounds represented by formulas (IE-1) to (IE-12), (IE-91) to (IE-102), (IE-103) to (IE-108), (IE-115) to (IE-119), (IE-126) to (IE-129), (IE-136) to (IE-138), (IE-145) to (IE-146), (IE-153), (IE-181) to (IE-198), (IE-209) to (IE-220), and (IE-222) to (IE-272) are preferable;
- compounds represented by formulas (IE-1) to (IE-12), (IE-103) to (IE-105), (IE-115) to (IE-116), and (IE-126) are more preferable; and
- compounds represented by formulas (IE-1) and (IE-115) are still more preferable.

TABLE 26

| | $Z^1$ | $Z^2$ | $R^1$ | $R^2$ |
|---|---|---|---|---|
| (IF-1) | single bond | single bond | i-1 | ii-1 |
| (IF-2) | single bond | single bond | i-2 | ii-1 |
| (IF-3) | single bond | single bond | i-3 | ii-1 |
| (IF-4) | single bond | single bond | i-4 | ii-1 |
| (IF-5) | single bond | single bond | i-5 | ii-1 |
| (IF-6) | single bond | single bond | i-6 | ii-1 |
| (IF-7) | single bond | single bond | i-7 | ii-1 |
| (IF-8) | single bond | single bond | i-8 | ii-1 |
| (IF-9) | single bond | single bond | i-9 | ii-1 |
| (IF-10) | single bond | single bond | i-10 | ii-1 |
| (IF-11) | single bond | single bond | i-11 | ii-1 |
| (IF-12) | single bond | single bond | i-12 | ii-1 |
| (IF-13) | single bond | single bond | i-1 | i-1 |
| (IF-14) | single bond | single bond | i-2 | i-1 |
| (IF-15) | single bond | single bond | i-3 | i-1 |
| (IF-16) | single bond | single bond | i-4 | i-1 |
| (IF-17) | single bond | single bond | i-5 | i-1 |
| (IF-18) | single bond | single bond | i-6 | i-1 |
| (IF-19) | single bond | single bond | i-7 | i-1 |
| (IF-20) | single bond | single bond | i-8 | i-1 |
| (IF-21) | single bond | single bond | i-9 | i-1 |
| (IF-22) | single bond | single bond | i-10 | i-1 |
| (IF-23) | single bond | single bond | i-11 | i-1 |
| (IF-24) | single bond | single bond | i-12 | i-1 |
| (IF-25) | single bond | single bond | i-2 | i-2 |
| (IF-26) | single bond | single bond | i-3 | i-2 |
| (IF-27) | single bond | single bond | i-4 | i-2 |
| (IF-28) | single bond | single bond | i-5 | i-2 |
| (IF-29) | single bond | single bond | i-6 | i-2 |
| (IF-30) | single bond | single bond | i-7 | i-2 |
| (IF-31) | single bond | single bond | i-8 | i-2 |

TABLE 26-continued

| | $Z^1$ | $Z^2$ | $R^1$ | $R^2$ |
|---|---|---|---|---|
| (IF-32) | single bond | single bond | i-9 | i-2 |
| (IF-33) | single bond | single bond | i-10 | i-2 |
| (IF-34) | single bond | single bond | i-11 | i-2 |
| (IF-35) | single bond | single bond | i-12 | i-2 |
| (IF-36) | single bond | single bond | i-3 | i-3 |
| (IF-37) | single bond | single bond | i-4 | i-3 |
| (IF-38) | single bond | single bond | i-5 | i-3 |
| (IF-39) | single bond | single bond | i-6 | i-3 |
| (IF-40) | single bond | single bond | i-7 | i-3 |
| (IF-41) | single bond | single bond | i-8 | i-3 |
| (IF-42) | single bond | single bond | i-9 | i-3 |
| (IF-43) | single bond | single bond | i-10 | i-3 |
| (IF-44) | single bond | single bond | i-11 | i-3 |
| (IF-45) | single bond | single bond | i-12 | i-3 |
| (IF-46) | single bond | single bond | i-4 | i-4 |
| (IF-47) | single bond | single bond | i-5 | i-4 |
| (IF-48) | single bond | single bond | i-6 | i-4 |
| (IF-49) | single bond | single bond | i-7 | i-4 |
| (IF-50) | single bond | single bond | i-8 | i-4 |
| (IF-51) | single bond | single bond | i-9 | i-4 |
| (IF-52) | single bond | single bond | i-10 | i-4 |
| (IF-53) | single bond | single bond | i-11 | i-4 |
| (IF-54) | single bond | single bond | i-12 | i-4 |
| (IF-55) | single bond | single bond | i-5 | i-5 |
| (IF-56) | single bond | single bond | i-6 | i-5 |
| (IF-57) | single bond | single bond | i-7 | i-5 |
| (IF-58) | single bond | single bond | i-8 | i-5 |
| (IF-59) | single bond | single bond | i-9 | i-5 |
| (IF-60) | single bond | single bond | i-10 | i-5 |

TABLE 27

| | $Z^1$ | $Z^2$ | $R^1$ | $R^2$ |
|---|---|---|---|---|
| (IF-61) | single bond | single bond | i-11 | i-5 |
| (IF-62) | single bond | single bond | i-12 | i-5 |
| (IF-63) | single bond | single bond | i-6 | i-6 |
| (IF-64) | single bond | single bond | i-7 | i-6 |
| (IF-65) | single bond | single bond | i-8 | i-6 |
| (IF-66) | single bond | single bond | i-9 | i-6 |
| (IF-67) | single bond | single bond | i-10 | i-6 |
| (IF-68) | single bond | single bond | i-11 | i-6 |
| (IF-69) | single bond | single bond | i-12 | i-6 |
| (IF-70) | single bond | single bond | i-7 | i-7 |
| (IF-71) | single bond | single bond | i-8 | i-7 |
| (IF-72) | single bond | single bond | i-9 | i-7 |
| (IF-73) | single bond | single bond | i-10 | i-7 |
| (IF-74) | single bond | single bond | i-11 | i-7 |
| (IF-75) | single bond | single bond | i-12 | i-7 |
| (IF-76) | single bond | single bond | i-8 | i-8 |
| (IF-77) | single bond | single bond | i-9 | i-8 |
| (IF-78) | single bond | single bond | i-10 | i-8 |
| (IF-79) | single bond | single bond | i-11 | i-8 |
| (IF-80) | single bond | single bond | i-12 | i-8 |
| (IF-81) | single bond | single bond | i-9 | i-9 |
| (IF-82) | single bond | single bond | i-10 | i-9 |
| (IF-83) | single bond | single bond | i-11 | i-9 |
| (IF-84) | single bond | single bond | i-12 | i-9 |
| (IF-85) | single bond | single bond | i-10 | i-10 |
| (IF-86) | single bond | single bond | i-11 | i-10 |
| (IF-87) | single bond | single bond | i-12 | i-10 |
| (IF-88) | single bond | single bond | i-11 | i-11 |
| (IF-89) | single bond | single bond | i-12 | i-11 |
| (IF-90) | single bond | single bond | i-12 | i-12 |
| (IF-91) | oxygen atom | oxygen atom | i-1 | ii-1 |
| (IF-92) | oxygen atom | oxygen atom | i-2 | ii-1 |
| (IF-93) | oxygen atom | oxygen atom | i-3 | ii-1 |
| (IF-94) | oxygen atom | oxygen atom | i-4 | ii-1 |
| (IF-95) | oxygen atom | oxygen atom | i-5 | ii-1 |
| (IF-96) | oxygen atom | oxygen atom | i-6 | ii-1 |
| (IF-97) | oxygen atom | oxygen atom | i-7 | ii-1 |
| (IF-98) | oxygen atom | oxygen atom | i-8 | ii-1 |
| (IF-99) | oxygen atom | oxygen atom | i-9 | ii-1 |
| (IF-100) | oxygen atom | oxygen atom | i-10 | ii-1 |
| (IF-101) | oxygen atom | oxygen atom | i-11 | ii-1 |

TABLE 27-continued

| | $Z^1$ | $Z^2$ | $R^1$ | $R^2$ |
|---|---|---|---|---|
| (IF-102) | oxygen atom | oxygen atom | i-12 | ii-1 |
| (IF-103) | oxygen atom | oxygen atom | i-1 | i-1 |
| (IF-104) | oxygen atom | oxygen atom | i-2 | i-1 |
| (IF-105) | oxygen atom | oxygen atom | i-3 | i-1 |
| (IF-106) | oxygen atom | oxygen atom | i-4 | i-1 |
| (IF-107) | oxygen atom | oxygen atom | i-5 | i-1 |
| (IF-108) | oxygen atom | oxygen atom | i-6 | i-1 |
| (IF-109) | oxygen atom | oxygen atom | i-7 | i-1 |
| (IF-110) | oxygen atom | oxygen atom | i-8 | i-1 |
| (IF-111) | oxygen atom | oxygen atom | i-9 | i-1 |
| (IF-112) | oxygen atom | oxygen atom | i-10 | i-1 |
| (IF-113) | oxygen atom | oxygen atom | i-11 | i-1 |
| (IF-114) | oxygen atom | oxygen atom | i-12 | i-1 |
| (IF-115) | oxygen atom | oxygen atom | i-2 | i-2 |
| (IF-116) | oxygen atom | oxygen atom | i-3 | i-2 |
| (IF-117) | oxygen atom | oxygen atom | i-4 | i-2 |
| (IF-118) | oxygen atom | oxygen atom | i-5 | i-2 |
| (IF-119) | oxygen atom | oxygen atom | i-6 | i-2 |
| (IF-120) | oxygen atom | oxygen atom | i-7 | i-2 |

TABLE 28

| | $Z^1$ | $Z^2$ | $R^1$ | $R^2$ |
|---|---|---|---|---|
| (IF-121) | oxygen atom | oxygen atom | i-8 | i-2 |
| (IF-122) | oxygen atom | oxygen atom | i-9 | i-2 |
| (IF-123) | oxygen atom | oxygen atom | i-10 | i-2 |
| (IF-124) | oxygen atom | oxygen atom | i-11 | i-2 |
| (IF-125) | oxygen atom | oxygen atom | i-12 | i-2 |
| (IF-126) | oxygen atom | oxygen atom | i-3 | i-3 |
| (IF-127) | oxygen atom | oxygen atom | i-4 | i-3 |
| (IF-128) | oxygen atom | oxygen atom | i-5 | i-3 |
| (IF-129) | oxygen atom | oxygen atom | i-6 | i-3 |
| (IF-130) | oxygen atom | oxygen atom | i-7 | i-3 |
| (IF-131) | oxygen atom | oxygen atom | i-8 | i-3 |
| (IF-132) | oxygen atom | oxygen atom | i-9 | i-3 |
| (IF-133) | oxygen atom | oxygen atom | i-10 | i-3 |
| (IF-134) | oxygen atom | oxygen atom | i-11 | i-3 |
| (IF-135) | oxygen atom | oxygen atom | i-12 | i-3 |
| (IF-136) | oxygen atom | oxygen atom | i-4 | i-4 |
| (IF-137) | oxygen atom | oxygen atom | i-5 | i-4 |
| (IF-138) | oxygen atom | oxygen atom | i-6 | i-4 |
| (IF-139) | oxygen atom | oxygen atom | i-7 | i-4 |
| (IF-140) | oxygen atom | oxygen atom | i-8 | i-4 |
| (IF-141) | oxygen atom | oxygen atom | i-9 | i-4 |

TABLE 28-continued

| | $Z^1$ | $Z^2$ | $R^1$ | $R^2$ |
|---|---|---|---|---|
| (IF-142) | oxygen atom | oxygen atom | i-10 | i-4 |
| (IF-143) | oxygen atom | oxygen atom | i-11 | i-4 |
| (IF-144) | oxygen atom | oxygen atom | i-12 | i-4 |
| (IF-145) | oxygen atom | oxygen atom | i-5 | i-5 |
| (IF-146) | oxygen atom | oxygen atom | i-6 | i-5 |
| (IF-147) | oxygen atom | oxygen atom | i-7 | i-5 |
| (IF-148) | oxygen atom | oxygen atom | i-8 | i-5 |
| (IF-149) | oxygen atom | oxygen atom | i-9 | i-5 |

TABLE 28-continued

| | $Z^1$ | $Z^2$ | $R^1$ | $R^2$ |
|---|---|---|---|---|
| (IF-150) | oxygen atom | oxygen atom | i-10 | i-5 |
| (IF-151) | oxygen atom | oxygen atom | i-11 | i-5 |
| (IF-152) | oxygen atom | oxygen atom | i-12 | i-5 |
| (IF-153) | oxygen atom | oxygen atom | i-6 | i-6 |
| (IF-154) | oxygen atom | oxygen atom | i-7 | i-6 |
| (IF-155) | oxygen atom | oxygen atom | i-8 | i-6 |
| (IF-156) | oxygen atom | oxygen atom | i-9 | i-6 |
| (IF-157) | oxygen atom | oxygen atom | i-10 | i-6 |
| (IF-158) | oxygen atom | oxygen atom | i-11 | i-6 |
| (IF-159) | oxygen atom | oxygen atom | i-12 | i-6 |
| (IF-160) | oxygen atom | oxygen atom | i-7 | i-7 |
| (IF-161) | oxygen atom | oxygen atom | i-8 | i-7 |
| (IF-162) | oxygen atom | oxygen atom | i-9 | i-7 |
| (IF-163) | oxygen atom | oxygen atom | i-10 | i-7 |
| (IF-164) | oxygen atom | oxygen atom | i-11 | i-7 |
| (IF-165) | oxygen atom | oxygen atom | i-12 | i-7 |
| (IF-166) | oxygen atom | oxygen atom | i-8 | i-8 |
| (IF-167) | oxygen atom | oxygen atom | i-9 | i-8 |
| (IF-168) | oxygen atom | oxygen atom | i-10 | i-8 |
| (IF-169) | oxygen atom | oxygen atom | i-11 | i-8 |
| (IF-170) | oxygen atom | oxygen atom | i-12 | i-8 |
| (IF-171) | oxygen atom | oxygen atom | i-9 | i-9 |
| (IF-172) | oxygen atom | oxygen atom | i-10 | i-9 |
| (IF-173) | oxygen atom | oxygen atom | i-11 | i-9 |
| (IF-174) | oxygen atom | oxygen atom | i-12 | i-9 |
| (IF-175) | oxygen atom | oxygen atom | i-10 | i-10 |
| (IF-176) | oxygen atom | oxygen atom | i-11 | i-10 |
| (IF-177) | oxygen atom | oxygen atom | i-12 | i-10 |
| (IF-178) | oxygen atom | oxygen atom | i-11 | i-11 |
| (IF-179) | oxygen atom | oxygen atom | i-12 | i-11 |
| (IF-180) | oxygen atom | oxygen atom | i-12 | i-12 |

TABLE 29

| | $Z^1$ | $Z^2$ | Group that $R^1$ and $R^2$ form | | $Z^1$ | $Z^2$ | Group that $R^1$ and $R^2$ form | $R^8$ | $R^9$ |
|---|---|---|---|---|---|---|---|---|---|
| (IF-181) | oxygen atom | oxygen atom | ca-1 | (IF-185) | oxygen atom | oxygen atom | cb-1 | cc-1 | OH |
| (IF-182) | oxygen atom | oxygen atom | ca-2 | (IF-186) | single bond | single bond | cb-1 | cc-1 | OH |
| (IF-183) | single bond | single bond | ca-1 | (IF-187) | oxygen atom | oxygen atom | cb-1 | cc-1 | H |
| (IF-184) | single bond | single bond | ca-2 | (IF-188) | single bond | single bond | cb-1 | cc-1 | H |

TABLE 30

| | $Z^1$ | $Z^2$ | $R^1$ | $R^2$ |
|---|---|---|---|---|
| (IF-189) | single bond | single bond | i-13 | ii-1 |
| (IF-190) | single bond | single bond | i-14 | ii-1 |
| (IF-191) | single bond | single bond | i-15 | ii-1 |
| (IF-192) | single bond | single bond | i-16 | ii-1 |
| (IF-193) | single bond | single bond | i-17 | ii-1 |
| (IF-194) | single bond | single bond | i-18 | ii-1 |
| (IF-195) | single bond | single bond | i-19 | ii-1 |
| (IF-196) | single bond | single bond | i-20 | ii-1 |

TABLE 30-continued

| | $Z^1$ | $Z^2$ | $R^1$ | $R^2$ |
|---|---|---|---|---|
| (IF-197) | single bond | single bond | i-21 | ii-1 |
| (IF-198) | single bond | single bond | i-22 | ii-1 |
| (IF-199) | single bond | single bond | i-13 | i-13 |
| (IF-200) | single bond | single bond | i-14 | i-14 |
| (IF-201) | single bond | single bond | i-15 | i-15 |
| (IF-202) | single bond | single bond | i-16 | i-16 |
| (IF-203) | single bond | single bond | i-17 | i-17 |
| (IF-204) | single bond | single bond | i-18 | i-18 |
| (IF-205) | single bond | single bond | i-19 | i-19 |
| (IF-206) | single bond | single bond | i-20 | i-20 |
| (IF-207) | single bond | single bond | i-21 | i-21 |
| (IF-208) | single bond | single bond | i-22 | i-22 |
| (IF-209) | oxygen atom | oxygen atom | i-13 | ii-1 |
| (IF-210) | oxygen atom | oxygen atom | i-14 | ii-1 |
| (IF-211) | oxygen atom | oxygen atom | i-15 | ii-1 |
| (IF-212) | oxygen atom | oxygen atom | i-16 | ii-1 |
| (IF-213) | oxygen atom | oxygen atom | i-17 | ii-1 |
| (IF-214) | oxygen atom | oxygen atom | i-18 | ii-1 |
| (IF-215) | oxygen atom | oxygen atom | i-19 | ii-1 |
| (IF-216) | oxygen atom | oxygen atom | i-20 | ii-1 |
| (IF-217) | oxygen atom | oxygen atom | i-21 | ii-1 |
| (IF-218) | oxygen atom | oxygen atom | i-22 | ii-1 |
| (IF-219) | oxygen atom | oxygen atom | i-13 | i-13 |
| (IF-220) | oxygen atom | oxygen atom | i-14 | i-14 |
| (IF-221) | oxygen atom | oxygen atom | i-15 | i-15 |
| (IF-222) | oxygen atom | oxygen atom | i-16 | i-16 |
| (IF-223) | oxygen atom | oxygen atom | i-17 | i-17 |
| (IF-224) | oxygen atom | oxygen atom | i-18 | i-18 |
| (IF-225) | oxygen atom | oxygen atom | i-19 | i-19 |
| (IF-226) | oxygen atom | oxygen atom | i-20 | i-20 |
| (IF-227) | oxygen atom | oxygen atom | i-21 | i-21 |
| (IF-228) | oxygen atom | oxygen atom | i-22 | i-22 |
| (IF-229) | oxygen atom | single bond | i-1 | ii-1 |
| (IF-230) | oxygen atom | single bond | i-2 | ii-1 |
| (IF-231) | oxygen atom | single bond | i-3 | ii-1 |
| (IF-232) | oxygen atom | single bond | i-4 | ii-1 |
| (IF-233) | oxygen atom | single bond | i-5 | ii-1 |
| (IF-234) | oxygen atom | single bond | i-6 | ii-1 |
| (IF-235) | oxygen atom | single bond | i-7 | ii-1 |
| (IF-236) | oxygen atom | single bond | i-8 | ii-1 |
| (IF-237) | oxygen atom | single bond | i-9 | ii-1 |
| (IF-238) | oxygen atom | single bond | i-10 | ii-1 |
| (IF-239) | oxygen atom | single bond | i-11 | ii-1 |
| (IF-240) | oxygen atom | single bond | i-12 | ii-1 |
| (IF-241) | oxygen atom | single bond | i-13 | ii-1 |
| (IF-242) | oxygen atom | single bond | i-14 | ii-1 |

TABLE 30-continued

| | $Z^1$ | $Z^2$ | $R^1$ | $R^2$ |
|---|---|---|---|---|
| (IF-243) | oxygen atom | single bond | i-15 | ii-1 |
| (IF-244) | oxygen atom | single bond | i-16 | ii-1 |
| (IF-245) | oxygen atom | single bond | i-17 | ii-1 |
| (IF-246) | oxygen atom | single bond | i-18 | ii-1 |
| (IF-247) | oxygen atom | single bond | i-19 | ii-1 |
| (IF-248) | oxygen atom | single bond | i-20 | ii-1 |
| (IF-249) | oxygen atom | single bond | i-21 | ii-1 |
| (IF-250) | oxygen atom | single bond | i-22 | ii-1 |
| (IF-251) | single bond | oxygen atom | i-1 | ii-2 |
| (IF-252) | single bond | oxygen atom | i-2 | ii-2 |
| (IF-253) | single bond | oxygen atom | i-3 | ii-2 |
| (IF-254) | single bond | oxygen atom | i-4 | ii-2 |
| (IF-255) | single bond | oxygen atom | i-5 | ii-2 |
| (IF-256) | single bond | oxygen atom | i-6 | ii-2 |
| (IF-257) | single bond | oxygen atom | i-7 | ii-2 |
| (IF-258) | single bond | oxygen atom | i-8 | ii-2 |
| (IF-259) | single bond | oxygen atom | i-9 | ii-2 |
| (IF-260) | single bond | oxygen atom | i-10 | ii-2 |
| (IF-261) | single bond | oxygen atom | i-11 | ii-2 |
| (IF-262) | single bond | oxygen atom | i-12 | ii-2 |
| (IF-263) | single bond | oxygen atom | i-13 | ii-2 |
| (IF-264) | single bond | oxygen atom | i-14 | ii-2 |
| (IF-265) | single bond | oxygen atom | i-15 | ii-2 |
| (IF-266) | single bond | oxygen atom | i-16 | ii-2 |
| (IF-267) | single bond | oxygen atom | i-17 | ii-2 |
| (IF-268) | single bond | oxygen atom | i-18 | ii-2 |
| (IF-269) | single bond | oxygen atom | i-19 | ii-2 |
| (IF-270) | single bond | oxygen atom | i-20 | ii-2 |
| (IF-271) | single bond | oxygen atom | i-21 | ii-2 |
| (IF-272) | single bond | oxygen atom | i-22 | ii-2 |

As the compound represented by formula (IF), compounds represented by formulas (IF-1) to (IF-12), (IF-91) to (IF-108), (IF-115) to (IF-119), (IF-126) to (IF-129), (IF-136) to (IF-138), (IF-145) to (IF-146), (IF-153), (IF-181) to (IF-198), (IF-209) to (IF-220), and (IF-222) to (IF-272) are preferable;

compounds represented by formulas (IF-1) to (IF-12), (IF-103) to (IF-105), (IF-115) to (IF-116), and (IF-126) are more preferable; and compounds represented by formulas (IF-1) and (IF-115) are still more preferable.

As the compound represented by formula (II), compounds represented by formulas (IIA) to (IIF) are preferable.

(IIA)

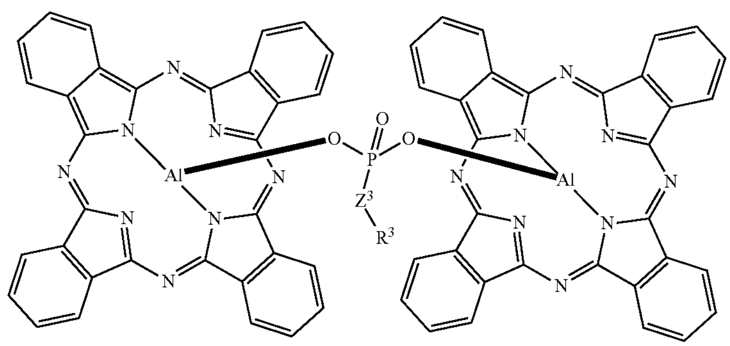

-continued
(IIB)
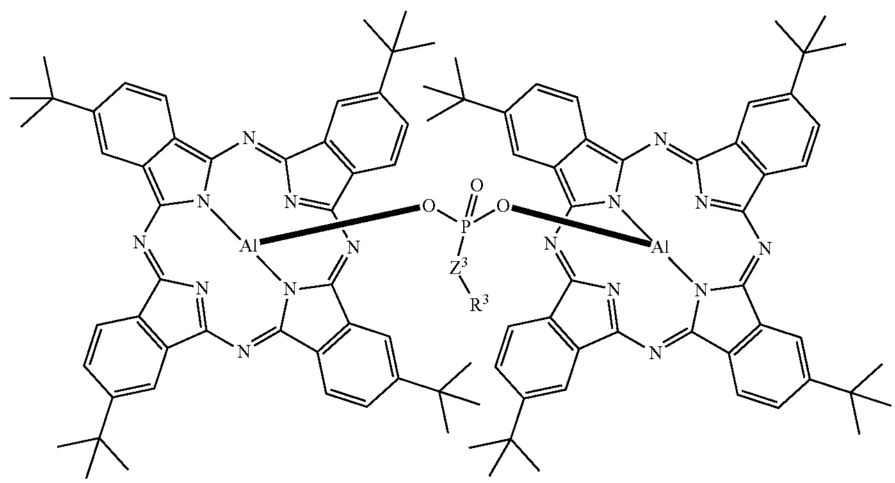
(IIC)
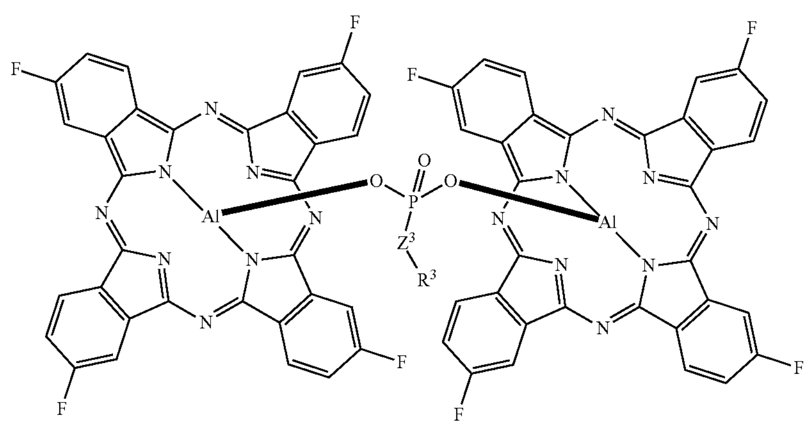
(IID)
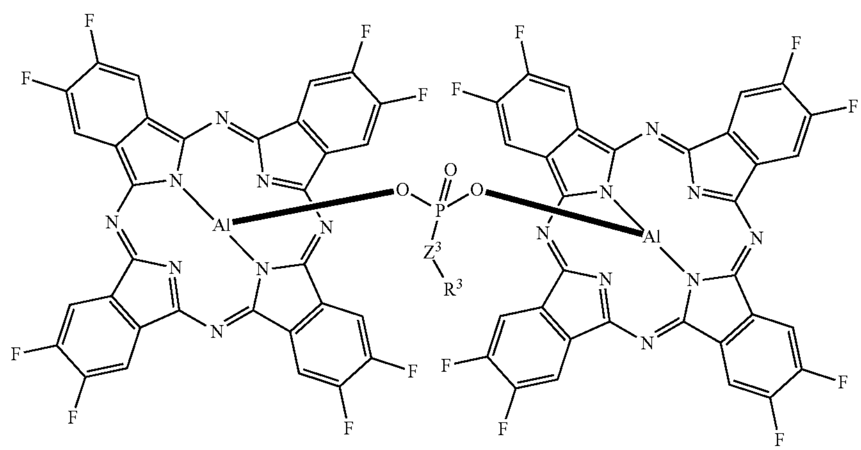

-continued (IIE)

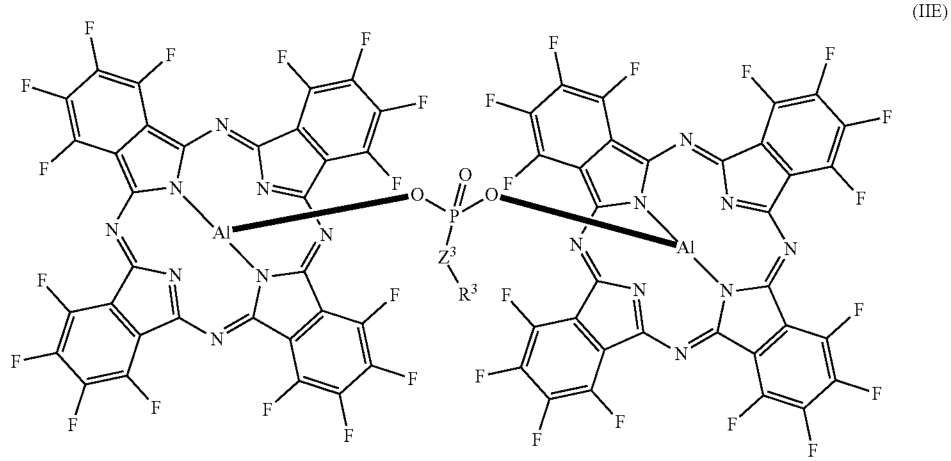

(IIF)

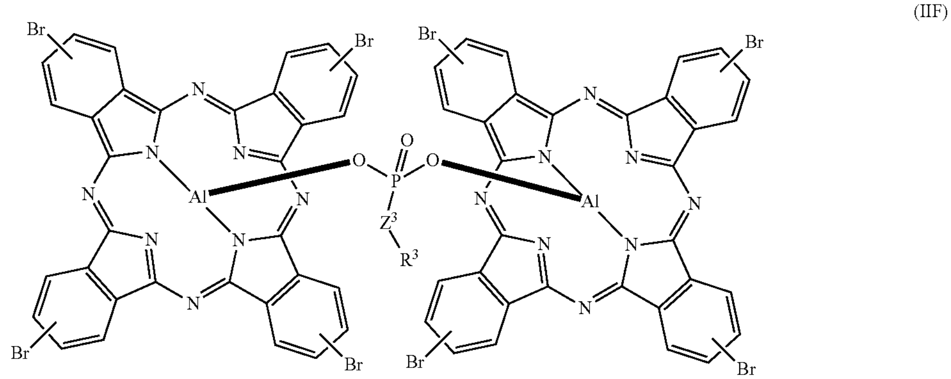

In formulas (IIA) to (IIF), $R^3$ and $Z^3$ are the same as mentioned above.

Examples of compounds represented by formula (IIA) include compounds represented by formulas (IIA-1) to (IIA-18) shown in Table 31.

Examples of compounds represented by formula (IIB) include compounds represented by formulas (IIB-1) to (IIB-18) shown in Table 32.

Examples of compounds represented by formula (IIC) include compounds represented by formulas (IIC-1) to (IIC-18) shown in Table 33.

Examples of compounds represented by formula (IID) include compounds represented by formulas (IID-1) to (IID-18) shown in Table 34.

Examples of compounds represented by formula (IIE) include compounds represented by formulas (IIE-1) to (IIE-18) shown in Table 35.

Examples of compounds represented by formula (IIF) include compounds represented by formulas (IIF-1) to (IIF-18) shown in Table 36.

The codes shown in the column "$R^3$" in Tables 31 to 36 correspond to the respective groups represented by formulas (iii-1) to (iii-9).

(iii-1)

(iii-2)

(iii-3)

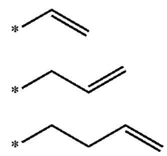

-continued (iii-4)

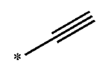

(iii-5)

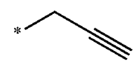

(iii-6)

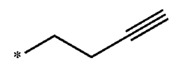

(iii-7)

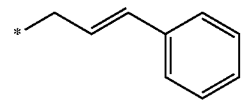

(iii-8)

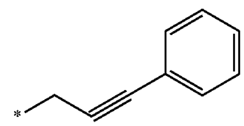

(iii-9)

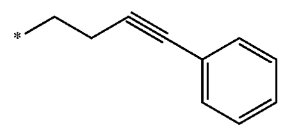

*represents a point of attachment.

TABLE 31

| | $Z^3$ | $R^3$ |
|---|---|---|
| (IIA-1) | single bond | iii-1 |
| (IIA-2) | single bond | iii-2 |
| (IIA-3) | single bond | iii-3 |
| (IIA-4) | single bond | iii-4 |
| (IIA-5) | single bond | iii-5 |
| (IIA-6) | single bond | iii-6 |
| (IIA-7) | single bond | iii-7 |
| (IIA-8) | single bond | iii-8 |
| (IIA-9) | single bond | iii-9 |
| (IIA-10) | oxygen atom | iii-1 |
| (IIA-11) | oxygen atom | iii-2 |
| (IIA-12) | oxygen atom | iii-3 |
| (IIA-13) | oxygen atom | iii-4 |
| (IIA-14) | oxygen atom | iii-5 |
| (IIA-15) | oxygen atom | iii-6 |
| (IIA-16) | oxygen atom | iii-7 |
| (IIA-17) | oxygen atom | iii-8 |
| (IIA-18) | oxygen atom | iii-9 |

As the compound represented by formula (IIA), compounds represented by formulas (IIA-1) to (IIA-6) and (IIA-10) to (IIA-15) are preferable.

TABLE 32

| | $Z^3$ | $R^3$ |
|---|---|---|
| (IIB-1) | single bond | iii-1 |
| (IIB-2) | single bond | iii-2 |
| (IIB-3) | single bond | iii-3 |
| (IIB-4) | single bond | iii-4 |
| (IIB-5) | single bond | iii-5 |
| (IIB-6) | single bond | iii-6 |
| (IIB-7) | single bond | iii-7 |
| (IIB-8) | single bond | iii-8 |
| (IIB-9) | single bond | iii-9 |
| (IIB-10) | oxygen atom | iii-1 |
| (IIB-11) | oxygen atom | iii-2 |
| (IIB-12) | oxygen atom | iii-3 |
| (IIB-13) | oxygen atom | iii-4 |
| (IIB-14) | oxygen atom | iii-5 |
| (IIB-15) | oxygen atom | iii-6 |
| (IIB-16) | oxygen atom | iii-7 |
| (IIB-17) | oxygen atom | iii-8 |
| (IIB-18) | oxygen atom | iii-9 |

As the compound represented by formula (IIB), compounds represented by formulas (IIB-1) to (IIB-6) and (IIB-10) to (IIB-15) are preferable.

TABLE 33

| | $Z^3$ | $R^3$ |
|---|---|---|
| (IIC-1) | single bond | iii-1 |
| (IIC-2) | single bond | iii-2 |
| (IIC-3) | single bond | iii-3 |
| (IIC-4) | single bond | iii-4 |
| (IIC-5) | single bond | iii-5 |
| (IIC-6) | single bond | iii-6 |
| (IIC-7) | single bond | iii-7 |
| (IIC-8) | single bond | iii-8 |
| (IIC-9) | single bond | iii-9 |
| (IIC-10) | oxygen atom | iii-1 |
| (IIC-11) | oxygen atom | iii-2 |
| (IIC-12) | oxygen atom | iii-3 |
| (IIC-13) | oxygen atom | iii-4 |
| (IIC-14) | oxygen atom | iii-5 |
| (IIC-15) | oxygen atom | iii-6 |
| (IIC-16) | oxygen atom | iii-7 |
| (IIC-17) | oxygen atom | iii-8 |
| (IIC-18) | oxygen atom | iii-9 |

TABLE 33-continued

As the compound represented by formula (IIC), compounds represented by formulas (IIC-1) to (IIC-6) and (IIC-10) to (IIC-15) are preferable.

TABLE 34

| | $Z^3$ | $R^3$ |
|---|---|---|
| (IID-1) | single bond | iii-1 |
| (IID-2) | single bond | iii-2 |
| (IID-3) | single bond | iii-3 |
| (IID-4) | single bond | iii-4 |
| (IID-5) | single bond | iii-5 |
| (IID-6) | single bond | iii-6 |
| (IID-7) | single bond | iii-7 |
| (IID-8) | single bond | iii-8 |
| (IID-9) | single bond | iii-9 |
| (IID-10) | oxygen atom | iii-1 |
| (IID-11) | oxygen atom | iii-2 |
| (IID-12) | oxygen atom | iii-3 |
| (IID-13) | oxygen atom | iii-4 |
| (IID-14) | oxygen atom | iii-5 |
| (IID-15) | oxygen atom | iii-6 |
| (IID-16) | oxygen atom | iii-7 |
| (IID-17) | oxygen atom | iii-8 |
| (IID-18) | oxygen atom | iii-9 |

As the compound represented by formula (IID), compounds represented by formulas (IID-1) to (IID-6) and (IID-10) to (IID-15) are preferable.

TABLE 35

| | $Z^3$ | $R^3$ |
|---|---|---|
| (IIE-1) | single bond | iii-1 |
| (IIE-2) | single bond | iii-2 |
| (IIE-3) | single bond | iii-3 |
| (IIE-4) | single bond | iii-4 |
| (IIE-5) | single bond | iii-5 |
| (IIE-6) | single bond | iii-6 |
| (IIE-7) | single bond | iii-7 |
| (IIE-8) | single bond | iii-8 |
| (IIE-9) | single bond | iii-9 |
| (IIE-10) | oxygen atom | iii-1 |
| (IIE-11) | oxygen atom | iii-2 |
| (IIE-12) | oxygen atom | iii-3 |
| (IIE-13) | oxygen atom | iii-4 |
| (IIE-14) | oxygen atom | iii-5 |
| (IIE-15) | oxygen atom | iii-6 |
| (IIE-16) | oxygen atom | iii-7 |
| (IIE-17) | oxygen atom | iii-8 |
| (IIE-18) | oxygen atom | iii-9 |

As the compound represented by formula (IIE), compounds represented by formulas (IIE-1) to (IIE-6) and (IIE-10) to (IIE-15) are preferable.

TABLE 36

| | $Z^3$ | $R^3$ |
|---|---|---|
| (IIF-1) | single bond | iii-1 |
| (IIF-2) | single bond | iii-2 |

TABLE 36-continued

| | $Z^3$ | $R^3$ |
|---|---|---|
| (IIF-3) | single bond | iii-3 |
| (IIF-4) | single bond | iii-4 |
| (IIF-5) | single bond | iii-5 |
| (IIF-6) | single bond | iii-6 |
| (IIF-7) | single bond | iii-7 |
| (IIF-8) | single bond | iii-8 |
| (IIF-9) | single bond | iii-9 |
| (IIF-10) | oxygen atom | iii-1 |
| (IIF-11) | oxygen atom | iii-2 |
| (IIF-12) | oxygen atom | iii-3 |
| (IIF-13) | oxygen atom | iii-4 |
| (IIF-14) | oxygen atom | iii-5 |
| (IIF-15) | oxygen atom | iii-6 |
| (IIF-16) | oxygen atom | iii-7 |
| (IIF-17) | oxygen atom | iii-8 |
| (IIF-18) | oxygen atom | iii-9 |

As the compound represented by formula (IIF), compounds represented by formulas (IIF-1) to (IIF-6) and (IIF-10) to (IIF-15) are preferable.

The compound represented by formula (I) can be produced, for example, by appropriately reacting the compound represented by formula (III) with the compound represented by formula (IV).

The compound represented by formula (II) can be produced, for example, by appropriately reacting the compound represented by formula (III) with the compound represented by formula (V).

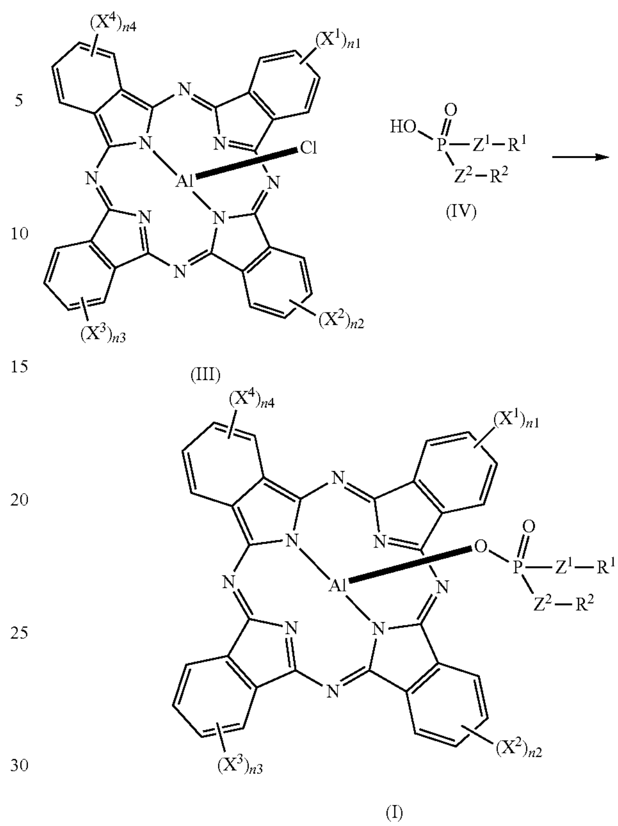

(III) (IV) (I)

In formulas (I), (III), and (IV), $R^1$, $R^2$, $Z^1$, $Z^2$, $X^1$ to $X^4$, and n1 to n4 are the same as mentioned above.

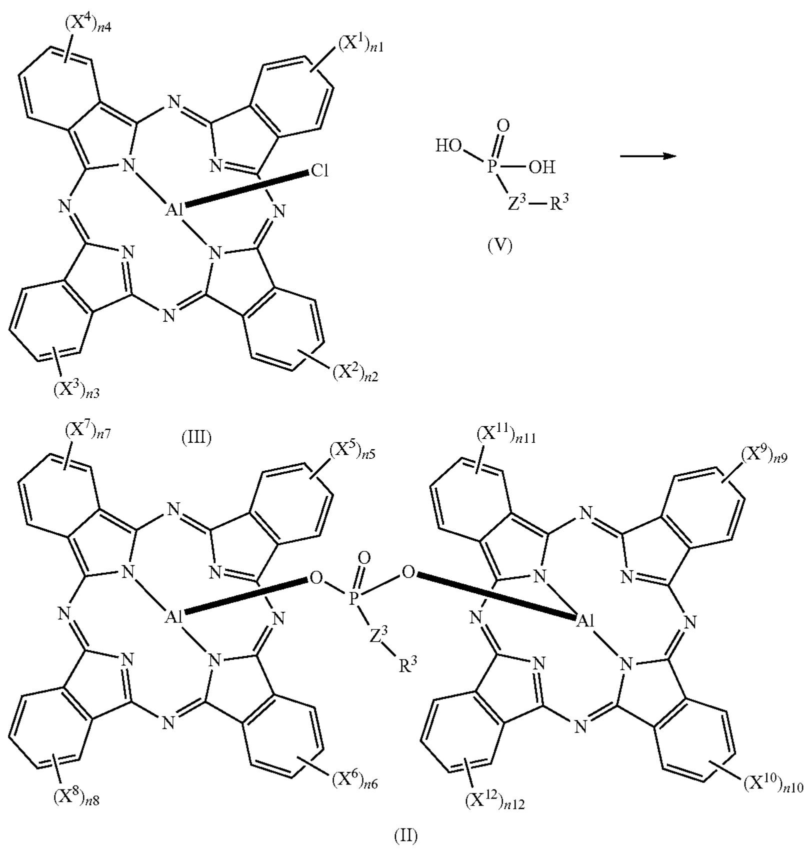

(III) (V) (II)

In formulas (II), (III), and (V), $R^3$, $Z^3$, $X^1$ to $X^{12}$, and n1 to n12 are the same as mentioned above.

<<Colored Resin Composition>>

The present invention includes a colored resin composition containing the compound represented by formula (I) or formula (II) described above and a resin (hereinafter, sometimes referred to as a resin (B)).

The present invention also includes a colored resin composition further containing a polymerizable compound (hereinafter, sometimes referred to as a polymerizable compound (C)) and a polymerization initiator (hereinafter, sometimes referred to as a polymerization initiator (D)).

The colored resin composition of the present invention preferably contains the compounds represented by formula (I) and/or formula (II) (hereinafter, sometimes referred to as a colorant (A1)) as a colorant (hereinafter, sometimes referred to as a colorant (A)).

The colored resin composition of the present invention preferably further contains a solvent (hereinafter, sometimes referred to as a solvent (E)).

The colored resin composition of the present invention may contain a leveling agent (hereinafter, sometimes referred to as a leveling agent (F)).

Herein, compounds exemplified as each component may be used singly or in combination of a plurality thereof unless otherwise noted.

<Colorant (A)>

The content of the colorant (A1) is preferably 0.5 to 70% by mass, more preferably 1 to 55% by mass, still more preferably 2 to 50% by mass, and particularly preferably 8 to 40% by mass in the whole amount of the solid content of the colored resin composition.

Herein, the term "whole amount of the solid content" means the total amount of components obtained by excluding the solvent from the colored resin composition of the present invention. The whole amount of the solid content and the content of each of the components with respect thereto can be measured by known analysis means such as liquid chromatography or gas chromatography.

The content of the colorant (A1) in the whole amount of the colorant (A) is preferably 20 to 100% by mass, more preferably 30 to 100% by mass, and still more preferably 40 to 100% by mass.

The colorant (A) may further contain a different colorant (hereinafter, sometimes referred to as a colorant (A2)) from the colorant (A1).

The colorant (A2) may be one or both of a dye and a pigment.

Examples of the dye include a compound that is not a pigment but classified into a compound having a hue in the Color Index (published by The Society of Dyers and Colourists), and a known dye as described in Dying note (Shikisensha Co., Ltd.). Particularly preferred is a xanthene dye.

The xanthene dye is a dye containing a compound having a xanthene skeleton in its molecule. Specific examples of the xanthene dye include C.I. Acid Red 51 (hereinafter, the term "C.I. Acid Red" is omitted and only the number is shown; ditto for other dyes), 52, 87, 92, 94, 289, and 388; C.I. Acid Violet 9, 30, and 102; C.I. Basic Red 1 (Rhodamine 6G), 2, 3, 4, 8, 10, and 11; C.I. Basic Violet 10 (Rhodamine B) and 11; C.I. Solvent Red 218; C.I. Mordant Red 27; C.I. Reactive Red 36 (Rose Bengal B); Sulforhodamine G; a xanthene dye described in Japanese Patent Laid-Open No. 2010-32999; and a xanthene dye described in Japanese Patent No. 4492760. The xanthene dye is preferably dissolved in an organic solvent.

The xanthene dye may be any commercially available xanthene dye such as "Chugai Aminol Fast Pink R-H/C" manufactured by Chugai Kasei Co., Ltd., or "Rhodamin 6G" manufactured by Taoka Chemical Co., Ltd. The xanthene dye may also be one synthesized with a commercially available xanthene dye as a starting material, with reference to Japanese Patent Laid-Open No. 2010-32999.

As other dyes, an azo dye, a cyanine dye, a triphenylmethane dye, a thiazole dye, an oxazine dye, a phthalocyanine dye, a quinophthalone dye, an anthraquinone dye, a naphthoquinone dye, a quinonimine dye, a methine dye, an azomethine dye, a squarylium dye, an acridine dye, a styryl dye, a coumarin dye, a quinoline dye, a nitro dye, and the like may be used, and for each of these dyes, known dyes are used.

Specific examples of the dye include

C. I. Solvent dyes such as:

C. I. Solvent Yellow 4 (hereinafter, the term "C. I. Solvent Yellow" is omitted and only the number is shown; ditto for other dyes), 14, 15, 23, 24, 38, 62, 63, 68, 82, 94, 98, 99, 117, 162, 163, 167, and 189;

C. I. Solvent Red 45, 49, 111, 125, 130, 143, 145, 146, 150, 151, 155, 168, 169, 172, 175, 181, 207, 222, 227, 230, 245, and 247;

C. I. Solvent Orange 2, 7, 11, 15, 26, 56, 77, and 86;

C. I. Solvent Violet 11, 13, 14, 26, 31, 36, 37, 38, 45, 47, 48, 51, 59, and 60;

C. I. Solvent Blue 4, 5, 14, 18, 35, 36, 37, 45, 58, 59, 59:1, 63, 67, 68, 69, 70, 78, 79, 83, 90, 94, 97, 98, 100, 101, 102, 104, 105, 111, 112, 122, 128, 132, 136, and 139; and C. I. Solvent Green 1, 3, 4, 5, 7, 28, 29, 32, 33, 34, and 35, C. I. Acid dyes such as:

C. I. Acid Yellow 1, 3, 7, 9, 11, 17, 23, 25, 29, 34, 36, 38, 40, 42, 54, 65, 72, 73, 76, 79, 98, 99, 111, 112, 113, 114, 116, 119, 123, 128, 134, 135, 138, 139, 140, 144, 150, 155, 157, 160, 161, 163, 168, 169, 172, 177, 178, 179, 184, 190, 193, 196, 197, 199, 202, 203, 204, 205, 207, 212, 214, 220, 221, 228, 230, 232, 235, 238, 240, 242, 243, and 251;

C. I. Acid Red 1, 4, 8, 14, 17, 18, 26, 27, 29, 31, 33, 34, 35, 37, 40, 42, 44, 50, 57, 66, 73, 76, 80, 88, 91, 95, 97, 98, 103, 106, 111, 114, 129, 133, 134, 138, 143, 145, 150, 151, 155, 158, 160, 172, 176, 182, 183, 195, 198, 206, 211, 215, 216, 217, 227, 228, 249, 252, 257, 258, 260, 261, 266, 268, 270, 274, 277, 280, 281, 308, 312, 315, 316, 339, 341, 345, 346, 349, 382, 383, 394, 401, 412, 417, 418, 422, and 426;

C. I. Acid Orange 6, 7, 8, 10, 12, 26, 50, 51, 52, 56, 62, 63, 64, 74, 75, 94, 95, 107, 108, 169, and 173;

C. I. Acid Violet 6B, 7, 15, 16, 17, 19, 21, 23, 24, 25, 34, 38, 49, and 72;

C.I. Acid Blue 1, 3, 5, 7, 9, 11, 13, 15, 17, 18, 22, 23, 24, 25, 26, 27, 29, 34, 38, 40, 41, 42, 43, 45, 48, 51, 54, 59, 60, 62, 70, 72, 74, 75, 78, 80, 82, 83, 86, 87, 88, 90, 90:1, 91, 92, 93, 93:1, 96, 99, 100, 102, 103, 104, 108, 109, 110, 112, 113, 117, 119, 120, 123, 126, 127, 129, 130, 131, 138, 140, 142, 143, 147, 150, 151, 154, 158, 161, 166, 167, 168, 170, 171, 175, 182, 183, 184, 187, 192, 199, 203, 204, 205, 210, 213, 229, 234, 236, 242, 243, 256, 259, 267, 269, 278, 280, 285, 290, 296, 315, 324:1, 335, and 340; and C. I. Acid Green 1, 3, 5, 6, 7, 8, 9, 11, 13, 14, 15, 16, 22, 25, 27, 28, 41, 50, 50:1, 58, 63, 65, 80, 104, 105, 106, and 109, C. I. Direct dyes such as:

C. I. Direct Yellow 2, 33, 34, 35, 38, 39, 43, 47, 50, 54, 58, 68, 69, 70, 71, 86, 93, 94, 95, 98, 102, 108, 109, 129, 136, 138, and 141;

C. I. Direct Red 79, 82, 83, 84, 91, 92, 96, 97, 98, 99, 105, 106, 107, 172, 173, 176, 177, 179, 181, 182, 184, 204, 207, 211, 213, 218, 220, 221, 222, 232, 233, 234, 241, 243, 246, and 250;

C. I. Direct Orange 26, 34, 39, 41, 46, 50, 52, 56, 57, 61, 64, 65, 68, 70, 96, 97, 106, and 107;

C. I. Direct Violet 47, 52, 54, 59, 60, 65, 66, 79, 80, 81, 82, 84, 89, 90, 93, 95, 96, 103, and 104;

C. I. Direct Blue 1, 2, 3, 6, 8, 15, 22, 25, 28, 29, 40, 41, 42, 47, 52, 55, 57, 71, 76, 77, 78, 80, 81, 84, 85, 86, 90, 93, 94, 95, 97, 98, 99, 100, 101, 106, 107, 108, 109, 113, 114, 115, 117, 119, 120, 137, 149, 150, 153, 155, 156, 158, 159, 160, 161, 162, 163, 164, 165, 166, 167, 168, 170, 171, 172, 173, 188, 189, 190, 192, 193, 194, 195, 196, 198, 199, 200, 201, 202, 203, 207, 209, 210, 212, 213, 214, 222, 225, 226, 228, 229, 236, 237, 238, 242, 243, 244, 245, 246, 247, 248, 249, 250, 251, 252, 256, 257, 259, 260, 268, 274, 275, and 293; and C. I. Direct Greens 25, 27, 31, 32, 34, 37, 63, 65, 66, 67, 68, 69, 72, 77, 79, and 82, C. I. Disperse dyes such as:

C. I. Disperse Yellow 51, 54, and 76;

C. I. Disperse Violet 26 and 27; and

C. I. Disperse Blue 1, 14, 56, and 60,

C. I. Basic dyes such as:

C. I. Basic Blue 1, 3, 5, 7, 9, 19, 21, 22, 24, 25, 26, 28, 29, 40, 41, 45, 47, 54, 58, 59, 60, 64, 65, 66, 67, 68, 81, 83, 88, and 89;

C. I. Basic Violet 2;

C. I. Basic Red 9; and

C. I. Basic Green 1,

C. I. Reactive dyes such as:

C. I. Reactive Yellow 2, 76, and 116;

C. I. Reactive Orange 16; and

C. I. Reactive Red 36,

C. I. Mordant dyes such as:

C. I. Mordant Yellow 5, 8, 10, 16, 20, 26, 30, 31, 33, 42, 43, 45, 56, 61, 62, and 65;

C. I. Mordant Red 1, 2, 3, 4, 9, 11, 12, 14, 17, 18, 19, 22, 23, 24, 25, 26, 29, 30, 32, 33, 36, 37, 38, 39, 41, 42, 43, 45, 46, 48, 52, 53, 56, 62, 63, 71, 74, 76, 78, 85, 86, 88, 90, 94, and 95;

C. I. Mordant Orange 3, 4, 5, 8, 12, 13, 14, 20, 21, 23, 24, 28, 29, 32, 34, 35, 36, 37, 42, 43, 47, and 48;

C. I. Mordant Violet 1, 1:1, 2, 3, 4, 5, 6, 7, 8, 10, 11, 14, 15, 16, 17, 18, 19, 21, 22, 23, 24, 27, 28, 30, 31, 32, 33, 36, 37, 39, 40, 41, 44, 45, 47, 48, 49, 53, and 58;

C. I. Mordant Blue 1, 2, 3, 7, 8, 9, 12, 13, 15, 16, 19, 20, 21, 22, 23, 24, 26, 30, 31, 32, 39, 40, 41, 43, 44, 48, 49, 53, 61, 74, 77, 83, and 84; and C. I. Mordant Green 1, 3, 4, 5, 10, 13, 15, 19, 21, 23, 26, 29, 31, 33, 34, 35, 41, 43, and 53; and C. I. Vat dyes such as:

C. I. Vat Green 1.

One dye or a plurality of dyes may be used for each of the colors of these dyes, and the dyes of the colors may be used in combination.

Examples of the pigment include a pigment that is classified into a pigment in the Color Index (published by The Society of Dyers and Colourists).

Specific examples of the pigment include green pigments such as C.I. Pigment Green 7, 36, and 58;

yellow pigments such as C.I. Pigment Yellow 1, 3, 12, 13, 14, 15, 16, 17, 20, 24, 31, 53, 83, 86, 93, 94, 109, 110, 117, 125, 128, 129, 137, 138, 139, 147, 148, 150, 153, 154, 166, 173, 185, 194, and 214;

orange pigments such as C.I. Pigment Orange 13, 31, 36, 38, 40, 42, 43, 51, 55, 59, 61, 64, 65, 71, and 73;

red pigments such as C.I. Pigment Red 9, 97, 105, 122, 123, 144, 149, 166, 168, 176, 177, 180, 192, 209, 215, 216, 224, 242, 254, 255, 264, and 265;

blue pigments such as C.I. Pigment Blue 15, 15:3, 15:4, 15:6, and 60; and violet pigments such as C.I. Pigment Violet 1, 19, 23, 29, 32, 36, and 38.

One pigment or a plurality of pigments may be used for each of the colors of these pigments, and the pigments of the colors may be used in combination.

If necessary, the pigment may be subjected to a treatment such as a rosin treatment; a surface treatment using a pigment derivative or the like having an introduced acidic group or basic group; a pigment surface graft treatment with a polymeric compound or the like; a particle micronization treatment by a sulfuric acid micronization method or the like; a washing treatment with an organic solvent, water or the like for removing impurities; or a removing treatment of ionic impurities by an ionic exchange method or the like. The pigment preferably has a substantially uniform particle diameter. To the pigment, a pigment dispersant is added, followed by performing a dispersion treatment, whereby a pigment dispersion in which the pigment is uniformly dispersed may be produced. The pigment may be each independently subjected to the dispersion treatment, or a plurality of pigments may be together subjected to the dispersion treatment.

Examples of the pigment dispersant include surfactants such as a cationic surfactant, an anionic surfactant, a nonionic surfactant, and an amphoteric surfactant. Specific examples thereof include surfactants such as a polyester-based surfactant, a polyamine-based surfactant, and an acrylic surfactant. These pigment dispersants may be used singly or in combination of two or more thereof. Examples in trade names of the pigment dispersant include KP (manufactured by Shin-Etsu Chemical Co., Ltd.), Flowlen (manufactured by Kyoeisha Chemical Co., Ltd.), Solsperse (registered trademark) (manufactured by Zeneca Ltd.), EFKA (registered trademark) (manufactured by BASF Corporation), AJISPER (registered trademark) (manufactured by Ajinomoto Fine-Techno Co., Inc.), Disperbyk (registered trademark) (manufactured by BYK-Chemie Corporation), and BYK (registered trademark) (manufactured by BYK-Chemie Corporation).

When the pigment dispersant is used, the amount thereof used is preferably 10 parts by mass or more and 200 parts by mass or less, more preferably 15 parts by mass or more and 180 parts by mass or less, and still more preferably 20 parts by mass or more and 160 parts by mass or less, relative to 100 parts by mass of the pigment. When the amount of the pigment dispersant used falls within the above-mentioned range, a pigment dispersion in which two or more pigments are more uniformly dispersed tends to be obtained.

When the colorant (A) contains the colorant (A2), the content of the colorant (A2) is preferably 1 to 80% by mass, more preferably 1 to 70% by mass, and still more preferably 1 to 60% by mass, in the whole amount of the colorant (A).

The content of the colorant (A) is preferably 0.5 to 80% by mass, more preferably 1 to 70% by mass, still more preferably 2 to 55% by mass, and particularly preferably 8 to 50% by mass, in the whole amount of the solid content.

When the content of the colorant (A) falls within the above-mentioned range, desired spectroscopy and color density are more likely to be obtained.

<Resin (B)>

The resin (B) is not particularly limited, and is preferably an alkali soluble resin. Examples of the resin (B) include the following resins [K1] to [K6].

Resin [K1]; a copolymer having a structural unit derived from at least one monomer (a) selected from the group consisting of an unsaturated carboxylic acid and an unsaturated carboxylic anhydride (hereinafter, the monomer (a) is sometimes referred to as "(a)") and a structural unit derived from a monomer (b) having a cyclic ether structure having 2 to 4 carbon atoms and an ethylenically unsaturated bond (hereinafter, monomer (b) is sometimes referred to as "(b)");

Resin [K2]; a copolymer having a structural unit derived from (a), a structural unit derived from (b), and a structural unit derived from a monomer (c) copolymerizable with (a) (hereinafter, the monomer (c) is sometimes referred to as "(c)");

Resin [K3]; a copolymer having a structural unit derived from (a) and a structural unit derived from (c);

Resin [K4]; a copolymer having (i) a structural unit produced by adding (b) to a structural unit derived from (a) and (ii) a structural unit derived from (c);

Resin [K5]; a copolymer having (i) a structural unit produced by adding (a) to a structural unit derived from (b) and (ii) a structural unit derived from (c); and Resin [K6]; a copolymer having (i) a structural unit produced by adding (a) to a structural unit derived from (b) and further adding a carboxylic anhydride thereto, and (ii) a structural unit derived from (c).

It is noted that (c) is different from (a) and (b).

Specific examples of (a) include unsaturated monocarboxylic acids such as acrylic acid, methacrylic acid, crotonic acid, and o-, m- or p-vinylbenzoic acid;

unsaturated dicarboxylic acids such as maleic acid, fumaric acid, citraconic acid, mesaconic acid, itaconic acid, 3-vinylphthalic acid, 4-vinylphthalic acid, 3,4,5,6-tetrahydrophthalic acid, 1,2,3,6-tetrahydrophthalic acid, dimethyltetrahydrophthalic acid, and 1,4-cyclohexenedicarboxylic acid;

carboxy group-containing bicyclo unsaturated compounds such as methyl-5-norbornene-2,3-dicarboxylic acid, 5-carboxybicyclo[2.2.1]hept-2-ene, 5,6-dicarboxybicyclo[2.2.1]hept-2-ene, 5-carboxy-5-methylbicyclo[2.2.1]hept-2-ene, 5-carboxy-5-ethylbicyclo[2.2.1]hept-2-ene, 5-carboxy-6-methylbicyclo[2.2.1]hept-2-ene, and 5-carboxy-6-ethylbicyclo[2.2.1]hept-2-ene;

unsaturated dicarboxylic anhydrides such as maleic anhydride, citraconic anhydride, itaconic anhydride, 3-vinylphthalic anhydride, 4-vinylphthalic anhydride, 3,4,5,6-tetrahydrophthalic anhydride, 1,2,3,6-tetrahydrophthalic anhydride, dimethyltetrahydrophthalic anhydride, and 5,6-dicarboxybicyclo[2.2.1]hept-2-ene anhydride;

unsaturated mono[(meth)acryloyloxyalkyl]esters of a polyvalent carboxylic acid having a valence of 2 or more such as succinic acid mono[2-(meth)acryloyloxyethyl], and phthalic acid mono[2-(meth)acryloyloxyethyl]; and unsaturated acrylates containing a hydroxy group and a carboxy group in its molecule such as α-(hydroxymethyl)acrylic acid.

Among these, from the viewpoint of copolymerization reactivity and solubility of obtained resin to an alkaline aqueous solution, acrylic acid, methacrylic acid, maleic anhydride and the like are preferable.

(b) means a polymerizable compound having a C2-C4 cyclic ether structure (for example, at least one selected from the group consisting of an oxirane ring, an oxetane ring, and a tetrahydrofuran ring) and an ethylenically unsaturated bond. (b) is preferably a monomer having a C2-C4 cyclic ether and a (meth)acryloyloxy group.

As used herein, "(meth)acrylic acid" represents at least one selected from the group consisting of acrylic acid and methacrylic acid. The terms "(meth)acryloyl", "(meth)acrylate" and the like also have similar meanings.

Examples of (b) include a monomer (b1) having an oxiranyl group and an ethylenically unsaturated bond (hereinafter, the monomer (b1) is sometimes referred to as "(b1)"), a monomer (b2) having an oxetanyl group and an ethylenically unsaturated bond (hereinafter, the monomer (b2) is sometimes referred to as "(b2)"), and a monomer (b3) having a tetrahydrofuryl group and an ethylenically unsaturated bond (hereinafter, the monomer (b3) is sometimes referred to as Examples of (b1) include a monomer (b1-1) having a structure where a straight- or branched-chain aliphatic unsaturated hydrocarbon is epoxidized (hereinafter, the monomer (b1-1) is sometimes referred to as "(b1-1)") and a monomer (b1-2) having a structure where an alicyclic unsaturated hydrocarbon is epoxidized (hereinafter, sometimes referred to as "(b1-2)").

Examples of (b1-1) include glycidyl(meth)acrylate, 8-methylglycidyl(meth)acrylate, 8-ethylglycidyl(meth)acrylate, glycidyl vinyl ether, o-vinylbenzyl glycidyl ether, m-vinylbenzyl glycidyl ether, p-vinylbenzyl glycidyl ether, α-methyl-o-vinylbenzyl glycidyl ether, α-methyl-m-vinylbenzyl glycidyl ether, α-methyl-p-vinylbenzyl glycidyl ether, 2,3-bis(glycidyloxymethyl)styrene, 2,4-bis(glycidyloxymethyl)styrene, 2,5-bis(glycidyloxymethyl)styrene, 2,6-bis(glycidyloxymethyl)styrene, 2,3,4-tris(glycidyloxymethyl)styrene, 2,3,5-tris(glycidyloxymethyl)styrene, 2,3,6-tris(glycidyloxymethyl)styrene, 3,4,5-tris(glycidyloxymethyl)styrene, and 2,4,6-tris(glycidyloxymethyl)styrene.

Examples of (b1-2) include vinylcyclohexene monoxide, 1,2-epoxy-4-vinylcyclohexane (for example, Celloxide 2000 manufactured by Daicel Corporation), 3,4-epoxycyclohexylmethyl(meth)acrylate (for example, Cyclomer A400 manufactured by Daicel Corporation), 3,4-epoxycyclohexylmethyl(meth)acrylate (for example, Cyclomer M100 manufactured by Daicel Corporation), 3,4-epoxytricyclo[5.2.1.0$^{2,6}$]decyl(meth)acrylate, and 3,4-epoxytricyclo[5.2.1.0$^{2,6}$]decyloxyethyl(meth)acrylate.

(b2) is more preferably a monomer having an oxetanyl group and a (meth)acryloyloxy group. Examples of (b2) include 3-methyl-3-methacryloyloxy methyl oxetane, 3-methyl-3-acryloyloxy methyl oxetane, 3-ethyl-3-methacryloyloxy methyl oxetane, 3-ethyl-3-acryloyloxy methyl oxetane, 3-methyl-3-methacryloyloxy ethyl oxetane, 3-methyl-3-acryloyloxy ethyl oxetane, 3-ethyl-3-methacryloyloxy ethyl oxetane, and 3-ethyl-3-acryloyloxy ethyl oxetane.

(b3) is more preferably a monomer having a tetrahydrofuryl group and a (meth)acryloyloxy group. Specific examples of (b3) include tetrahydrofurfuryl acrylate (for example, Viscoat V #150 manufactured by Osaka Organic Chemical Industry Ltd.) and tetrahydrofurfuryl methacrylate.

(b) is preferably (b1) since reliabilities such as heat resistance and chemical resistance of an optical filter to be produced can be further improved, and more preferably (b1-2) since the storage stability of the colored resin composition is excellent.

Examples of (c) include (meth)acrylic esters such as methyl(meth)acrylate, ethyl (meth)acrylate, n-butyl(meth)acrylate, sec-butyl(meth) acrylate, tert-butyl(meth)acrylate, 2-ethylhexyl(meth) acrylate, dodecyl(meth)acrylate, lauryl(meth)acrylate, stearyl(meth)acrylate, cyclopentyl(meth)acrylate, cyclohexyl(meth)acrylate, 2-methylcyclohexyl(meth) acrylate, tricyclo[5.2.1.$0^{2,6}$]decan-8-yl(meth)acrylate (which is referred to as "dicyclopentanyl(meth)acrylate" (common name) in the art or sometimes referred to as "tricyclodecyl(meth)acrylate"), tricyclo [5.2.1.$0^{2,6}$]decene-8-yl (meth)acrylate (which is referred to as "dicyclopentenyl(meth)acrylate" (common name) in the art), dicyclopentanyloxyethyl(meth) acrylate, isobornyl(meth)acrylate, adamantyl(meth) acrylate, allyl(meth)acrylate, propargyl(meth)acrylate, phenyl(meth)acrylate, naphthyl(meth)acrylate, and benzyl(meth)acrylate;

hydroxy group-containing (meth)acrylic esters such as 2-hydroxyethyl(meth)acrylate and 2-hydroxypropyl (meth)acrylate;

dicarboxylic diesters such as diethyl maleate, diethyl fumarate, and diethyl itaconate;

bicyclo unsaturated compounds such as bicyclo[2.2.1] hept-2-ene, 5-methylbicyclo[2.2.1]hept-2-ene, 5-ethylbicyclo[2.2.1]hept-2-ene, 5-hydroxybicyclo[2.2.1] hept-2-ene, 5-hydroxymethylbicyclo[2.2.1]hept-2-ene, 5-(2'-hydroxyethyl)bicyclo[2.2.1]hept-2-ene, 5-methoxybicyclo[2.2.1]hept-2-ene, 5-ethoxybicyclo [2.2.1]hept-2-ene, 5,6-dihydroxybicyclo[2.2.1]hept-2-ene, 5,6-di(hydroxymethyl)bicyclo[2.2.1]hept-2-ene, 5,6-di(2'-hydroxyethyl)bicyclo[2.2.1]hept-2-ene, 5,6-dimethoxybicyclo[2.2.1]hept-2-ene, 5,6-diethoxybicyclo[2.2.1]hept-2-ene, 5-hydroxy-5-methylbicyclo [2.2.1]hept-2-ene, 5-hydroxy-5-ethylbicyclo[2.2.1] hept-2-ene, 5-hydroxymethyl-5-methylbicyclo[2.2.1] hept-2-ene, 5-tert-butoxycarbonylbicyclo[2.2.1]hept-2-ene, 5-cyclohexyloxycarbonylbicyclo[2.2.1]hept-2-ene, 5-phenoxycarbonylbicyclo[2.2.1]hept-2-ene, 5,6-bis(tert-butoxycarbonyl)bicyclo[2.2.1]hept-2-ene, and 5,6-bis(cyclohexyloxycarbonyl)bicyclo[2.2.1]hept-2-ene;

dicarbonylimide derivatives such as N-phenylmaleimide, N-cyclohexylmaleimide, N-benzylmaleimide, N-succinimidyl-3-maleimidobenzoate, N-succinimidyl-4-maleimidobutyrate, N-succinimidyl-6-maleimide caproate, N-succinimidyl-3-maleimide propionate, and N-(9-acridinyl)maleimide;

styrene, α-methylstyrene, m-methylstyrene, p-methylstyrene, vinyltoluene, p-methoxystyrene, acrylonitrile, methacrylonitrile, vinyl chloride, vinylidene chloride, acrylamide, methacrylamide, vinyl acetate, 1,3-butadiene, isoprene, and 2,3-dimethyl-1,3-butadiene.

Among these, from the viewpoint of copolymerization reactivity and heat resistance, styrene, vinyltoluene, N-phenylmaleimide, N-cyclohexylmaleimide, N-benzylmaleimide, bicyclo[2.2.1]hept-2-ene, and the like are preferable.

The ratio of the structural unit derived from each of (a) and (b) in the total structural units constituting the resin [K1] is preferably the following:

the structural unit derived from (a): 2 to 60 mol %; and the structural unit derived from (b): 40 to 98 mol %, and more preferably the following:

the structural unit derived from (a): 10 to 50 mol %; and the structural unit derived from (b): 50 to 90 mol %.

When the ratio of the structural unit of the resin [K1] falls within the above-mentioned range, there is a tendency that the storage stability of the colored resin composition, the developability thereof during the formation of a colored pattern, and the solvent resistance of an optical filter to be produced are excellent.

The resin [K1] can be produced with reference to the method described in, for example, a document "Experimental Method for Polymer Synthesis" (edited by Takayuki Otsu, published by Kagaku-Dojin Publishing Co., Ltd., First Edition, First Printed on Mar. 1, 1972) and cited documents described in the document.

Specific examples the producing method of the resin [K1] include the following method: predetermined amounts of (a) and (b), a polymerization initiator, a solvent, and the like are placed in a reaction vessel, a deoxidization atmosphere is formed by, for example, substituting oxygen with nitrogen, and these are heated and kept warm during stirring. The polymerization initiator, the solvent, and the like used here are not particularly limited, and those commonly used in the art can be used. Examples of the polymerization initiator include azo compounds such as 2,2'-azobisisobutyronitrile and 2,2'-azobis(2,4-dimethylvaleronitrile, and organic peroxides such as benzoyl peroxide. The solvent is required to dissolve each monomer. Examples of the solvent include solvents described later as the solvent (E).

The obtained copolymer may be used directly in the form of a solution after reaction. Alternatively, a solution obtained by concentrating or diluting the solution after reaction may be used, or a solid (powder) taken out from the solution after reaction by a method such as reprecipitation may be used. In particular, the solution after reaction can be used directly in the preparation of the colored resin composition by using a solvent contained in the colored resin composition as the solvent for the polymerization, whereby the producing process of the colored resin composition can be simplified.

The ratio of the structural unit derived from each of (a) to (c) in the total structural units constituting the resin [K2] is preferably the following:

the structural unit derived from (a): 2 to 45 mol %;

the structural unit derived from (b): 2 to 95 mol %; and the structural unit derived from (c): 1 to 65 mol %, and more preferably the following:

the structural unit derived from (a): 5 to 40 mol %;

the structural unit derived from (b): 5 to 80 mol %; and the structural unit derived from (c): 5 to 60 mol %.

When the ratio of the structural unit of the resin [K2] falls within the above-mentioned range, there is a tendency that the storage stability of the colored resin composition, the developability thereof during the formation of a colored pattern, and the solvent resistance, heat resistance, and mechanical strength of an optical filter to be produced are excellent.

The resin [K2] can be produced in a similar manner to the producing method of the resin [K1], for example.

The ratio of the structural unit derived from each of (a) and (c) in the total structural units constituting the resin [K3] is preferably the following:

the structural unit derived from (a): 2 to 60 mol %; and the structural unit derived from (c): 40 to 98 mol %, and more preferably the following:

the structural unit derived from (a): 10 to 50 mol %; and the structural unit derived from (c): 50 to 90 mol %.

The resin [K3] can be produced in a similar manner to the producing method of the resin [K1], for example.

The resin [K4] can be produced by producing a copolymer of (a) and (c) and then adding a C2-C4 cyclic ether contained in (b) to a carboxylic acid and/or a carboxylic anhydride contained in (a).

First, the copolymer of (a) and (c) is produced in a similar manner to the producing method of the resin [K1]. In this case, the ratio of the structural unit derived from each of (a) and (c) is preferably the same ratio as that described in the resin [K3].

Next, a C2-C4 cyclic ether contained in (b) is reacted with a part of the carboxylic acid and/or the carboxylic anhydride derived from (a) in the copolymer.

Subsequent to the production of the copolymer of (a) and (c), atmosphere in the flask is replaced from a nitrogen to air, and (b), a reaction catalyst for a carboxylic acid or a carboxylic anhydride and a cyclic ether (for example, tris(dimethylaminomethyl)phenol), and a polymerization inhibitor (for example, hydroquinone) are placed in the flask, followed by reacting, for example, at 60 to 130° C. for 1 to 10 hours, whereby the resin [K4] can be produced.

The amount of (b) used is preferably 5 to 80 mol, and more preferably 10 to 75 mol, relative to 100 mol of (a). When the amount of (b) used falls within the above-mentioned range, there is a tendency that the storage stability of the colored resin composition, the developability thereof during the formation of a pattern, and the balance of the solvent resistance, heat resistance, mechanical strength, and sensitivity of the pattern obtained are good. Since the reactivity of the cyclic ether is high, and the unreacted (b) is less likely to remain, (b) used for the resin [K4] is preferably (b1), and more preferably (b1-1).

The amount of the reaction catalyst used is preferably 0.001 to 5 parts by mass relative to 100 parts by mass of the total amount of (a), (b), and (c). The amount of the polymerization inhibitor used is preferably 0.001 to 5 parts by mass relative to 100 parts by mass of the total amount of (a), (b), and (c).

Reaction conditions such as a feeding method, a reaction temperature, and time can be appropriately adjusted in consideration of a production equipment, an amount of heat generation due to polymerization, and the like. In consideration of the production equipment, the amount of heat generation due to polymerization, and the like, the feeding method and the reaction temperature can be appropriately adjusted like the polymerization conditions.

A producing method of the resin [K5] contains a step of producing a copolymer of (b) and (c) in a similar manner to the producing method of the resin [K1] as a first step. In the same manner as in the above, the obtained copolymer may be used directly in the form of a solution after reaction. Alternatively, a solution obtained by concentrating or diluting the solution after reaction may be used, or a solid (powder) taken out from the solution after reaction by a method such as reprecipitation may be used.

The ratio of the structural unit derived from each of (b) and (c) relative to the total number of moles of the total structural units constituting the copolymer is preferably the following:

the structural unit derived from (b): 5 to 95 mol %; and the structural unit derived from (c): 5 to 95 mol %, and more preferably the following:

the structural unit derived from (b): 10 to 90 mol %; and the structural unit derived from (c): 10 to 90 mol %.

The producing method of the resin [K5] further contains a step of reacting a carboxylic acid or a carboxylic anhydride contained in (a) with the cyclic ether derived from (b) contained in the copolymer of (b) and (c) under the same conditions as those of the producing method of the resin [K4], whereby the resin [K5] can be produced.

The amount of (a) used that is reacted with the copolymer is preferably 5 to 80 mol relative to 100 mol of (b). Since the reactivity of the cyclic ether is high, and the unreacted (b) is less likely to remain, (b) used for the resin [K5] is preferably (b1), and more preferably (b1-1).

The resin [K6] is a resin produced by further reacting a carboxylic anhydride with the resin [K5]. The carboxylic anhydride is reacted with a hydroxy group generated by the reaction between the cyclic ether and the carboxylic acid or a carboxylic anhydride.

Examples of the carboxylic anhydride include maleic anhydride, citraconic anhydride, itaconic anhydride, 3-vinylphthalic anhydride, 4-vinylphthalic anhydride, 3,4,5,6-tetrahydrophthalic anhydride, 1,2,3,6-tetrahydrophthalic anhydride, dimethyltetrahydrophthalic anhydride, and 5,6-dicarboxybicyclo[2.2.1]hept-2-ene anhydride. The amount of the carboxylic anhydride used is preferably 0.5 to 1 mol relative to 1 mol of the amount of (a) used.

Specific examples of the resin (B) include a resin [K1] such as a 3,4-epoxycyclohexylmethyl(meth)acrylate/(meth)acrylic acid copolymer or a 3,4-epoxytricyclo[5.2.1.0$^{2,6}$]decyl acrylate/(meth)acrylic acid copolymer; a resin [K2] such as a 3,4-epoxytricyclo[5.2.1.0$^{2,6}$]decyl acrylate/benzyl(meth)acrylate/(meth)acrylic acid copolymer, a glycidyl(meth)acrylate/benzyl(meth)acrylate/(meth)acrylic acid copolymer, a glycidyl(meth)acrylate/styrene/(meth)acrylic acid copolymer, a 3,4-epoxytricyclo[5.2.1.0$^{2,6}$]decyl acrylate/(meth)acrylic acid/N-cyclohexylmaleimide copolymer, a 3,4-epoxytricyclo[5.2.1.0$^{2,6}$]decyl acrylate/(meth)acrylic acid/N-cyclohexylmaleimide/2-hydroxyethyl(meth)acrylate copolymer, or a 3-methyl-3-(meth)acryloyloxymethyl oxetane/(meth)acrylic acid/styrene copolymer; a resin [K3] such as a benzyl(meth)acrylate/(meth)acrylic acid copolymer or a styrene/(meth)acrylic acid copolymer; a resin [K4] such as a resin produced by adding glycidyl(meth)acrylate to a benzyl(meth)acrylate/(meth)acrylic acid copolymer, a resin produced by adding glycidyl(meth)acrylate to a tricyclodecyl(meth)acrylate/styrene/(meth)acrylic acid copolymer, or a resin produced by adding glycidyl(meth)acrylate to a tricyclodecyl(meth)acrylate/benzyl(meth)acrylate/(meth)acrylic acid copolymer; a resin [K5] such as a resin produced by reacting a tricyclodecyl(meth)acrylate/glycidyl(meth)acrylate copolymer with (meth)acrylic acid, or a resin produced by reacting a tricyclodecyl(meth)acrylate/styrene/glycidyl(meth)acrylate copolymer with (meth)acrylic acid; and a resin [K6] such as a resin produced by reacting a tricyclodecyl(meth)acrylate/glycidyl(meth)acrylate copolymer with (meth)acrylic acid to produce a resin and then reacting this resin with a tetrahydrophthalic anhydride.

The resin (B) is preferably a copolymer having a structural unit derived from at least one selected from the group consisting of an unsaturated carboxylic acid and an unsaturated carboxylic anhydride and a structural unit having a cyclic ether structure having 2 to 4 carbon atoms and an ethylenically unsaturated bond (the resin [K1] or the resin [K2]), and more preferably the resin [K2].

The weight average molecular weight of the resin (B) in terms of polystyrene is preferably 500 to 100,000, more preferably 700 to 50,000, and still more preferably 900 to 30,000. When the molecular weight falls within the above-mentioned range, there is a tendency that the hardness of the optical filter is improved, that the residual film ratio is increased, that the solubility of an unexposed area by a developing solution becomes good, and that the resolution of a colored pattern is improved.

The degree of dispersion [weight average molecular weight (Mw)/number average molecular weight (Mn)] of the resin (B) is preferably 1.1 to 6, and more preferably 1.2 to 4.

The acid value of the resin (B) is preferably 50 to 170 mg-KOH/g, more preferably 60 to 150 mg-KOH/g, and still more preferably 70 to 135 mg-KOH/g, in terms of solid content. The acid value is a value which is measured as an amount (mg) of potassium hydroxide required for neutralizing 1 g of the resin (B), and which can be determined by, for example, titration with an aqueous potassium hydroxide solution.

The content of the resin (B) is preferably 7 to 80% by mass, more preferably 13 to 75% by mass, and still more preferably 17 to 70% by mass, relative to the whole amount of the solid content. When the content of the resin (B) falls within the above-mentioned range, there is a tendency that the colored pattern can be formed, and that the resolution of the colored pattern and the residual film ratio are improved.

<Polymerizable Compound (C)>

The polymerizable compound (C) is a compound capable of being polymerized by the action of an active radical and/or an acid generated from the polymerization initiator (D). Examples of the polymerizable compound (C) include a compound having a polymerizable ethylenically unsaturated bond, and a (meth)acrylic acid ester compound is preferable.

Among these, the polymerizable compound (C) is preferably a polymerizable compound having three or more ethylenically unsaturated bonds. Examples of such a polymerizable compound include trimethylolpropane tri(meth)acrylate, pentaerythritol tri(meth)acrylate, pentaerythritol tetra(meth)acrylate, dipentaerythritol penta(meth)acrylate, dipentaerythritol hexa(meth)acrylate, tripentaerythritol octa(meth)acrylate, tripentaerythritol hepta(meth)acrylate, tetrapentaerythritol deca(meth)acrylate, tetrapentaerythritol nona(meth)acrylate, tris(2-(meth)acryloyloxyethyl)isocyanurate, ethylene glycol-modified pentaerythritol tetra(meth)acrylate, ethylene glycol-modified dipentaerythritol hexa(meth)acrylate, propylene glycol-modified pentaerythritol tetra(meth)acrylate, propylene glycol-modified dipentaerythritol hexa(meth)acrylate, caprolactone-modified pentaerythritol tetra(meth)acrylate, and caprolactone-modified dipentaerythritol hexa(meth)acrylate.

Among these, the polymerizable compound (C) preferably contains at least one selected from the group consisting of trimethylolpropane tri(meth)acrylate, dipentaerythritol penta(meth)acrylate, and dipentaerythritol hexa(meth)acrylate, and more preferably contains at least one selected from the group consisting of trimethylolpropane triacrylate, dipentaerythritol pentaacrylate, and dipentaerythritol hexaacrylate.

The weight average molecular weight of the polymerizable compound (C) is preferably 150 or more and 2,900 or less, and more preferably 250 or more and 1,500 or less.

The content of the polymerizable compound (C) is preferably 7 to 65% by mass, more preferably 13 to 60% by mass, and still more preferably 17 to 55% by mass, relative to the whole amount of the solid content. When the content of the polymerizable compound (C) falls within the above-mentioned range, there is a tendency that the residual film ratio during the formation of the colored pattern and the chemical resistance of the optical filter are improved.

<Polymerization Initiator (D)>

The polymerization initiator (D) is not particularly limited, as long as the polymerization initiator (D) is a compound capable of generating active radicals, an acid or the like by the action of light or heat to initiate polymerization. Any known polymerization initiator can be used.

Examples of the polymerization initiator capable of generating active radicals include an alkylphenone compound, a triazine compound, an acylphosphine oxide compound, an O-acyloxime compound, and a biimidazole compound.

The O-acyloxime compound is a compound having a partial structure represented by formula (d1). Hereinafter, * represents a point of attachment.

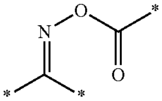

(d1)

Examples of the O-acyloxime compound include N-benzoyloxy-1-(4-phenylsulfanylphenyl)butane-1-one-2-imine, N-benzoyloxy-1-(4-phenylsulfanylphenyl)octane-1-one-2-imine, N-benzoyloxy-1-(4-phenylsulfanylphenyl)-3-cyclopentylpropane-1-one-2-imine, N-acetoxy-1-[9-ethyl-6-(2-methylbenzoyl)-9H-carbazole-3-yl]ethane-1-imine, N-acetoxy-1-[9-ethyl-6-{2-methyl-4-(3,3-dimethyl-2,4-dioxacyclopentanylmethyloxy)benzoyl}-9H-carbazole-3-yl]ethane-1-imine, N-acetoxy-1-[9-ethyl-6-(2-methylbenzoyl)-9H-carbazole-3-yl]-3-cyclopentylpropane-1-imine, N-benzoyloxy-1-[9-ethyl-6-(2-methylbenzoyl)-9H-carbazole-3-yl]-3-cyclopentylpropane-1-one-2-imine, and N-acetyloxy-1-(4-phenylsulfanylphenyl)-3-cyclohexylpropane-1-one-2-imine. Commercially available products such as Irgacure OXE01, OXE02, and OXE03 (all manufactured by BASF Corporation), and N-1919 (manufactured by ADEKA Corporation) may be used. Among these, the O-acyloxime compound is preferably at least one selected from the group consisting of N-acetyloxy-1-(4-phenylsulfanylphenyl)-3-cyclohexylpropane-1-one-2-imine, N-benzoyloxy-1-(4-phenylsulfanylphenyl)butane-1-one-2-imine, N-benzoyloxy-1-(4-phenylsulfanylphenyl)octane-1-one-2-imine, and N-benzoyloxy-1-(4-phenylsulfanylphenyl)-3-cyclopentylpropane-1-one-2-imine; and more preferably N-acetyloxy-1-(4-phenylsulfanylphenyl)-3-cyclohexylpropane-1-one-2-imine, and N-benzoyloxy-1-(4-phenylsulfanylphenyl)octane-1-one-2-imine. There is a tendency that these O-acyloxime compounds provide an optical filter having a high brightness.

The alkylphenone compound is a compound having a partial structure represented by formula (d2) or (d3). In these partial structures, the benzene ring optionally has a substituent.

(d2)

(d3)

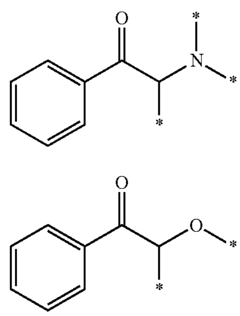

Examples of the compound having a partial structure represented by formula (d2) include 2-methyl-2-morpholino-1-(4-methylsulfanylphenyl)propane-1-one, 2-dimethylamino-1-(4-morpholinophenyl)-2-benzylbutane-1-one, and 2-(dimethylamino)-2-[(4-methylphenyl)methyl]-1-[4-(4-morpholinyl)phenyl]butane-1-one. Commercially available products such as Irgacures 369, 907, and 379 (all manufactured by BASF Corporation) may be used.

Examples of the compound having a partial structure represented by formula (d3) include 2-hydroxy-2-methyl-1-phenylpropane-1-one, 2-hydroxy-2-methyl-1-[4-(2-hydroxyethoxy)phenyl]propane-1-one, 1-hydroxycyclohexylphenylketone, an oligomer of 2-hydroxy-2-methyl-1-(4-isopropenylphenyl)propane-1-one, α,α-diethoxyacetophenone, and benzyl dimethyl ketal.

The alkylphenone compound is preferably a compound having a partial structure represented by formula (d2) from the viewpoint of sensitivity.

Examples of the triazine compound include 2,4-bis(trichloromethyl)-6-(4-methoxyphenyl)-1,3,5-triazine, 2,4-bis(trichloromethyl)-6-(4-methoxynaphthyl)-1,3,5-triazine, 2,4-bis(trichloromethyl)-6-piperonyl-1,3,5-triazine, 2,4-bis(trichloromethyl)-6-(4-methoxystyryl)-1,3,5-triazine, 2,4-bis(trichloromethyl)-6-[2-(5-methylfuran-2-yl)ethenyl]-1,3,5-triazine, 2,4-bis(trichloromethyl)-6-[2-(furan-2-yl)ethenyl]-1,3,5-triazine, 2,4-bis(trichloromethyl)-6-[2-(4-diethylamino-2-methylphenyl)ethenyl]-1,3,5-triazine, and 2,4-bis(trichloromethyl)-6-[2-(3,4-dimethoxyphenyl)ethenyl]-1,3,5-triazine.

Examples of the acylphosphine oxide compound include 2,4,6-trimethylbenzoyldiphenylphosphine oxide. Commercially available products such as Irgacure (registered trademark) 819 (manufactured by BASF Corporation) may be used.

Examples of the biimidazole compound include 2,2'-bis(2-chlorophenyl)-4,4',5,5'-tetraphenylbiimidazole, 2,2'-bis(2,3-dichlorophenyl)-4,4',5,5'-tetraphenylbiimidazole (for example, see Japanese Patent Laid-Open No. H6-75372 and Japanese Patent Laid-Open No. H6-75373), 2,2'-bis(2-chlorophenyl)-4,4',5,5'-tetraphenyl biimidazole, 2,2'-bis(2-chlorophenyl)-4,4',5,5'-tetra(alkoxyphenyl)biimidazole, 2,2'-bis(2-chlorophenyl)-4,4',5,5'-tetra(dialkoxyphenyl)biimidazole, 2,2'-bis(2-chlorophenyl)-4,4',5,5'-tetra(trialkoxyphenyl)biimidazole (for example, see Japanese Patent Publication No. S48-38403 and Japanese Patent Laid-Open No. S62-174204), and a biimidazole compound in which a phenyl group at the 4,4'5,5' position is substituted with a carboalkoxy group (for example, see Japanese Patent Laid-Open No. H7-10913).

Furthermore, examples of the polymerization initiator (D) include benzoin compounds such as benzoin, benzoin methyl ether, benzoin ethyl ether, benzoin isopropyl ether, and benzoin isobutyl ether; benzophenone compounds such as benzophenone, methyl o-benzoylbenzoate, 4-phenylbenzophenone, 4-benzoyl-4'-methyldiphenyl sulfide, 3,3',4,4'-tetra(tert-butylperoxycarbonyl)benzophenone, and 2,4,6-trimethylbenzophenone; quinone compounds such as 9,10-phenanthrene quinone, 2-ethylanthraquinone, and camphorquinone; 10-butyl-2-chloroacridone, benzyl, methyl phenylglyoxylate, and a titanocene compound. These are preferably used in combination with a polymerization initiation aid (D1) (particularly, amines) to be described later.

Examples of a polymerization initiator that generates an acid include onium salts such as 4-hydroxyphenyldimethylsulfonium p-toluenesulfonate, 4-hydroxyphenyldimethylsulfoniumhexafluoroantimonate, 4-acetoxyphenyldimethylsulfonium p-toluenesulfonate, 4-acetoxyphenylmethylbenzylsulfoniumhexafluoroantimonate, triphenylsulfonium p-toluenesulfonate, triphenylsulfonium hexafluoroantimonate, diphenyliodonium p-toluenesulfonate, and diphenyliodoniumhexafluoroantimonate; nitrobenzyl tosylates; and benzoin tosylates.

The polymerization initiator (D) is preferably a polymerization initiator containing at least one selected from the group consisting of an alkylphenone compound, a triazine compound, an acylphosphine oxide compound, an O-acyloxime compound, and a biimidazole compound, and more preferably a polymerization initiator containing an O-acyloxime compound.

The content of the polymerization initiator (D) is preferably 0.1 to 30 parts by mass, and more preferably 1 to 20 parts by mass, relative to 100 parts by mass of the total amount of the resin (B) and the polymerizable compound (C). When the content of the polymerization initiator (D) falls within the above-mentioned range, there is a tendency that the sensitivity is increased and the time of exposure to light is shortened, resulting in the improvement in productivity of the optical filter.

<Polymerization Initiation Aid (D1)>

The polymerization initiation aid (D1) is a compound to be used for accelerating polymerization of a polymerizable compound, the polymerization of which has been started by the polymerization initiator, or a sensitizer. When the polymerization initiation aid (D1) is contained, it is usually used in combination with the polymerization initiator (D).

Examples of the polymerization initiation aid (D1) include an amine compound, an alkoxyanthracene compound, a thioxanthone compound, and a carboxylic acid compound.

Examples of the amine compound include triethanolamine, methyldiethanolamine, triisopropanolamine, methyl 4-dimethylaminobenzoate, ethyl 4-dimethylaminobenzoate, isoamyl 4-dimethylaminobenzoate, 2-dimethylaminoethyl benzoate, 2-ethylhexyl 4-dimethylaminobenzoate, N,N-dimethylparatoluidine, 4,4'-bis(dimethylamino)benzophenone (common name: Michler's ketone), 4,4'-bis(diethylamino)benzophenone, and 4,4'-bis(ethylmethylamino)benzophenone. Among these, 4,4'-bis(diethylamino)benzophenone is preferable. Commercially available products such as EAB-F (manufactured by Hodogaya Chemical Co., Ltd.) may be used.

Examples of the alkoxyanthracene compound include 9,10-dimethoxyanthracene, 2-ethyl-9,10-dimethoxyanthracene, 9,10-diethoxyanthracene, 2-ethyl-9,10-diethoxyanthracene, 9,10-dibutoxyanthracene, and 2-ethyl-9,10-dibutoxyanthracene.

Examples of the thioxanthone compound include 2-isopropylthioxanthone, 4-isopropylthioxanthone, 2,4-diethylthioxanthone, 2,4-dichlorothioxanthone, and 1-chloro-4-propoxythioxanthone.

Examples of the carboxylic acid compound include phenylsulfanylacetic acid, methylphenylsulfanylacetic acid, ethylphenylsulfanylacetic acid, methylethylphenylsulfanylacetic acid, dimethylphenylsulfanylacetic acid, methoxyphenysulfanylacetic acid, dimethoxyphenylsulfanylacetic acid, chlorophenylsulfanylacetic acid, dichlorophenylsulfanylacetic acid, N-phenylglycine, phenoxyacetic acid, naphthylthioacetic acid, N-naphthylglycine, and naphthoxyacetic acid.

When the polymerization initiation aid (D1) is used, the content thereof is preferably 0.1 to 30 parts by mass, and more preferably 1 to 20 parts by mass, relative to 100 parts by mass of the total amount of the resin (B) and the polymerizable compound (C). When the amount of the polymerization initiation aid (D1) falls within the above-mentioned range, there is a tendency that the colored pattern can be formed with higher sensitivity, resulting in the improvement in productivity of the optical filter.

<Solvent (E)>

The solvent (E) is not particularly limited, and any solvent that has been used conventionally in the art can be used. Examples of the solvent (E) include an ester solvent (a solvent that contains —COO— but does not contain —O— in its molecule), an ether solvent (a solvent that contains —O— but does not contain —COO— in its molecule), an ether ester solvent (a solvent that contains —COO— and —O— in its molecule), a ketone solvent (a solvent that contains —CO— but does not contain —COO— in its molecule), an alcohol solvent (a solvent that contains OH but does not contain —O—, —CO— nor —COO— in its molecule), an aromatic hydrocarbon solvent, an amide solvent, and dimethyl sulfoxide.

Examples of the ester solvent include methyl lactate, ethyl lactate, butyl lactate, methyl 2-hydroxy isobutanoate, ethyl acetate, n-butyl acetate, isobutyl acetate, pentyl formate, isopentyl acetate, butyl propionate, isopropyl butyrate, ethyl butyrate, butyl butyrate, methyl pyruvate, ethyl pyruvate, propyl pyruvate, methyl acetoacetate, ethyl acetoacetate, cyclohexanol acetate, and γ-butyrolactone.

Examples of the ether solvent include ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, diethylene glycol monobutyl ether, propylene glycol monomethyl ether, propylene glycol monoethyl ether, propylene glycol monopropyl ether, propylene glycol monobutyl ether, 3-methoxy-1-butanol, 3-methoxy-3-methylbutanol, tetrahydrofuran, tetrahydropyran, 1,4-dioxane, diethylene glycol dimethyl ether, diethylene glycol diethyl ether, diethylene glycol methyl ethyl ether, diethylene glycol dipropyl ether, diethylene glycol dibutyl ether, anisole, phenetol, and methyl anisole.

Examples of the ether ester solvent include methyl methoxyacetate, ethyl methoxyacetate, butyl methoxyacetate, methyl ethoxyacetate, ethyl ethoxyacetate, methyl 3-methoxypropionate, ethyl 3-methoxypropionate, methyl 3-ethoxypropionate, ethyl 3-ethoxypropionate, methyl 2-methoxypropionate, ethyl 2-methoxypropionate, propyl 2-methoxypropionate, methyl 2-ethoxy propionate, ethyl 2-ethoxypropionate, methyl 2-methoxy-2-methylpropionate, ethyl 2-ethoxy-2-methylpropionate, 3-methoxybutyl acetate, 3-methyl-3-methoxybutyl acetate, propylene glycol monomethyl ether acetate, propylene glycol monoethyl ether acetate, propylene glycol monopropyl ether acetate, ethylene glycol monomethyl ether acetate, ethylene glycol monoethyl ether acetate, diethylene glycol monoethyl ether acetate, and diethylene glycol monobutyl ether acetate.

Examples of the ketone solvent include 4-hydroxy-4-methyl-2-pentanone, acetone, 2-butanone, 2-heptanone, 3-heptanone, 4-heptanone, 4-methyl-2-pentanone, cyclopentanone, cyclohexanone, and isophorone.

Examples of the alcohol solvent include methanol, ethanol, propanol, butanol, hexanol, cyclohexanol, ethylene glycol, propylene glycol, and glycerin.

Examples of the aromatic hydrocarbon solvent include benzene, toluene, xylene, and mesitylene.

Examples of the amide solvent include N,N-dimethylformamide, N,N-dimethylacetamide, and N-methylpyrrolidone.

The solvent (E) is preferably at least one selected from the group consisting of an ether solvent, an ether ester solvent, and an amide solvent, and more preferably contains at least one selected from the group consisting of diethylene glycol methylethyl ether, propylene glycol monomethyl ether acetate, and N-methylpyrrolidone.

The content of the solvent (E) is preferably 70 to 95% by mass, and more preferably 75 to 92% by mass, relative to the whole amount of the colored resin composition. In other words, the solid content of the colored resin composition is preferably 5 to 30% by mass, and more preferably 8 to 25% by mass. When the content of the solvent (E) falls within the above-mentioned range, there is a tendency that the flatness during application becomes good and the color density of the optical filter formed becomes not insufficient, resulting in the achievement of good displaying properties.

<Leveling Agent (F)>

Examples of the leveling agent (F) include a silicone-based surfactant, a fluorine-based surfactant, and a silicone-based surfactant having a fluorine atom. These may have a polymerizable group at its side chain.

Examples of the silicone-based surfactant include a surfactant having a siloxane bond in its molecule. Specific examples thereof include Toray Silicone DC3PA, Toray Silicone SH7PA, Toray Silicone DC11PA, Toray Silicone SH21PA, Toray Silicone SH28PA, Toray Silicone SH29PA, Toray Silicone SH30PA, and Toray Silicone SH8400 (trade name; manufactured by Toray Dow Corning Co., Ltd.); KP321, KP322, KP323, KP324, KP326, KP340, and KP341 (manufactured by Shin-Etsu Chemical Co., Ltd.); and TSF400, TSF401, TSF410, TSF4300, TSF4440, TSF4445, TSF4446, TSF4452, and TSF4460 (manufactured by Momentive Performance Materials Inc.).

Examples of the fluorine-based surfactant include a surfactant having a fluorocarbon chain in its molecule. Specific examples thereof include Fluorad (registered trademark) FC430 and Fluorad FC431 (manufactured by Sumitomo 3M, Ltd.); Megafac (registered trademark) F142D, Megafac F171, Megafac F172, Megafac F173, Megafac F177, Megafac F183, Megafac F554, Megafac $R^{30}$, and Megafac RS-718-K (manufactured by DIC Corporation); Eftop (registered trademark) EF301, Eftop EF303, Eftop EF351, and Eftop EF352 (manufactured by Mitsubishi Materials Electronic Chemicals Co., Ltd.); Surflon (registered trademark) S381, Surflon S382, Surflon SC101, and Surflon SC105 (manufactured by AGC Inc. (former Asahi Glass Co., Ltd.)); and E5844 (manufactured by Daikin Fine Chemical Laboratory).

Examples of the silicone-based surfactant having a fluorine atom include a surfactant having a siloxane bond and a fluorocarbon chain in its molecule. Specific examples thereof include Megafac (registered trademark) R08, Megafac BL20, Megafac F475, Megafac F477, and Megafac F443 (manufactured by DIC Corporation).

The content of the leveling agent (F) is preferably 0.001 to 0.2% by mass, more preferably 0.002 to 0.1% by mass, and still more preferably 0.005 to 0.05% by mass, relative to the whole amount of the colored resin composition. This content does not include the content of the pigment dispersant. When the content of the leveling agent (F) falls within the above-mentioned range, the flatness of the optical filter can be improved.

<Other Components>

If required, the colored resin composition may contain an additive known in the art, such as a filler, other polymeric compounds, an adhesion promoter, an antioxidant, a light stabilizer, or a chain transfer agent.

<Method for Producing Colored Resin Composition>

The colored resin composition can be prepared by, for example, mixing compounds represented by formula (I) and/or formula (II) and a resin (B), as well as a polymerizable compound (C), a polymerization initiator (D), a solvent (E), a leveling agent (F), a polymerization initiation aid (D1), and other components to be used if necessary.

The compound represented by formula (I) or formula (II) may be contained in advance in a pigment dispersion. By mixing the pigment dispersion with the remaining ingredients so as to obtain a predetermined concentration, an intended colored resin composition can be prepared.

When the colored resin composition contains a dye, the dye may be dissolved in advance in a part or the whole of the solvent (E) to prepare a solution. The solution is preferably filtered with a filter having a pore size of about 0.01 to 1 μm.

The colored resin composition after mixing is preferably filtered with a filter having a pore size of about 0.01 to 10 μm.

[Color Filter]

Examples of the method for producing a colored pattern of a color filter from the colored resin composition of the present invention include a photolithography method, an inkjet method, and a printing method. Among these methods, a photolithography method is preferable. The photolithography method is a method in which the colored resin composition is applied onto a substrate and then dried to form a composition layer, and the composition layer is then developed by exposing the composition layer to light through a photomask. In the photolithography method, a colored coating film, which is a cured material of the composition layer, can be formed when the photomask is not used during the exposure to light and/or the composition layer is not developed.

The film thickness of the color filter (cured film) is, for example, 30 m or less, preferably 20 m or less, more preferably 6 m or less, still more preferably 3 m or less, still further preferably 1.5 m or less, and particularly preferably 0.5 m or less; and preferably 0.1 m or more, more preferably 0.2 m or more, and still more preferably 0.3 m or more.

Examples of the substrate to be used include glass substrates such as quartz glass, borosilicate glass, alumina silicate glass, and soda lime glass of which the surface is coated with silica; resin substrates such as polycarbonate, polymethyl methacrylate, and polyethylene terephthalate; silicon; and a substrate obtained by forming an aluminum, silver, or a silver/copper/palladium alloy thin film or the like on any of the aforementioned substrates. On such a substrate, another color filter layer, a resin layer, a transistor, a circuit and the like may be formed. A substrate obtained by subjecting a silicon substrate to HMDS treatment may also be used.

The formation of each color pixel by a photolithography method can be carried out using a known or conventional device under known or conventional conditions. For example, the color pixel can be prepared in the following manner. First, a colored resin composition is applied onto a substrate, and then dried by heat-drying (prebaking) and/or drying under reduced pressure to remove volatile components such as a solvent from the composition, thereby producing a smooth composition layer. Examples of the application method include a spin coat method, a slit coat method, and a slit-and-spin coat method. The temperature at heat-drying is preferably 30 to 120° C., and more preferably 50 to 110° C. The time for the heating is preferably 10 seconds to 60 minutes, and more preferably 30 seconds to 30 minutes. When drying under reduced pressure is carried out, the drying procedure is preferably carried out at a temperature range of 20 to 25° C. under a pressure of 50 to 150 Pa. The film thickness of the composition layer is not particularly limited, and may be selected appropriately depending on the desired film thickness of the color filter.

Next, the composition layer is exposed to light through a photomask for forming a desired colored pattern. The pattern on the photomask is not particularly limited, and a pattern suitable for the intended application is used. Alight source to be used for the exposure to light is preferably a light source capable of generating light having a wavelength of 250 to 450 nm. For example, light having a wavelength of shorter than 350 nm may be cut with a filter capable of cutting light having this wavelength region, or light having a wavelength of around 436 nm, around 408 nm, or around 365 nm may be extracted selectively with a band-pass filter capable of extracting light having those wavelength regions. Specific examples of the light source include a mercury lamp, a light-emitting diode, a metal halide lamp, and a halogen lamp. A reduction projection exposure apparatus such as a mask aligner and a stepper, or a proximity exposure apparatus is preferably used because these apparatuses are capable of emitting a parallel light beam uniformly over the whole area of the exposed surface or accurately aligning the photomask to the substrate.

A colored pattern is formed on the substrate by bringing the exposed composition layer into contact with a developing solution to develop the composition layer. By developing, an unexposed area in the composition layer is dissolved in the developing solution and therefore removed. The developing solution is preferably an aqueous solution of an alkaline compound such as potassium hydroxide, sodium hydrogen carbonate, sodium carbonate, or tetramethylammonium hydroxide. The concentration of the alkaline compound in the aqueous solution is preferably 0.01 to 10% by mass, and more preferably 0.03 to 5% by mass. The developing solution may further contain a surfactant. The developing method may be any of a paddle method, a dipping method, a spray method, and the like. Furthermore, during the developing process, the substrate may be inclined at any angle.

After the developing process, the resultant product is preferably washed with water.

Furthermore, the resultant colored pattern is preferably subjected to post-baking. The temperature for the post-baking is preferably 80 to 250° C., and more preferably 100 to 245° C. The time for the post-baking is preferably 1 to 120 minutes, and more preferably 2 to 30 minutes.

The colored pattern and the colored coating film thus produced are useful as a color filter. The color filter is useful as a color filter used for a display devices such as a liquid crystal display device or an organic EL device; an electronic paper; a solid-state image sensor; and the like.

This application claims benefit of priority based on Japanese Patent No. 2020-130478 filed on Jul. 31, 2020. The entire content of the specification of Japanese Patent No. 2020-130478 filed on Jul. 31, 2020 is incorporated herein by reference.

EXAMPLES

Hereinafter, the present invention will be described in more detail with reference to Examples. However, of course, the present invention is not limited to the following Examples, and various design variations made in accordance with the purports described hereinbefore and hereinafter are also included in the technical scope of the present invention. In the Examples, the terms "%" and "parts" that represent a content or an amount used are based on mass unless otherwise specified.

The structures of compounds were identified by mass spectrometry (MALDI-TOF MS; JMS-S3000 manufactured by JEOL Ltd.).

Example 1

1.0 part of a compound represented by formula (1) (manufactured by Tokyo Chemical Industry Co., Ltd.), 0.32 parts of a compound represented by formula (2) ("API-9" manufactured by Katayama Chemical Industry Co., Ltd.), and 10.0 parts of N-methylpyrrolidone (hereinafter also referred to as NMP) (manufactured by FUJIFILM Wako Pure Chemical Corporation) were mixed at room temperature, and the mixture was heated to 120° C. and stirred for 6 hours. After cooling this reaction solution to room temperature, 50 parts of ion exchange water was added thereto. The resulting precipitate was collected as a suction filtration residue, washed with 50 parts of methanol, and then dried under reduced pressure while heating at 60° C. to produce 0.98 parts of a compound represented by formula (3).

(1)

(2)

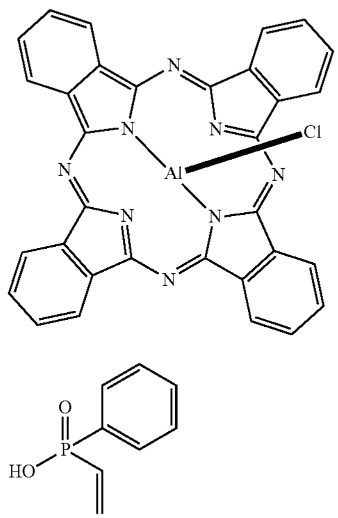

-continued (3)

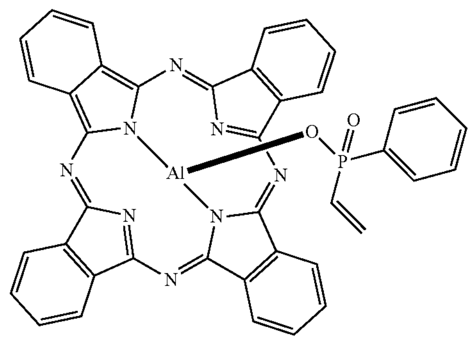

Identification of Compound Represented by Formula (3) (Mass Spectrometry)

Ionization mode=MALDI-TOF$^+$: m/z=706.2

Exact Mass: 706.2

Example 2

A compound represented by formula (4) was produced by the synthesis method described in Supporting Information of "Synthesis of Nitrogen-Containing Furanose Sugar Nucleotides for Use as Enzymatic Probes" (Org. Lett. 2014, 16, 1, 212-215) by Ryan B. Snitynsky et al.

(4)

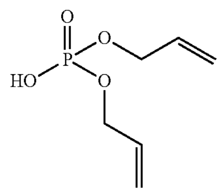

1.0 part of a compound represented by formula (1) (manufactured by Tokyo Chemical Industry Co., Ltd.), 0.34 parts of the compound represented by formula (4), and 5.0 parts of NMP were mixed at room temperature, and the mixture was heated to 120° C. and stirred for 6 hours. After cooling this reaction solution to room temperature, 50 parts of ion exchange water was added thereto. The resulting precipitate was collected as a suction filtration residue, washed with 50 parts of ion exchange water, and then dried under reduced pressure while heating at 60° C. to produce 1.18 parts of a compound represented by formula (5).

(5)

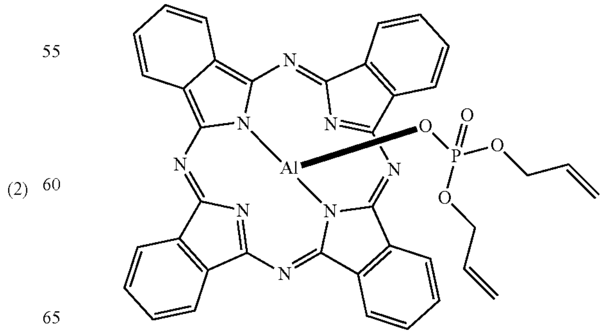

Identification of Compound Represented by Formula (5)

(Mass Spectrometry)

Ionization mode=MALDI-TOF$^-$: m/z=716.3

Exact Mass: 716.2

Example 3

A compound represented by formula (6) was produced by the synthesis method for the compound represented by formula (4) of Example 2, except to replace allyl alcohol with 3-buten-1-ol.

(6)

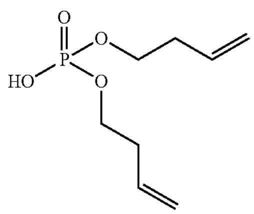

1.0 part of a compound represented by formula (1) (manufactured by Tokyo Chemical Industry Co., Ltd.), 0.39 parts of the compound represented by formula (6), and 5.0 parts of NMP were mixed at room temperature, and the mixture was heated to 120° C. and stirred for 6 hours. After cooling this reaction solution to room temperature, 50 parts of ion exchange water was added thereto. The resulting precipitate was collected as a suction filtration residue, washed with 50 parts of ion exchange water, and then dried under reduced pressure while heating at 60° C. to produce 1.24 parts of a compound represented by formula (7).

(7)

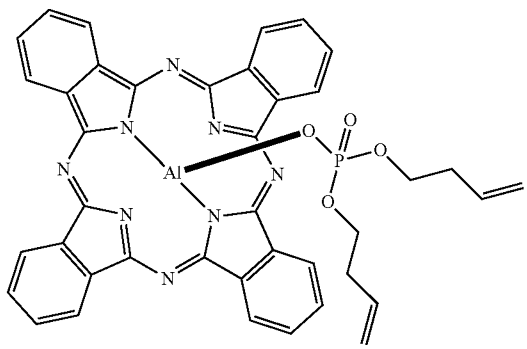

Identification of Compound Represented by Formula (7)

(Mass Spectrometry)

Ionization mode=MALDI-TOF$^-$: m/z=744.4

Exact Mass: 744.2

Example 4

A compound represented by formula (8) was produced by the synthesis method for the compound represented by formula (4) of Example 2, except to replace allyl alcohol with 3-butyn-1-ol.

(8)

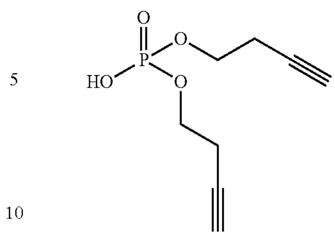

1.0 part of a compound represented by formula (1) (manufactured by Tokyo Chemical Industry Co., Ltd.), 0.39 parts of the compound represented by formula (8), and 5.0 parts of NMP were mixed at room temperature, and the mixture was heated to 120° C. and stirred for 6 hours. After cooling this reaction solution to room temperature, 50 parts of ion exchange water was added thereto. The resulting precipitate was collected as a suction filtration residue, washed with 50 parts of ion exchange water, and then dried under reduced pressure while heating at 60° C. to produce 1.28 parts of a compound represented by formula (9).

(9)

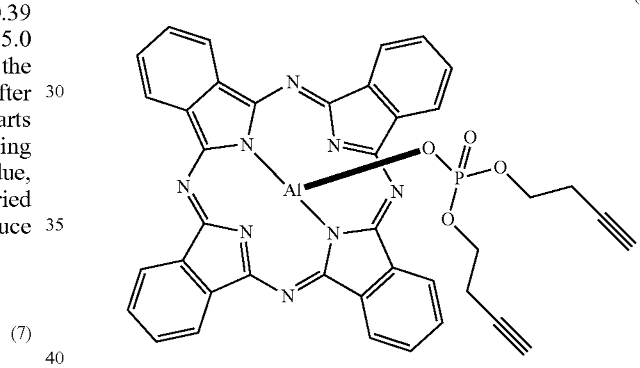

Identification of Compound Represented by Formula (9)

(Mass Spectrometry)

Ionization mode=MALDI-TOF$^-$: m/z=740.3

Exact Mass: 740.2

Example 5

To 1.8 parts of cis-2-butene-1,4-diol (manufactured by Tokyo Chemical Industry Co., Ltd.), 6.1 parts of triethylamine, and 200 parts of toluene (manufactured by FUJIFILM Wako Pure Chemical Corporation) was added dropwise 6.1 parts of phosphoryl chloride at 0° C. After the dropwise addition, the mixture was heated to room temperature and stirred for 4.5 hours. This reaction solution was filtered to remove triethylamine hydrochloride, after which the solvent was removed using a rotary evaporator. To the obtained compound were added 30 parts of cyclopentyl methyl ether (manufactured by Tokyo Chemical Industry Co., Ltd.) and 30 parts of ion exchange water, followed by stirring for 5 hours. The resultant solution was separated with ethyl acetate to take out an aqueous layer, and water was removed using a rotary evaporator. The resultant mixture was purified with a silica gel column to produce 3.35 parts of triethylamine salt of a compound represented by formula (10).

(10)

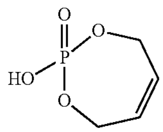

1.0 part of a compound represented by formula (1) (manufactured by Tokyo Chemical Industry Co., Ltd.), 0.75 parts of the trimethylamine salt of the compound represented by formula (10), and 5.0 parts of NMP were mixed at room temperature, and the mixture was heated to 120° C. and stirred for 6 hours. After cooling this reaction solution to room temperature, 50 parts of ion exchange water was added thereto. The resulting precipitate was collected as a suction filtration residue, washed with 50 parts of ion exchange water, and then dried under reduced pressure while heating at 60° C. to produce 1.17 parts of a compound represented by formula (11).

(11)

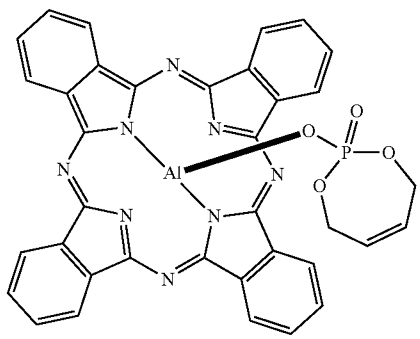

Identification of Compound Represented by Formula (11) (Mass Spectrometry)

Ionization mode=MALDI-TOF$^+$: m/z=688.2

Exact Mass: 688.1

Example 6

1.5 parts of aluminum chloride (manufactured by FUJI-FILM Wako Pure Chemical Corporation), 6.2 parts of 4-tert-butylphthalonitrile (manufactured by Tokyo Chemical Industry Co., Ltd.), 5.1 parts of 1,8-diazabicyclo[5.4.0]-7-undecene (manufactured by Tokyo Chemical Industry Co., Ltd.), and 11 parts of 1-pentanol (manufactured by FUJIF-ILM Wako Pure Chemical Corporation) were mixed at room temperature, and the mixture was heated to 160° C. and stirred for 13 hours. After cooling this reaction solution to room temperature, 63 parts of ethyl acetate was added thereto. The resulting precipitate was collected as a suction filtration residue, washed with 89 parts of ion exchange water, and then dried under reduced pressure at 60° C. to produce 3.4 parts of a compound represented by formula (12).

(12)

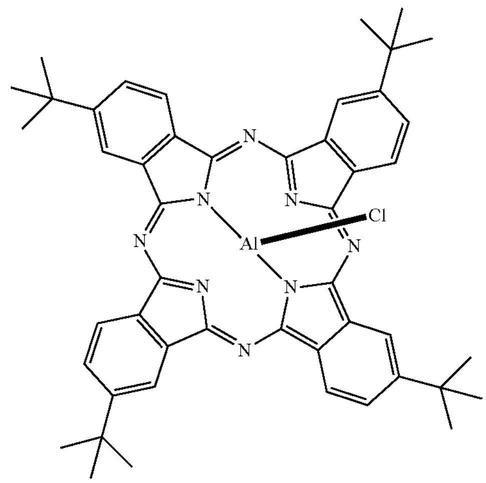

Identification of Compound Represented by Formula (12) (Mass Spectrometry)

Ionization mode=MALDI-TOF$^-$: m/z=M$^-$ 798.5

Exact Mass: 798.4

1.1 parts of the compound represented by formula (12), 0.25 parts of a compound represented by formula (2), and 5.5 parts of NMP were mixed at room temperature, and the mixture was heated to 120° C. and stirred for 7 hours. After cooling this reaction solution to room temperature, 28 parts of ion exchange water was added thereto. The resulting precipitate was collected as a suction filtration residue, washed with 11 parts of methanol, and then dried under reduced pressure at 60° C. to produce 1.2 parts of a compound represented by formula (13).

(13)

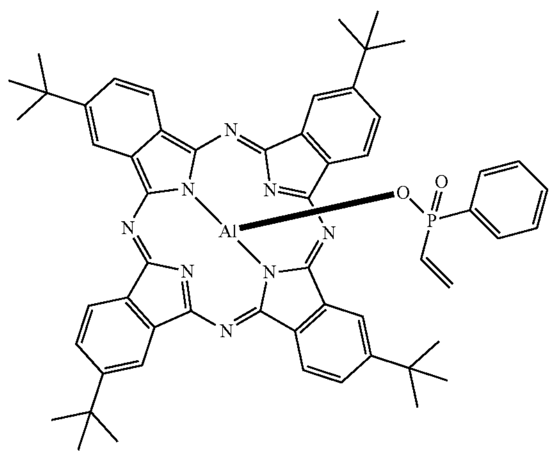

Identification of Compound Represented by Formula (13) (Mass Spectrometry)

Ionization mode=MALDI-TOF$^-$: m/z=M$^-$ 930.6

Exact Mass: 930.4

Example 7

A compound represented by formula (14) was produced according to paragraphs 0071 to 0072 of Japanese Translation of PCT International Application Publication No. 2012-507743.

(14)

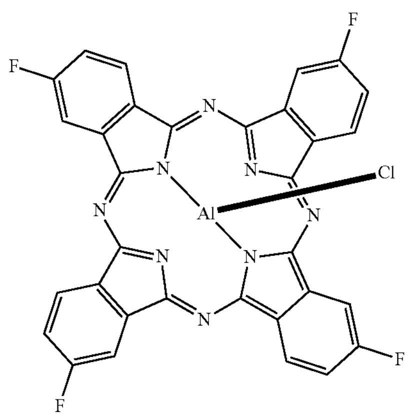

Identification of Compound Represented by Formula (14) (Mass Spectrometry)

Ionization mode=MALDI-TOF$^-$: m/z=M$^-$ 646.2

Exact Mass: 646.1

1.6 parts of the compound represented by formula (14), 0.83 parts of a compound represented by formula (2), and 8.0 parts of NMP were mixed at room temperature, and the mixture was heated to 120° C. and stirred for 8 hours. After cooling this reaction solution to room temperature, 40 parts of ion exchange water was added thereto. The resulting precipitate was collected as a suction filtration residue, washed with 40 parts of methanol, and then dried under reduced pressure at 60° C. to produce 1.9 parts of a compound represented by formula (15).

(15)

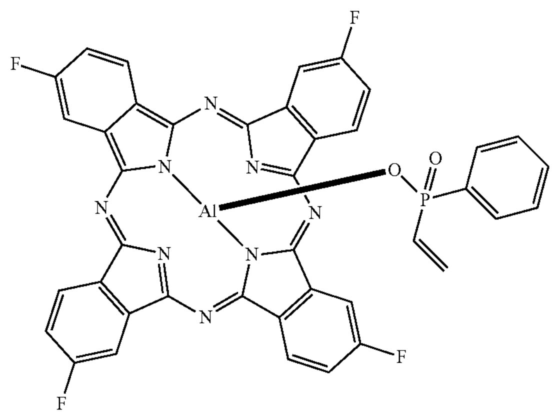

Identification of Compound Represented by Formula (15) (Mass Spectrometry)

Ionization mode=MsALDI-TOF$^-$: m/z=M$^-$ 778.3

Exact Mass: 778.1

Example 8

1.6 parts of the compound represented by formula (14), 0.47 parts of the compound represented by formula (4), and 7.8 parts of NMP were mixed at room temperature, and the mixture was heated to 120° C. and stirred for 8 hours. After cooling this reaction solution to room temperature, 39 parts of ion exchange water was added thereto. The resulting precipitate was collected as a suction filtration residue, and then dried under reduced pressure at 60° C. to produce 1.9 parts of a compound represented by formula (16).

(16)

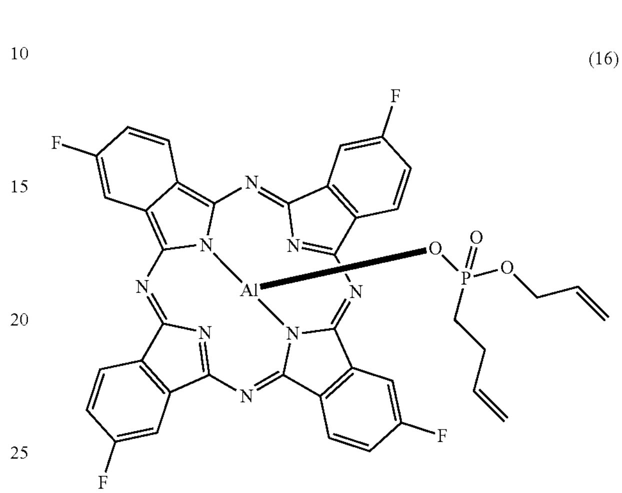

Identification of Compound Represented by Formula (16) (Mass Spectrometry)

Ionization mode=MALDI-TOF$^-$: m/z=M$^-$ 788.3

Exact Mass: 788.1

Example 9

A compound represented by formula (17) was produced in the same manner as in the method described in paragraphs 0071 to 0072 of Japanese Translation of PCT International Application Publication No. 2012-507743, except to replace 4-fluorophthalonitrile with 4,5-difluorophthalonitrile.

(17)

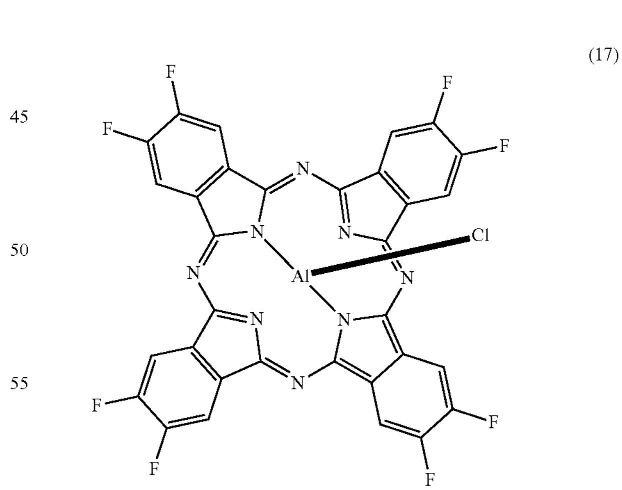

Identification of Compound Represented by Formula (17) (Mass Spectrometry)

Ionization mode=MALDI-TOF$^-$: m/z=M$^-$ 718.2

Exact Mass: 718.0

1.6 parts of the compound represented by formula (17), 0.75 parts of a compound represented by formula (2), and 16 parts of NMP were mixed at room temperature, and the mixture was heated to 120° C. and stirred for 8 hours. After cooling this reaction solution to room temperature, 80 parts of ion exchange water was added thereto. The resulting precipitate was collected as a suction filtration residue, washed with 40 parts of methanol, and then dried under reduced pressure at 60° C. to produce 1.8 parts of a compound represented by formula (18).

(18)

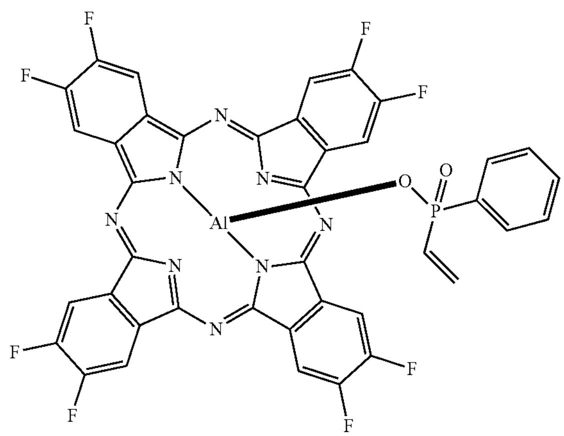

Identification of Compound Represented by Formula (18) (Mass Spectrometry)

Ionization mode=MALDI-TOF$^-$: m/z=M$^-$ 850.2

Exact Mass: 850.1

Example 10

A compound represented by formula (19) was produced according to the experimental section of page 651 of "Molecular organization in the thin films of chloroaluminium hexadecafluorophthalocyanine revealed by polarized Raman spectroscopy" (Thin Solid Films, 2013, Volume 548, 650-656) by Tamara V. Basova et al.

(19)

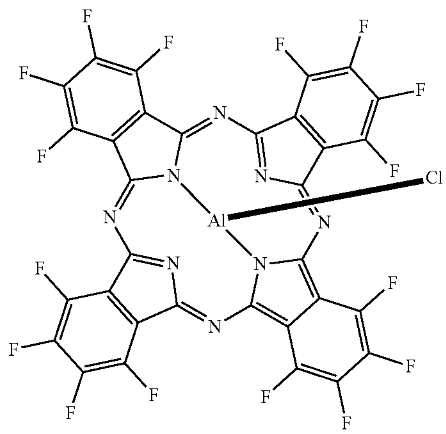

Identification of Compound Represented by Formula (19) (Mass Spectrometry)

Ionization mode=MALDI-TOF$^-$: m/z=M$^-$ 862.1

Exact Mass: 861.9

1.3 parts of the compound represented by formula (19), 0.51 parts of a compound represented by formula (2), and 13 parts of NMP were mixed at room temperature, and the mixture was heated to 120° C. and stirred for 8.5 hours. After cooling this reaction solution to room temperature, 65 parts of ion exchange water was added thereto. The resulting precipitate was collected as a suction filtration residue, washed with 26 parts of a mixture of methanol and ion exchange with volume ratio 1:1, and then dried under reduced pressure at 60° C. to produce 1.4 parts of a compound represented by formula (20).

(20)

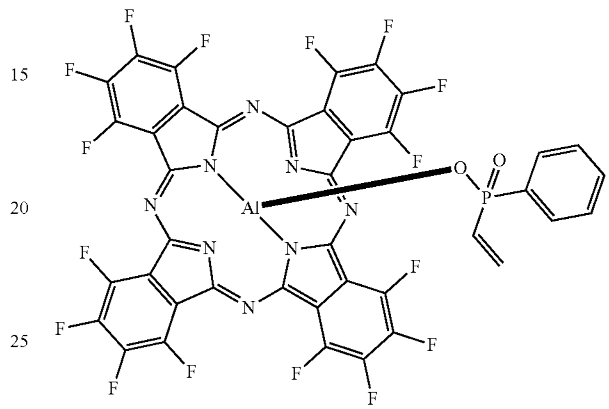

Identification of Compound Represented by Formula (20) (Mass Spectrometry)

Ionization mode=MALDI-TOF$^-$: m/z=M$^-$ 994.2

Exact Mass: 994.0

Example 11

1.4 parts of the compound represented by formula (19), 0.32 parts of the compound represented by formula (4), and 14 parts of NMP were mixed at room temperature, and the mixture was heated to 120° C. and stirred for 7 hours. After cooling this reaction solution to room temperature, 70 parts of ion exchange water was added thereto. The resulting precipitate was collected as a suction filtration residue, and then dried under reduced pressure at 60° C. to produce 1.5 parts of a compound represented by formula (21).

(21)

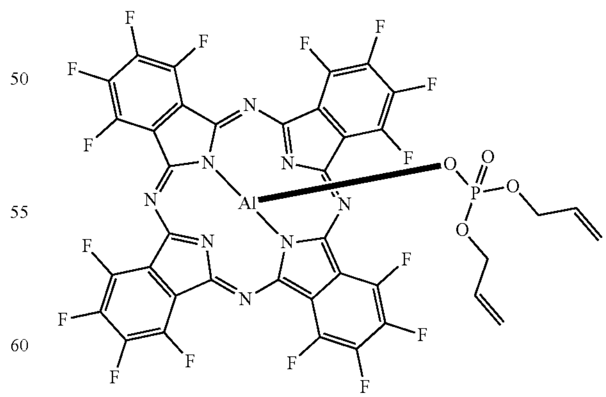

Identification of Compound Represented by Formula (21) (Mass Spectrometry)

Ionization mode=MALDI-TOF$^-$: m/z=M$^-$ 1004.1

Exact Mass: 1004.0

Example 12

A compound represented by formula (23) was produced by the synthesis method for the compound represented by formula (4) of Example 2, except to replace allyl alcohol with 2-propyn-1-ol.

(23)

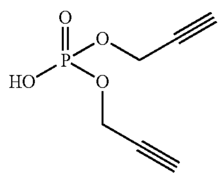

2.0 parts of a compound represented by formula (1) (manufactured by Tokyo Chemical Industry Co., Ltd.), 0.67 parts of the compound represented by formula (23), and 10.0 parts of NMP were mixed at room temperature, and the mixture was heated to 120° C. and stirred for 6 hours. After cooling this reaction solution to room temperature, 100 parts of ion exchange water was added thereto. The resulting precipitate was collected as a suction filtration residue, washed with 100 parts of ion exchange water, and then dried under reduced pressure while heating at 60° C. to produce 2.4 parts of a compound represented by formula (24).

(24)

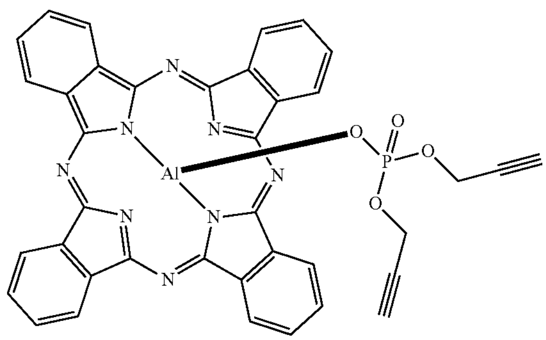

Identification of Compound Represented by Formula (24) (Mass Spectrometry)

Ionization mode=MALDI-TOF$^-$: $m/z$=712.2

Exact Mass: 712.1

Example 13

To 6.65 parts of phenyl dichlorophosphate (manufactured by Tokyo Chemical Industry Co., Ltd.) and 11.1 parts of tetrahydrofuran (manufactured by FUJIFILM Wako Pure Chemical Corporation) was added dropwise a mixed solution of 2.10 parts of 3-butyn-1-ol (manufactured by Tokyo Chemical Industry Co., Ltd.) and 11.1 parts of tetrahydrofuran at 0° C. Subsequently, to this mixture was added dropwise a mixed solution of 7.59 parts of triethylamine (manufactured by Tokyo Chemical Industry Co., Ltd.) and 11.1 parts of tetrahydrofuran at 0° C. Thereafter, the resultant mixture was stirred at room temperature for 3 hours, and then 33.3 parts of ion exchange water was added thereto.

The obtained solution was separated with chloroform (manufactured by FUJIFILM Wako Pure Chemical Corporation) to take out an organic layer. After drying with sodium sulfate, the solvent was removed using a rotary evaporator. The resultant mixture was purified with a silica gel column to produce 2.8 parts of a compound represented by formula (25).

(25)

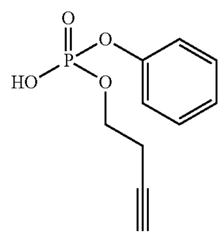

2.0 parts of a compound represented by formula (1) (manufactured by Tokyo Chemical Industry Co., Ltd.), 0.87 parts of the compound represented by formula (25), and 10.0 parts of ethylene glycol (manufactured by Kanto Chemical Co., Inc.) were mixed at room temperature, and the mixture was heated to 120° C. and stirred for 6 hours. After cooling this reaction solution to room temperature, 100 parts of ion exchange water was added thereto. The resulting precipitate was collected as a suction filtration residue, washed with 100 parts of ion exchange water, and then dried under reduced pressure while heating at 60° C. to produce 2.3 parts of a compound represented by formula (26).

(26)

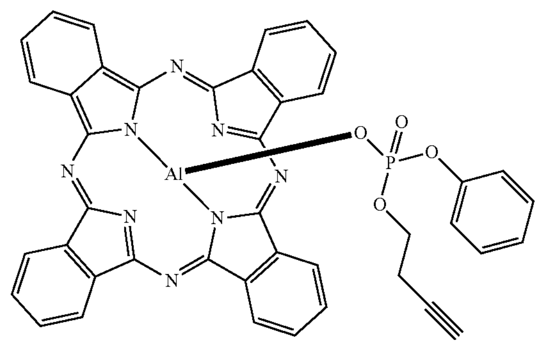

Identification of Compound Represented by Formula (26) (Mass Spectrometry)

Ionization mode=MALDI-TOF$^-$: $m/z$=764.3

Exact Mass: 764.2

Example 14

A compound represented by formula (27) was produced by the synthesis method for the compound represented by formula (25) of Example 13, except to replace phenyl dichlorophosphate with phenylphosphonic dichloride.

(27)

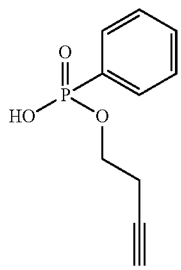

1.0 part of a compound represented by formula (1) (manufactured by Tokyo Chemical Industry Co., Ltd.), 0.45 parts of the compound represented by formula (27), and 5.0 parts of ethylene glycol (manufactured by Kanto Chemical Co., Inc.) were mixed at room temperature, and the mixture was heated to 120° C. and stirred for 6 hours. After cooling this reaction solution to room temperature, 50 parts of ion exchange water was added thereto. The resulting precipitate was collected as a suction filtration residue, washed with 50 parts of ion exchange water, and then dried under reduced pressure while heating at 60° C. to produce 0.84 parts of a compound represented by formula (28).

(28)

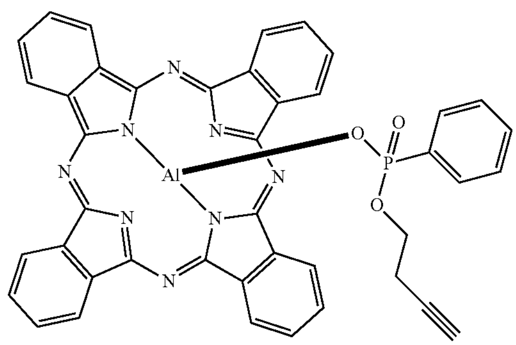

Identification of Compound Represented by Formula (28) (Mass Spectrometry)

Ionization mode=MALDI-TOF$^-$: *m/z*=748.2

Exact Mass: 748.2

Example 15

1.0 part of the compound represented by formula (12), 0.51 parts of the compound represented by formula (8), and 5.0 parts of NMP were mixed at room temperature, and the mixture was heated to 120° C. and stirred for 6 hours. After cooling this reaction solution to room temperature, 50 parts of ion exchange water was added thereto. The resulting precipitate was collected as a suction filtration residue, and then dried under reduced pressure at 60° C. to produce 0.94 parts of a compound represented by formula (29).

(29)

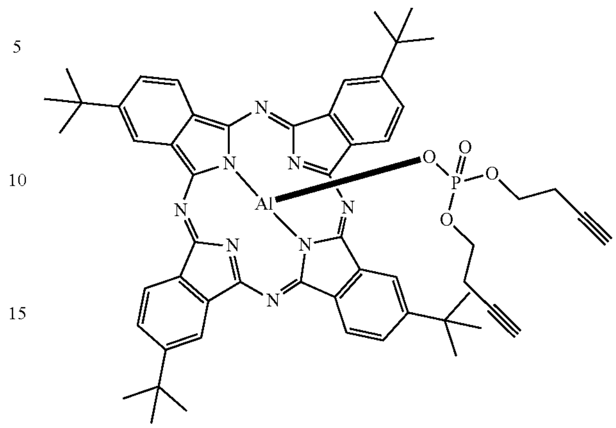

Identification of Compound Represented by Formula (29) (Mass Spectrometry)

Ionization mode=MALDI-TOF$^-$: *m/z*=964.6

Exact Mass: 964.4

Example 16

2.0 parts of a compound represented by formula (1), 0.75 parts of a compound represented by formula (30) (manufactured by Tokyo Chemical Industry Co., Ltd.), and 10.0 parts of NMP were mixed at room temperature, and the mixture was heated to 120° C. and stirred for 6 hours. After cooling this reaction solution to room temperature, 50 parts of ion exchange water was added thereto. The resulting precipitate was collected as a suction filtration residue, and then dried under reduced pressure at 60° C. to produce 1.8 parts of a mixture of compounds represented by formulae (31-I) and (31-II).

(30)

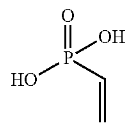

(31-I)

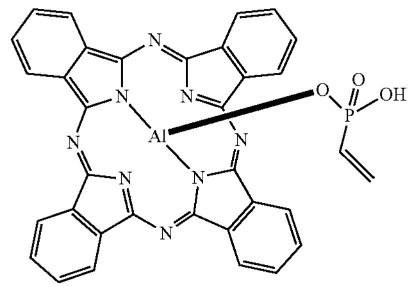

-continued (31-II)

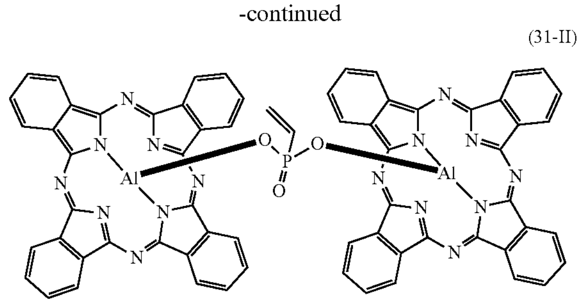

Identification of Compound Represented by Formula (31-I) (Mass Spectrometry)

Ionization mode=MALDI-TOF⁻: $m/z$=646.1

Exact Mass: 646.1

Identification of Compound Represented by Formula (31-II) (Mass Spectrometry)

Ionization mode=MALDI-TOF⁻: $m/z$=1184.3

Exact Mass: 1184.2

Example 17

A compound represented by formula (32) was produced by the synthesis method for the compound represented by formula (4) of Example 2, except to replace allyl alcohol with 4-pentyn-2-ol.

(32)

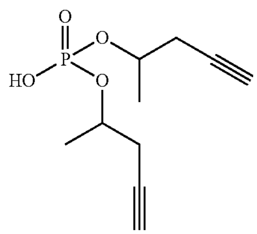

1.5 parts of a compound represented by formula (1) (manufactured by Tokyo Chemical Industry Co., Ltd.), 0.66 parts of the compound represented by formula (32), and 7.5 parts of PGMEA were mixed at room temperature, and the mixture was heated to 120° C. and stirred for 6 hours. After cooling this reaction solution to room temperature, 75 parts of ethyl acetate was added thereto. The resulting precipitate was collected as a suction filtration residue, washed with 75 parts of ethyl acetate, and then dried under reduced pressure while heating at 60° C. to produce 1.7 parts of a compound represented by formula (33).

(33)

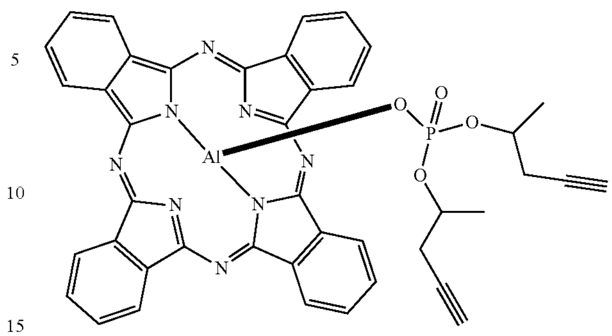

Identification of Compound Represented by Formula (33) (Mass Spectrometry)

Ionization mode=MALDI-TOF⁻: $m/z$=768.2

Exact Mass: 768.2

Example 18

A compound represented by formula (34) was produced by the synthesis method for the compound represented by formula (25) of Example 13, except to replace 3-butyn-1-ol with 4-pentyn-2-ol.

(34)

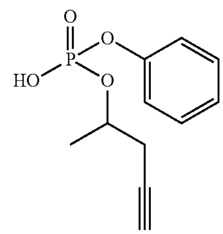

1.5 parts of a compound represented by formula (1) (manufactured by Tokyo Chemical Industry Co., Ltd.), 0.69 parts of the compound represented by formula (34), and 7.5 parts of PGMEA were mixed at room temperature, and the mixture was heated to 120° C. and stirred for 6 hours. After cooling this reaction solution to room temperature, 75 parts of ethyl acetate was added thereto. The resulting precipitate was collected as a suction filtration residue, washed with 75 parts of ethyl acetate, and then dried under reduced pressure while heating at 60° C. to produce 1.7 parts of a compound represented by formula (35).

(35)

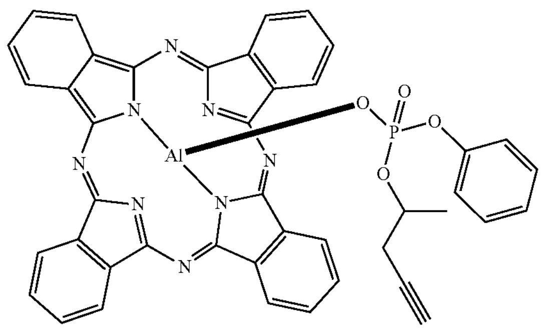

Identification of Compound Represented by Formula (35) (Mass Spectrometry)

Ionization mode=MALDI-TOF⁻: *m/z*=778.2

Exact Mass: 778.2

Example 19

A compound represented by formula (36) was produced by the synthesis method for the compound represented by formula (4) of Example 2, except to replace allyl alcohol with 5-hexyn-3-ol.

(36)

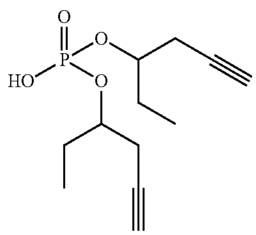

1.5 parts of a compound represented by formula (1) (manufactured by Tokyo Chemical Industry Co., Ltd.), 0.49 parts of the compound represented by formula (36), and 5.0 parts of PGMEA were mixed at room temperature, and the mixture was heated to 120° C. and stirred for 6 hours. After cooling this reaction solution to room temperature, 50 parts of ethyl acetate was added thereto. The resulting precipitate was collected as a suction filtration residue, washed with 50 parts of ethyl acetate, and then dried under reduced pressure while heating at 60° C. to produce 1.2 parts of a compound represented by formula (37).

(37)

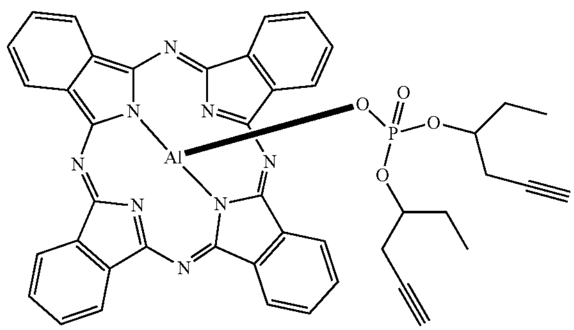

Identification of Compound Represented by Formula (37) (Mass Spectrometry)

Ionization mode=MALDI-TOF⁻: *m/z*=796.2

Exact Mass: 796.2

Example 20

A compound represented by formula (38) was produced by the synthesis method for the compound represented by formula (25) of Example 13, except to replace 3-butyn-1-ol with 5-hexyn-3-ol.

(38)

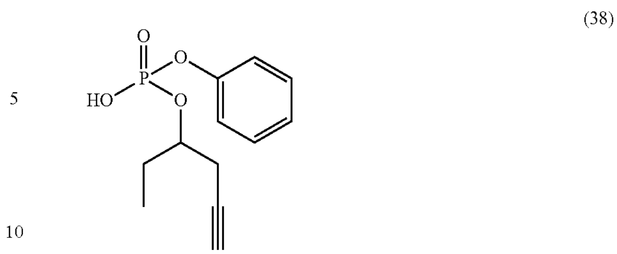

1.5 parts of a compound represented by formula (1) (manufactured by Tokyo Chemical Industry Co., Ltd.), 0.73 parts of the compound represented by formula (38), and 7.5 parts of PGMEA were mixed at room temperature, and the mixture was heated to 120° C. and stirred for 6 hours. After cooling this reaction solution to room temperature, 75 parts of ethyl acetate was added thereto. The resulting precipitate was collected as a suction filtration residue, washed with 75 parts of ethyl acetate, and then dried under reduced pressure while heating at 60° C. to produce 1.3 parts of a compound represented by formula (39).

(39)

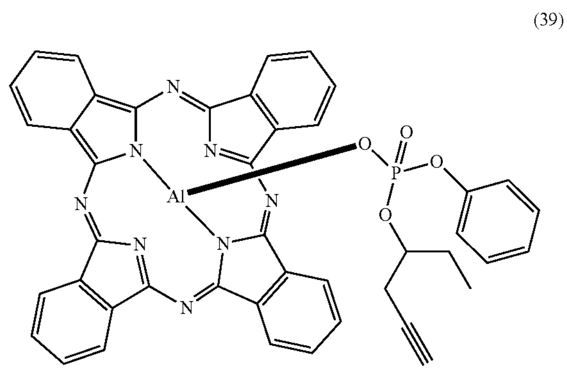

Identification of Compound Represented by Formula (39) (Mass Spectrometry)

Ionization mode=MALDI-TOF⁻: *m/z*=792.2

Exact Mass: 792.2

Example 21

A compound represented by formula (40) was produced by the synthesis method for the compound represented by formula (4) of Example 2, except to replace allyl alcohol with 7-octyn-1-ol.

(40)

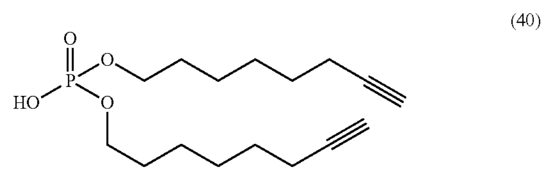 [SMILES: C#CCCCCCCOP(=O)(O)OCCCCCCC#C]

2.7 parts of a compound represented by formula (1) (manufactured by Tokyo Chemical Industry Co., Ltd.), 1.8 parts of the compound represented by formula (40), and 14 parts of PGMEA were mixed at room temperature, and the mixture was heated to 120° C. and stirred for 6 hours. After cooling this reaction solution to room temperature, 135 parts of ethyl acetate was added thereto. The resulting precipitate was collected as a suction filtration residue, washed with 135 parts of ethyl acetate, and then dried under reduced pressure while heating at 60° C. to produce 3.5 parts of a compound represented by formula (41).

(41)

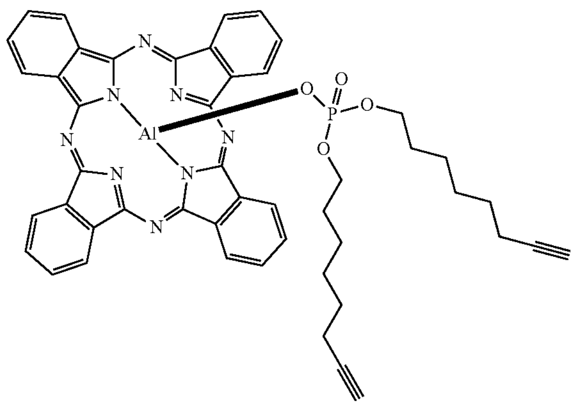

Identification of Compound Represented by Formula (41) (Mass Spectrometry)

Ionization mode=MALDI-TOF$^-$: $m/z$=852.3

Exact Mass: 852.3

Example 22

A compound represented by formula (42) was produced by the synthesis method for the compound represented by formula (4) of Example 2, except to replace allyl alcohol with 9-decyn-1-ol.

(42)

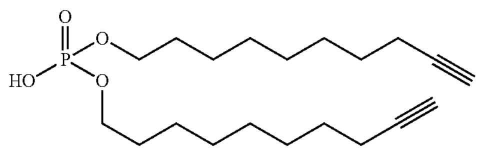

2.7 parts of a compound represented by formula (1) (manufactured by Tokyo Chemical Industry Co., Ltd.), 2.6 parts of the compound represented by formula (42), and 14 parts of PGMEA were mixed at room temperature, and the mixture was heated to 120° C. and stirred for 6 hours. After cooling this reaction solution to room temperature, 135 parts of ethyl acetate was added thereto. The resulting precipitate was collected as a suction filtration residue, washed with 135 parts of ethyl acetate, and then dried under reduced pressure while heating at 60° C. to produce 2.9 parts of a compound represented by formula (43).

(43)

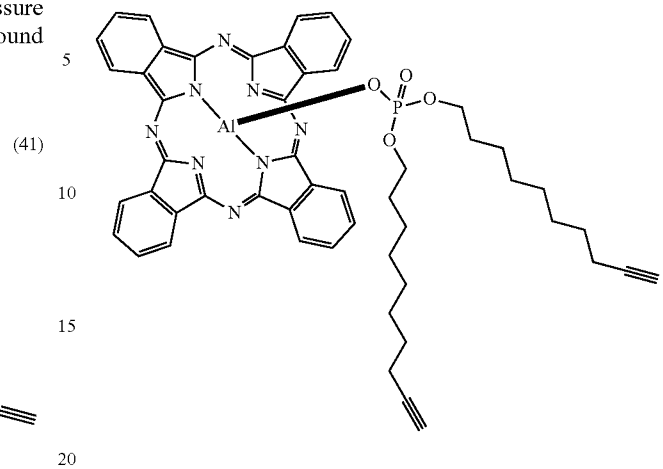

Identification of Compound Represented by Formula (43) (Mass Spectrometry)

Ionization mode=MALDI-TOF$^-$: $m/z$=908.4

Exact Mass: 908.4

Example 23

A compound represented by formula (44) was produced by the synthesis method for the compound represented by formula (4) of Example 2, except to replace allyl alcohol with 5-heptyn-3-ol.

(44)

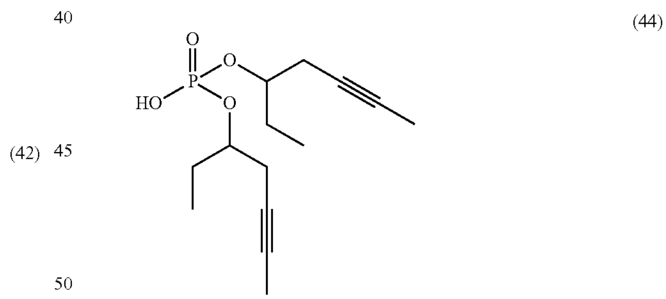

2.0 parts of a compound represented by formula (1) (manufactured by Tokyo Chemical Industry Co., Ltd.), 1.10 parts of the compound represented by formula (44), and 10.0 parts of PGMEA were mixed at room temperature, and the mixture was heated to 120° C. and stirred for 6 hours. After cooling this reaction solution to room temperature, 50 parts of ethyl acetate was added thereto. The resulting precipitate was collected as a suction filtration residue, washed with 100 parts of ethyl acetate, and then dried under reduced pressure while heating at 60° C. to produce 2.4 parts of a compound represented by formula (45).

(45)

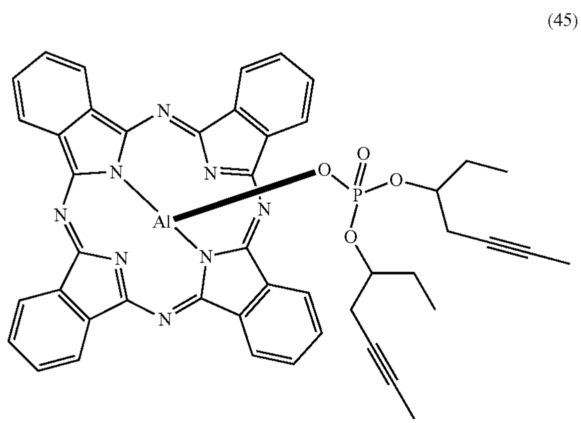

Identification of Compound Represented by Formula (45) (Mass Spectrometry)

Ionization mode=MALDI-TOF$^-$: $m/z$=824.4

Exact Mass: 824.3

Example 24

A compound represented by formula (46) was produced by the synthesis method for the compound represented by formula (4) of Example 2, except to replace allyl alcohol with 3-pentyn-1-ol.

(46)

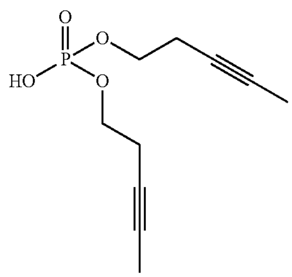

2.0 parts of a compound represented by formula (1) (manufactured by Tokyo Chemical Industry Co., Ltd.), 0.88 parts of the compound represented by formula (46), and 10.0 parts of PGMEA were mixed at room temperature, and the mixture was heated to 120° C. and stirred for 6 hours. After cooling this reaction solution to room temperature, 50 parts of ethyl acetate was added thereto. The resulting precipitate was collected as a suction filtration residue, washed with 100 parts of ethyl acetate, and then dried under reduced pressure while heating at 60° C. to produce 2.4 parts of a compound represented by formula (47).

(47)

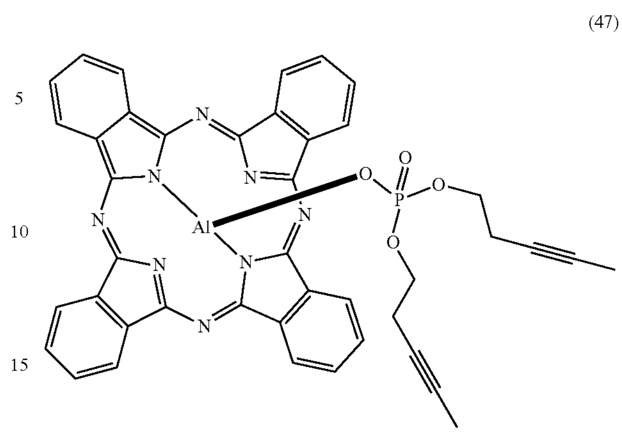

Identification of Compound Represented by Formula (47) (Mass Spectrometry)

Ionization mode=MALDI-TOF$^-$: $m/z$=768.3

Exact Mass: 768.2

Example 25

A compound represented by formula (48) was produced by the synthesis method for the compound represented by formula (4) of Example 2, except to replace allyl alcohol with 5-hexyn-1-ol.

(48)

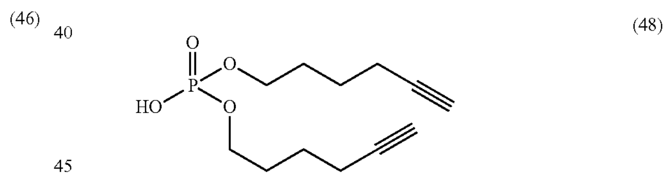

4.8 parts of a compound represented by formula (1) (manufactured by Tokyo Chemical Industry Co., Ltd.), 2.8 parts of the compound represented by formula (48), and 24 parts of PGMEA were mixed at room temperature, and the mixture was heated to 120° C. and stirred for 6 hours. After cooling this reaction solution to room temperature, 240 parts of ethyl acetate was added thereto. The resulting precipitate was collected as a suction filtration residue, washed with 240 parts of ethyl acetate, and then dried under reduced pressure while heating at 60° C. to produce 5.4 parts of a compound represented by formula (49).

(49)

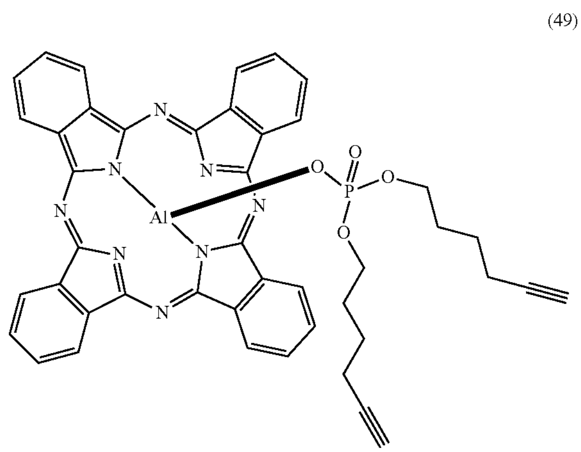

Identification of Compound Represented by Formula (49) (Mass Spectrometry)

Ionization mode=MALDI-TOF$^-$: $m/z$=796.4

Exact Mass: 796.2

Example 26

A compound represented by formula (50) was produced by the synthesis method for the compound represented by formula (4) of Example 2, except to replace allyl alcohol with 6-heptyn-1-ol.

(50)

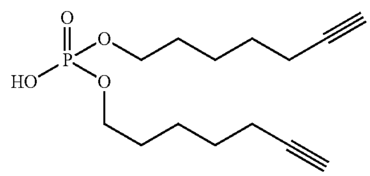

4.8 parts of a compound represented by formula (1) (manufactured by Tokyo Chemical Industry Co., Ltd.), 3.1 parts of the compound represented by formula (50), and 24 parts of PGMEA were mixed at room temperature, and the mixture was heated to 120° C. and stirred for 6 hours. After cooling this reaction solution to room temperature, 240 parts of ethyl acetate was added thereto. The resulting precipitate was collected as a suction filtration residue, washed with 240 parts of ethyl acetate, and then dried under reduced pressure while heating at 60° C. to produce 5.6 parts of a compound represented by formula (51).

(51)

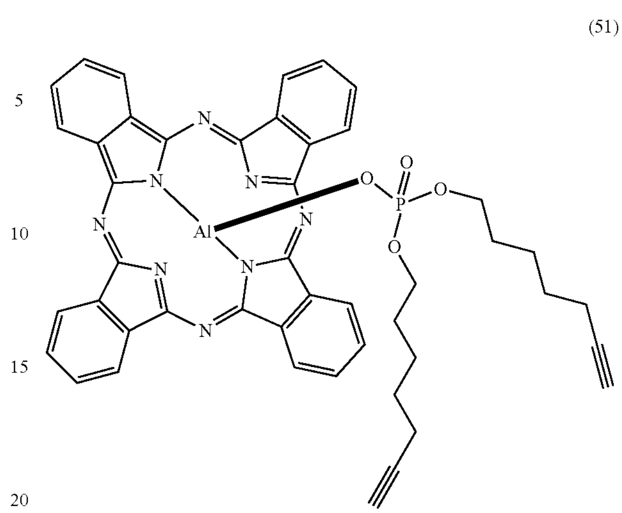

Identification of Compound Represented by Formula (51) (Mass Spectrometry)

Ionization mode=MALDI-TOF$^-$: $m/z$=824.4

Exact Mass: 824.3

Example 27

A compound represented by formula (52) was produced by the synthesis method for the compound represented by formula (4) of Example 2, except to replace allyl alcohol with 2-octyn-1-ol.

(52)

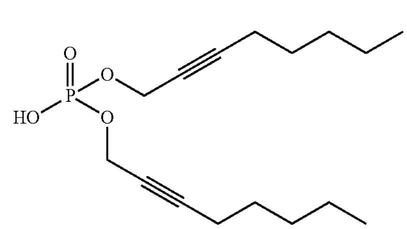

1.0 part of a compound represented by formula (1) (manufactured by Tokyo Chemical Industry Co., Ltd.), 0.73 parts of the compound represented by formula (52), and 5.1 parts of PGMEA were mixed at room temperature, and the mixture was heated to 120° C. and stirred for 6 hours. After cooling this reaction solution to room temperature, 51 parts of ethyl acetate was added thereto. The resulting precipitate was collected as a suction filtration residue, washed with 51 parts of ethyl acetate, and then dried under reduced pressure while heating at 60° C. to produce 1.3 parts of a compound represented by formula (53).

(53)

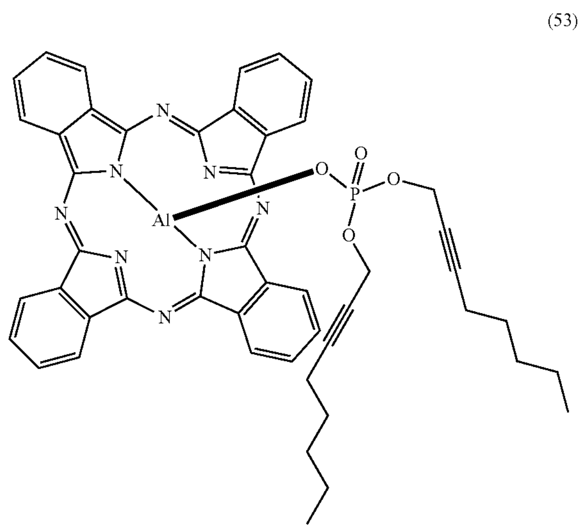

Identification of Compound Represented by Formula (53) (Mass Spectrometry)

Ionization mode=MALDI-TOF$^-$: $m/z$=852.4

Exact Mass: 852.3

Example 28

A compound represented by formula (54) was produced by the synthesis method for the compound represented by formula (4) of Example 2, except to replace allyl alcohol with 3-phenyl-2-propyn-1-ol.

(54)

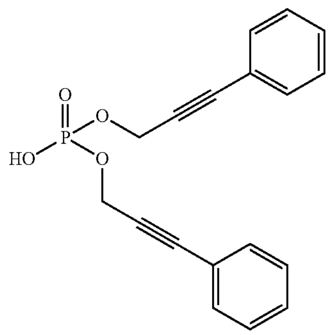

4.8 parts of a compound represented by formula (1) (manufactured by Tokyo Chemical Industry Co., Ltd.), 3.2 parts of the compound represented by formula (54), and 24 parts of PGMEA were mixed at room temperature, and the mixture was heated to 120° C. and stirred for 6 hours. After cooling this reaction solution to room temperature, 240 parts of ethyl acetate was added thereto. The resulting precipitate was collected as a suction filtration residue, washed with 240 parts of ethyl acetate, and then dried under reduced pressure while heating at 60° C. to produce 1.3 parts of a compound represented by formula (55).

(55)

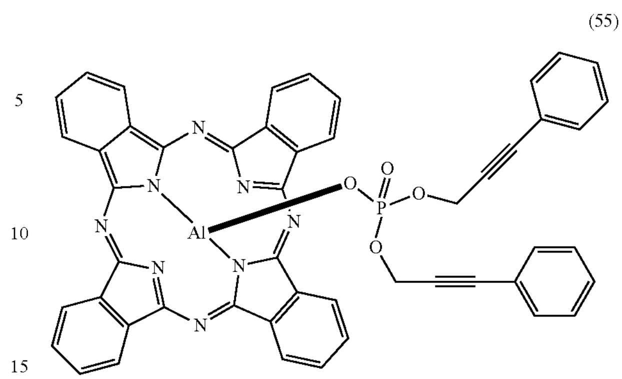

Identification of Compound Represented by Formula (55) (Mass Spectrometry)

Ionization mode=MALDI-TOF$^-$: $m/z$=864.2

Exact Mass: 864.2

Example 29

A compound represented by formula (56) was produced by the synthesis method for the compound represented by formula (19) of Example 10 by replacing tetrafluorophthalonitrile with 4-bromophthalonitrile.

(56)

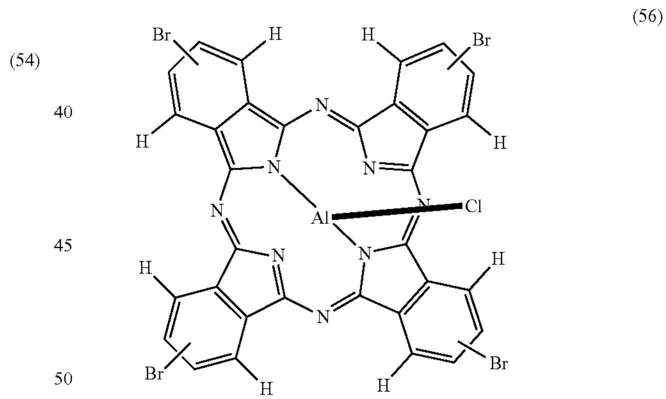

1.5 parts of the compound represented by formula (56), 1.4 parts of the compound represented by formula (8), and 7.5 parts of PGMEA were mixed at room temperature, and the mixture was heated to 120° C. and stirred for 28 hours. After cooling this reaction solution to room temperature, 300 parts of ethyl acetate was added thereto. The resulting precipitate was collected as a suction filtration residue, washed with 150 parts of ethyl acetate, and then dried under reduced pressure while heating at 60° C. to produce 1.1 parts of a compound represented by formula (57).

(57)

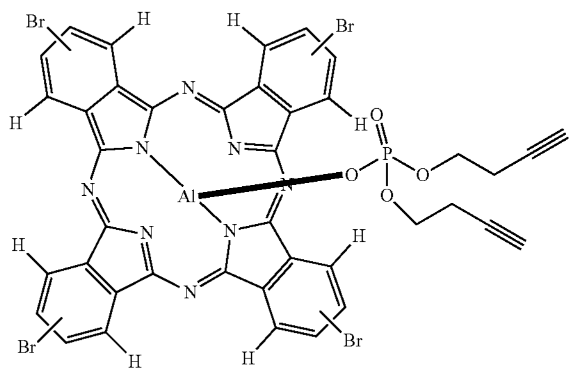

Identification of Compound Represented by Formula (57) (Mass Spectrometry)

Ionization mode=MALDI-TOF$^+$: *m/z*=1051.8

Exact Mass: 1051.8

Comparative Example 1

A compound represented by formula (22) was produced by the synthesis method described in Japanese Patent Laid-Open No. 2016-75837.

(22)

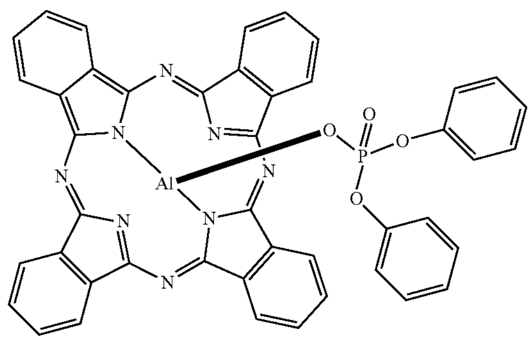

Resin Synthesis Example 1

A proper amount of nitrogen was passed into a flask equipped with a reflux condenser, a dropping funnel, and a stirrer to replace the atmosphere with nitrogen. Then, 340 parts of propylene glycol monomethyl ether acetate was added into the flask, and then heated to 80° C. while stirring. Subsequently, a mixed solution containing 57 parts of acrylic acid, 54 parts of a mixture of 3,4-epoxytricyclo [5.2.1.0$^{2,6}$]decan-8-ylacrylate and 3,4-epoxytricyclo [5.2.1.0$^{2,6}$]decan-9-ylacrylate (the content ratio was 1:1 by mole), 239 parts of benzyl methacrylate, and 73 parts of propylene glycol monomethyl ether acetate was added dropwise into the flask over 5 hours. Meanwhile, a solution prepared by dissolving 40 parts of a polymerization initiator, 2,2-azobis(2,4-dimethylvaleronitrile), in 197 parts of propylene glycol monomethyl ether acetate was added dropwise over 6 hours. After the completion of the dropwise addition of the polymerization initiator-containing solution, the solution was retained at 80° C. for 3 hours, and then cooled to room temperature to obtain a copolymer (resin (B-1)) solution having a viscosity of 137 mPa-s as measured at 23° C. with a Type-B viscometer and a solid content of 36.8% by weight. The produced copolymer had a weight average molecular weight of 1.0×10$^3$ in terms of polystyrene, a degree of dispersion of 1.97, and an acid value of 111 mg-KOH/g in terms of solid content. The resin (B-1) has the following structural units.

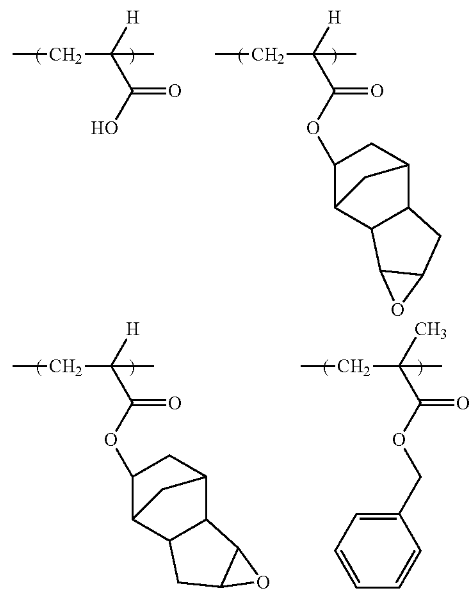

Dispersion Preparation Example 1

5 parts of the compound represented by formula (3) produced in Example 1, 4 parts of a dispersant (BYKLPN-6919 manufactured by BYK) (in terms of solid content), 4 parts of the resin (B-1) (in terms of solid content), and 87 parts of propylene glycol monomethyl ether acetate were mixed, 300 parts of 0.2 μm zirconia beads were added thereto, and this mixture was shaken for 1 hour using a paint conditioner (manufactured by LAU). Subsequently, the zirconia beads were removed by filtration to prepare a dispersion (A-1).

Dispersion Preparation Examples 2 to 29

Dispersions (A-2) to (A-29) were prepared in the same manner as in Dispersion Preparation Example 1, except that the compound represented by formula (3) was replaced with the following compounds.

Dispersion (A-2): the compound represented by formula (5) produced in Example 2

Dispersion (A-3): the compound represented by formula (7) produced in Example 3

Dispersion (A-4): the compound represented by formula (9) produced in Example 4

Dispersion (A-5): the compound represented by formula (11) produced in Example 5

Dispersion (A-6): the compound represented by formula (13) produced in Example 6

Dispersion (A-7): the compound represented by formula (15) produced in Example 7

Dispersion (A-8): the compound represented by formula (16) produced in Example 8

Dispersion (A-9): the compound represented by formula (18) produced in Example 9
Dispersion (A-10): the compound represented by formula (20) produced in Example 10
Dispersion (A-11): the compound represented by formula (21) produced in Example 11
Dispersion (A-12): the compound represented by formula (24) produced in Example 12
Dispersion (A-13): the compound represented by formula (26) produced in Example 13
Dispersion (A-14): the compound represented by formula (28) produced in Example 14
Dispersion (A-15): the compound represented by formula (29) produced in Example 15
Dispersion (A-16): the mixture of compounds represented by formulae (31-I) and (31-II) produced in Example 16
Dispersion (A-17): the compound represented by formula (33) produced in Example 17
Dispersion (A-18): the compound represented by formula (35) produced in Example 18
Dispersion (A-19): the compound represented by formula (37) produced in Example 19
Dispersion (A-20): the compound represented by formula (39) produced in Example 20
Dispersion (A-21): the compound represented by formula (41) produced in Example 21
Dispersion (A-22): the compound represented by formula (43) produced in Example 22
Dispersion (A-23): the compound represented by formula (45) produced in Example 23
Dispersion (A-24): the compound represented by formula (47) produced in Example 24
Dispersion (A-25): the compound represented by formula (49) produced in Example 25
Dispersion (A-26): the compound represented by formula (51) produced in Example 26
Dispersion (A-27): the compound represented by formula (53) produced in Example 27
Dispersion (A-28): the compound represented by formula (55) produced in Example 28
Dispersion (A-29): the compound represented by formula (57) produced in Example 29

Dispersion Preparation Example 30

5 parts of the compound represented by formula (22) produced in Comparative Example 1, 8 parts of a dispersant (BYKLPN-6919 manufactured by BYK) (in terms of solid content), 8 parts of the resin (B-1) (in terms of solid content), and 79 parts of propylene glycol monomethyl ether acetate were mixed, 300 parts of 0.2 m zirconia beads were added thereto, and this mixture was shaken for 1 hour using a paint conditioner (manufactured by LAU). Subsequently, the zirconia beads were removed by filtration to prepare a dispersion (A-30).

[Preparation of Colored Resin Composition 1]

A colored resin composition 1 was prepared by mixing the following components.

Dispersion (A-1): 431.9 parts
Resin (B-1): 42.7 parts (in terms of solid content)
Polymerizable compound (C-1): Dipentaerythritol polyacrylate: trade name A-9550, manufactured by Shin-Nakamura Chemical Co., Ltd.: 20.0 parts
Polymerizable compound (C-2): Trimethylolpropane triacrylate: trade name A-TMPT, manufactured by Shin-Nakamura Chemical Co., Ltd.: 20.0 parts
Polymerization initiator (D): N-acetyloxy-1-(4-phenylsulfanylphenyl)-3-cyclohexylpropane-1-one-2-imine: trade name PBG-327: O-acyloxime compound, manufactured by Changzhou Tronly New Electronic Materials Co., Ltd.): 5.0 parts
Solvent (E): Propylene glycol monomethyl ether acetate: 679.9 parts
Leveling agent (F): Polyether modified silicone oil (trade name Toray silicone SH8400, manufactured by Toray Dow Corning Co., Ltd.): 0.1 parts

[Preparation of Colored Resin Compositions 2 to 21]

Colored resin compositions 2 to 21 were prepared in the same manner as in the preparation of the colored resin composition 1, except that the dispersion (A-1) was replaced with the following dispersions.

Colored resin composition 2: Dispersion (A-2)
Colored resin composition 3: Dispersion (A-3)
Colored resin composition 4: Dispersion (A-4)
Colored resin composition 5: Dispersion (A-5)
Colored resin composition 6: Dispersion (A-6)
Colored resin composition 7: Dispersion (A-7)
Colored resin composition 8: Dispersion (A-8)
Colored resin composition 9: Dispersion (A-9)
Colored resin composition 10: Dispersion (A-10)
Colored resin composition 11: Dispersion (A-11)
Colored resin composition 12: Dispersion (A-12)
Colored resin composition 13: Dispersion (A-13)
Colored resin composition 14: Dispersion (A-14)
Colored resin composition 15: Dispersion (A-16)
Colored resin composition 16: Dispersion (A-19)
Colored resin composition 17: Dispersion (A-20)
Colored resin composition 18: Dispersion (A-21)
Colored resin composition 19: Dispersion (A-22)
Colored resin composition 20: Dispersion (A-25)
Colored resin composition 21: Dispersion (A-26)

[Preparation of Colored Resin Compositions 22 to 28]

Colored resin compositions 22 to 28 are prepared in the same manner as in the preparation of the colored resin composition 1, except that the dispersion (A-1) is replaced with the following dispersions.

Colored resin composition 22: Dispersion (A-17)
Colored resin composition 23: Dispersion (A-18)
Colored resin composition 24: Dispersion (A-23)
Colored resin composition 25: Dispersion (A-24)
Colored resin composition 26: Dispersion (A-27)
Colored resin composition 27: Dispersion (A-28)
Colored resin composition 28: Dispersion (A-29)

[Preparation of Comparative Colored Resin Composition 1]

A comparative colored resin composition 1 was prepared by mixing the following components.

Dispersion (A-30): 516.9 parts
Resin (B-1): 18.6 parts (in terms of solid content)
Polymerizable compound (C-1): Dipentaerythritol polyacrylate: trade name A-9550, manufactured by Shin-Nakamura Chemical Co., Ltd.: 20.0 parts
Polymerizable compound (C-2): Trimethylolpropane triacrylate: trade name A-TMPT, manufactured by Shin-Nakamura Chemical Co., Ltd.: 20.0 parts
Polymerization initiator (D): N-acetyloxy-1-(4-phenylsulfanylphenyl)-3-cyclohexylpropane-1-one-2-imine: trade name PBG-327: O-acyloxime compound, manufactured by Changzhou Tronly New Electronic Materials Co., Ltd.): 5.0 parts
Solvent (E): Propylene glycol monomethyl ether acetate: 855.2 parts Leveling agent (F): Polyether modified silicone oil (trade name Toray silicone SH8400, manufactured by Toray Dow Corning Co., Ltd.): 0.1 parts

[Formation 1 of Colored Coating Film]

Each of the colored resin compositions prepared in the preparation of the colored resin compositions 1 to 21 and the comparative colored resin composition 1 was applied onto a 5-cm square glass substrate (Eagle 2000, manufactured by Corning Incorporated) by a spin coating method, and then prebaked at 100° C. for 3 minutes to form a colored coating film.

[Color Change 1 Before and After Post-Baking of Colored Coating Film]

The colored coating film after prebaking was subjected to spectrometry with a colorimeter (OSP-SP-200 manufactured by Olympus Corporation), and xy chromaticity coordinates (x, y) and Y in the CIE-XYZ color system were measured using the characteristic function for a C light source. In addition, the transmittance of the colored coating film after prebaking was measured.

Then, the colored coating film after prebaking was post-baked at 230° C. for 10 minutes.

For the colored coating film after post-baking, xy chromaticity coordinates (x, y) and Y were measured in the same manner as above. The color difference ΔEab was calculated from the measurement values before and after post-baking. A smaller ΔEab value means a smaller change in color. The results are shown in Table 37.

In addition, the transmittance of the colored coating film after post-baking was measured. When the transmittance before post-baking and the transmittance after post-baking at a certain wavelength λ were taken as $X_\lambda$ and $Y_\lambda$, respectively, the amounts of changes in transmittance were calculated based on the following formula at intervals of 5 nm in the wavelength of 500 to 650 nm.

$$\text{The amounts of change in transmittance (\%)} = \left|(1 - Y_\lambda/X_\lambda) \times 100\right|$$

The average value of the obtained values was defined as "Change rate of transmittance in 500 to 650 nm". The results are shown in Table 37.

TABLE 37

| | ΔEab | Change rate of transmittance in 500 to 650 nm |
|---|---|---|
| Colored resin composition 1 | 6.2 | 18% |
| Colored resin composition 2 | 6.0 | 8% |
| Colored resin composition 3 | 4.8 | 7% |
| Colored resin composition 4 | 6.2 | 13% |
| Colored resin composition 5 | 6.2 | 10% |
| Colored resin composition 6 | 1.7 | 7% |
| Colored resin composition 7 | 0.6 | 9% |
| Colored resin composition 8 | 1.0 | 9% |
| Colored resin composition 9 | 0.9 | 4% |
| Colored resin composition 10 | 2.0 | 5% |
| Colored resin composition 11 | 2.1 | 6% |
| Colored resin composition 12 | 6.5 | 14% |
| Colored resin composition 13 | 7.7 | 17% |
| Colored resin composition 14 | 2.2 | 8% |
| Colored resin composition 15 | 1.6 | 6% |
| Colored resin composition 16 | 4.5 | 9% |
| Colored resin composition 17 | 3.9 | 13% |
| Colored resin composition 18 | 1.0 | 3% |
| Colored resin composition 19 | 1.9 | 17% |
| Colored resin composition 20 | 1.7 | 2% |

TABLE 37-continued

| | ΔEab | Change rate of transmittance in 500 to 650 nm |
|---|---|---|
| Colored resin composition 21 | 1.1 | 2% |
| Comparative colored resin composition 1 | 7.9 | 19% |

[Formation 2 of Colored Coating Film]

Each of the colored resin compositions prepared in the preparation of the colored resin compositions 22 to 28 is applied onto a 5-cm square glass substrate (Eagle 2000 manufactured by Corning Incorporated) by a spin coating method, and then prebaked at 100° C. for 3 minutes to form a colored coating film.

[Color Change 2 Before and After Post-Baking of Colored Coating Film]

The colored coating film after prebaking is subjected to spectrometry with a colorimeter (OSP-SP-200 manufactured by Olympus Corporation), and xy chromaticity coordinates (x, y) and Y in the CIE-XYZ color system are measured using the characteristic function for a C light source. In addition, the transmittance of the colored coating film after prebaking is measured.

Then, the colored coating film after prebaking is post-baked at 230° C. for 10 minutes.

For the colored coating film after post-baking, xy chromaticity coordinates (x, y) and Y are measured in the same manner as above. The color difference ΔEab is calculated from the measurement values before and after post-baking.

In addition, the transmittance of the colored coating film after post-baking is measured in the same manner as above.

The invention claimed is:

1. A compound represented by formula (I) or formula (II):

(I)

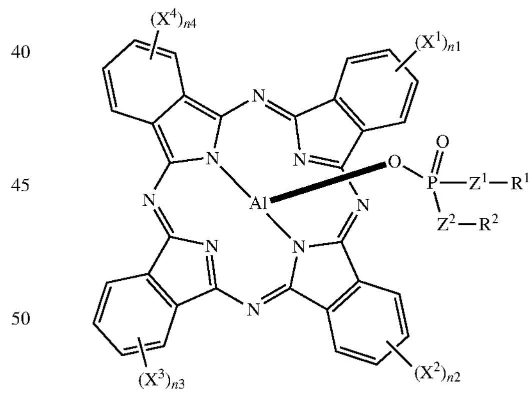

(II)

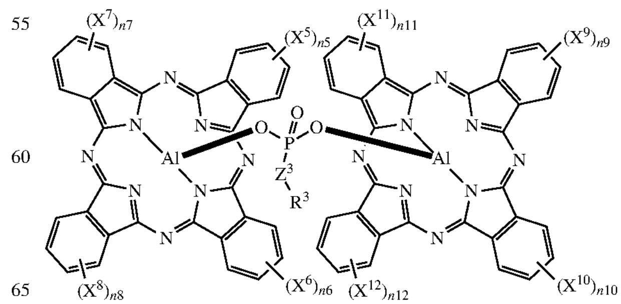

wherein in the formula (I), $R^1$ represents an aliphatic unsaturated hydrocarbon group having 2 to 20 carbon atoms and optionally having a substituent;

$R^2$ represents a hydrogen atom, a hydrocarbon group having 1 to 20 carbon atoms and optionally having a substituent, or a single bond connecting $Z^2$ and $R^1$;

$Z^1$ and $Z^2$ each independently represent a single bond or an oxygen atom;

$X^1$ to $X^4$ each independently represent —$R^4$, —$OR^4$, —$SR^4$, a halogen atom, a nitro group, or a sulfamoyl group optionally having a substituent;

$R^4$ represents a hydrocarbon group having 1 to 20 carbon atoms and optionally having a substituent; and n1 to n4 each independently represent an integer of 0 to 4, and in the formula (II), $R^3$ represents an aliphatic unsaturated hydrocarbon group having 2 to 20 carbon atoms and optionally having a substituent;

$Z^3$ represents a single bond or an oxygen atom;

$X^5$ to $X^{12}$ each independently represent —$R^5$, —$OR^5$, —$SR^5$, a halogen atom, a nitro group, or a sulfamoyl group optionally having a substituent;

$R^5$ represents a hydrocarbon group having 1 to 20 carbon atoms and optionally having a substituent; and n5 to n12 each independently represent an integer of 0 to 4.

2. A colored resin composition comprising the compound according to claim 1 and a resin.

3. The colored resin composition according to claim 2, comprising a polymerizable compound and a polymerization initiator.

4. A color filter formed from the colored resin composition according to claim 3.

5. A display device comprising the color filter according to claim 4.

* * * * *